US009695616B2

(12) United States Patent
Johnson et al.

(10) Patent No.: US 9,695,616 B2
(45) Date of Patent: Jul. 4, 2017

(54) INTELLIGENT DOOR LOCK SYSTEM AND VIBRATION/TAPPING SENSING DEVICE TO LOCK OR UNLOCK A DOOR

(71) Applicant: August Home, Inc., San Francisco, CA (US)

(72) Inventors: Jason Johnson, San Francisco, CA (US); Shih Yu Thomas Cheng, Union City, CA (US)

(73) Assignee: August Home, Inc., San Francisco, CA (US)

( * ) Notice: Subject to any disclaimer, the term of this patent is extended or adjusted under 35 U.S.C. 154(b) by 0 days.

(21) Appl. No.: 14/465,527

(22) Filed: Aug. 21, 2014

(65) Prior Publication Data

US 2016/0047145 A1 Feb. 18, 2016

Related U.S. Application Data

(63) Continuation-in-part of application No. 14/212,569, filed on Mar. 14, 2014.

(Continued)

(51) Int. Cl.

| | |
|---|---|
| ***E05C 1/06*** | (2006.01) |
| ***E05B 47/00*** | (2006.01) |
| ***E05B 17/00*** | (2006.01) |
| *E05C 3/06* | (2006.01) |
| *G05B 19/00* | (2006.01) |
| *G05B 23/00* | (2006.01) |
| *G06F 7/00* | (2006.01) |
| *G06F 7/04* | (2006.01) |
| *G06K 19/00* | (2006.01) |
| *G08B 29/00* | (2006.01) |
| *G08C 19/00* | (2006.01) |
| *H04B 1/00* | (2006.01) |
| *H04B 1/38* | (2015.01) |

(Continued)

(52) U.S. Cl.
CPC ...... *E05B 47/0012* (2013.01); *E05B 17/0083* (2013.01); *E05B 17/0087* (2013.01); *E05B 2047/0095* (2013.01)

(58) Field of Classification Search
CPC ........... Y10T 292/57; E05B 2047/0091; E05B 2047/0079; E05B 47/0012; E05B 17/0083; E05B 17/0087; E05B 2047/0095
USPC ................. 345/156, 173; 292/144, 200, 201, 292/DIG. 21; 340/5.64, 5.72, 5.85, 540, 340/541, 542
See application file for complete search history.

(56) References Cited

U.S. PATENT DOCUMENTS 2,680,177 A 6/1954 Rosenthal
5,306,407 A 4/1994 Hauzer et al.

(Continued)

FOREIGN PATENT DOCUMENTS

CA 2676196 A1 7/2008
EP 0486657 A1 5/1992

(Continued)

*Primary Examiner* — Kristina Fulton
*Assistant Examiner* — Faria Ahmad
(74) *Attorney, Agent, or Firm* — Paul Davis

(57) ABSTRACT

An intelligent door lock system includes a drive shaft of a lock device and a circuit coupled to an engine with a memory. A vibration/tapping sensing device is configured to be coupled to the lock device to lock or unlock the door. A device converts energy into mechanical energy coupled to the drive shaft.

18 Claims, 49 Drawing Sheets

Related U.S. Application Data

(60) Provisional application No. 61/800,937, filed on Mar. 15, 2013, provisional application No. 61/801,236, filed on Mar. 15, 2013, provisional application No. 61/801,294, filed on Mar. 15, 2013, provisional application No. 61/801,335, filed on Mar. 15, 2013, provisional application No. 62/036,993, filed on Aug. 13, 2014, provisional application No. 62/036,991, filed on Aug. 13, 2014, provisional application No. 62/036,989, filed on Aug. 13, 2014, provisional application No. 62/036,971, filed on Aug. 13, 2014, provisional application No. 62/036,979, filed on Aug. 13, 2014.

(51) Int. Cl.

| | |
|---|---|
| *H04B 3/00* | (2006.01) |
| *H04Q 1/00* | (2006.01) |
| *H04Q 9/00* | (2006.01) |

(56) References Cited

U.S. PATENT DOCUMENTS 5,407,035 A 4/1995 Cole et al.
5,695,048 A 12/1997 Tseng
6,196,936 B1 3/2001 Meckel
6,323,846 B1 11/2001 Westerman et al.
6,570,557 B1 5/2003 Westerman et al.
6,612,415 B2 9/2003 Yamane
6,677,932 B1 1/2004 Westerman
7,439,850 B2* 10/2008 Boulard ................ E05B 13/004 307/10.1
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
8,006,002 B2 8/2011 Kalayjian et al.
8,239,784 B2 8/2012 Hotelling et al.
8,279,180 B2 10/2012 Hotelling et al.
8,347,720 B2 1/2013 De Los Santos et al.
8,351,789 B2 1/2013 Wagener et al.
8,405,387 B2 3/2013 Novak et al.
8,476,577 B2 7/2013 Nagahama et al.
8,479,122 B2 7/2013 Hotelling et al.
8,522,596 B2 9/2013 Avery
8,525,102 B2 9/2013 Augustyniak et al.
8,542,189 B2 9/2013 Milne et al.
8,544,326 B2 10/2013 Je
8,600,430 B2 12/2013 Herz et al.
9,024,759 B2* 5/2015 Uyeda ..................... E05B 47/00 340/10.4
9,187,929 B2* 11/2015 Webb ...................... E05B 47/00
2002/0015024 A1 2/2002 Westerman et al.
2005/0212750 A1* 9/2005 Marvit .................. G06F 1/1613 345/156
2005/0212752 A1* 9/2005 Marvit .................. G06F 3/0346 345/156
2005/0252739 A1 11/2005 Callahan et al.
2006/0026536 A1 2/2006 Hotelling et al.
2006/0033724 A1 2/2006 Chaudhri et al.
2006/0197753 A1 9/2006 Hotelling
2007/0150842 A1 6/2007 Chaudhri et al.
2008/0211775 A1* 9/2008 Hotelling .............. G06F 3/0418 345/168
2008/0309624 A1* 12/2008 Hotelling ............ G06F 3/04883 345/173
2009/0085878 A1* 4/2009 Heubel ................... G06F 3/016 345/173
2010/0070281 A1* 3/2010 Conkie ................. G06F 3/0482 704/260
2010/0156809 A1* 6/2010 Nutaro .................. G06F 3/0488 345/173
2011/0056253 A1* 3/2011 Greiner ................. B62B 3/1404 70/85
2011/0148575 A1* 6/2011 Sobecki ................ E05B 85/107 340/5.64
2012/0319827 A1 12/2012 Pance et al.
2013/0038550 A1* 2/2013 Chien ..................... G06F 3/041 345/173
2013/0050106 A1* 2/2013 Chung .................. H04M 1/673 345/173
2013/0063138 A1 3/2013 Takahashi et al.
2013/0064378 A1 3/2013 Chuang
2013/0067969 A1* 3/2013 Webb ...................... E05B 47/00 70/78
2013/0076048 A1* 3/2013 Aerts .................... E05B 85/103 292/336.3
2013/0307670 A1* 11/2013 Ramaci .................... G05B 1/00 340/5.82
2014/0033773 A1* 2/2014 Myers ..................... E05B 15/02 70/129
2014/0125599 A1* 5/2014 Seeley .................... A47F 3/043 345/173
2014/0265359 A1* 9/2014 Cheng ................... E05B 47/026 292/144
2015/0008685 A1* 1/2015 Beck ...................... B60K 15/05 292/336.3
2015/0015513 A1* 1/2015 Kwak ................... G06F 3/0416 345/173
2015/0022466 A1* 1/2015 Levesque ................ G06F 3/017 345/173
2015/0027178 A1* 1/2015 Scalisi ................ E05B 47/0001 70/277
2015/0102609 A1* 4/2015 Johnson ................ E05B 1/0007 292/144
2015/0102610 A1* 4/2015 Johnson ............. G07C 9/00174 292/144
2015/0116075 A1* 4/2015 Cregg ..................... E05B 45/00 340/3.7
2015/0116080 A1* 4/2015 Cregg ................. G07C 9/00111 340/5.54
2015/0145796 A1* 5/2015 Lee ....................... G06F 3/0414 345/173
2015/0160770 A1* 6/2015 Stewart ................. G06F 3/0414 345/173
2015/0170448 A1* 6/2015 Robfogel ........... G07C 9/00904 340/5.61
2015/0194000 A1* 7/2015 Schoenfelder ..... G07C 9/00309 340/5.61
2015/0216326 A1* 8/2015 Artwohl ................ A47F 3/0434 345/173
2015/0218850 A1* 8/2015 Uyeda ..................... E05B 47/00 292/138
2015/0218857 A1* 8/2015 Hamada .................. E05B 85/20 292/194
2015/0227201 A1* 8/2015 Nakao ..................... G06F 3/016 345/156
2015/0227227 A1* 8/2015 Myers ................. H04M 1/0268 345/173
2015/0233153 A1* 8/2015 Smart ................... E05B 85/103 70/237
2015/0233154 A1* 8/2015 Smart ................... E05B 85/103 70/237
2015/0240521 A1* 8/2015 Vaknin .................. E05B 47/026 70/263
2015/0240531 A1* 8/2015 Blust .................. G07C 9/00571 340/5.5
2015/0241974 A1* 8/2015 Takeda .................... G06F 3/016 345/173
2015/0242007 A1* 8/2015 Iwaizumi ................ G06F 3/016 345/173
2015/0242036 A1* 8/2015 Heidari ................. G06F 1/1684 345/173
2015/0242038 A1* 8/2015 Steiner .................. G06F 3/0416 345/173
2015/0242045 A1* 8/2015 Choi ..................... G06F 3/0416 345/173

(56) References Cited

U.S. PATENT DOCUMENTS

2015/0242047 A1* 8/2015 Zafiris .................. G06F 3/0418 345/178
2015/0242074 A1* 8/2015 Iwamoto .............. G06F 3/0483 345/158
2015/0242113 A1* 8/2015 Nguyen Thien ........ G06F 3/016 345/173
2015/0242115 A1* 8/2015 Gao ...................... G06F 3/0416 345/173
2015/0242696 A1* 8/2015 Kim ...................... G06F 3/0416 345/173
2015/0259949 A1* 9/2015 Cheng ................. E05B 47/0012 292/144
2015/0300048 A1* 10/2015 Yen ..................... E05B 47/0012 292/144
2015/0308157 A1* 10/2015 Lin ......................... E05B 63/04 292/144
2016/0037306 A1* 2/2016 Johnson ................ H04W 4/043 340/5.7
2016/0055694 A1* 2/2016 Saeedi ............... G07C 9/00087 340/5.52
2016/0092954 A1* 3/2016 Bassett ................... H04W 4/04 705/26.41
2016/0127874 A1* 5/2016 Kingsmill ............... H04W 4/04 455/456.1
2016/0180621 A1* 6/2016 Desinor, Jr. ........ G07C 9/00309 340/5.61
2016/0208541 A1* 7/2016 Goto ....................... E05F 15/76

FOREIGN PATENT DOCUMENTS

EP 0907068 A1 4/1999
EP 1404021 A2 3/2004
EP 2428774 A1 3/2012
EP 2454558 A1 5/2012
EP 2564165 A2 3/2013
EP 2579002 A1 4/2013
EP 2642252 A1 9/2013

* cited by examiner

INTELLIGENT DOOR LOCK SYSTEM AND VIBRATION/TAPPING SENSING DEVICE TO LOCK OR UNLOCK A DOOR

CROSS-REFERENCE TO RELATED APPLICATIONS

The present application is a Continuation-in-Part of U.S. patent application Ser. No. 14/212,569, filed Mar. 14, 2014, which application claims priority to U.S. Provisional Patent Application No. 61/800,937, filed Mar. 15, 2013, 61/801,236, filed Mar. 15, 2013, 61/801,294, filed Mar. 15, 2013 and 61/801,335, filed Mar. 15, 2013; the present application also claims priority to U.S. Provisional Patent Application Ser. No. 62/036,979, filed Aug. 13, 2014; U.S. Provisional Patent Application No. 62/036,971, filed Aug. 13, 2014; U.S. Provisional Patent Application No. 62/036,991, filed Aug. 13, 2014; U.S. Provisional Patent Application No. 62/036,989, filed Aug. 13, 2014 and U.S. Provisional Patent Application No. 62/036,993, filed Aug. 13, 2014, the entire contents of which applications are incorporated by reference as set forth herein.

BACKGROUND

Field of the Invention

This invention relates generally to door lock devices, and more particularly to intelligent door lock devices with a vibration/tapping sensing device to lock or unlock a door.

Brief Description of the Related Art

Door lock assemblies often include deadbolts. Typically such an assembly included a latch which is depressed during closure of the door and, with substantially complete closure, extends into a recess of the door strike. Such a latch by itself is often easy to improperly depress-release by an unauthorized person, with a card-type element or even a pry bar. Also the outer knob assembly can be torqued off with a wrench to gain access to the mechanism and thereby to the room closed by the door. Deadbolts are not as susceptible to these unauthorized activities. Doors having deadbolts typically use a latch mechanism. This is because (1) the latch holds the door snug against rattling whereas the deadbolt by necessity must have clearance between it and the strike plate recess edges (but because of the clearance, the door can rattle), and (2) the latch automatically holds the door shut since it is only momentarily depressed during door closure from its normally extended condition and then extends into a door strike recess when the door is fully closed.

Except in rare devices where the deadbolt is operated by an electrical solenoid, the deadbolt, to be effective, must be manually thrown by a person inside the room or building, or if the deadbolt is actuatable by an external key, the person leaving the room or building must purposely engage the deadbolt by a key as the person leaves. However, if a person forgets to so actuate the deadbolt, either manually with an inner hand turn when inside, or by a key outside, an intruder need only inactivate the latch mechanism in order to gain unauthorized entry. Motel and hotel rooms often do not even have a key actuated deadbolt and thus are particularly susceptible to unauthorized entry and theft when the person is not in the room.

In recent years, mechanisms were developed to enable retraction, i.e., inactivation, of the deadbolt simultaneously with the latch for quick release even under panic exit conditions. But to lock the door still required manual actuation of the deadbolt with the inner hand turn or a key on the outside.

In one door lock assembly a deadbolt is shift able between an extended lock position and a retracted position and means for shifting the deadbolt from the extended position to the retracted position which is characterized by biasing means for applying a bias on the deadbolt toward the extended lock position; restraining means for restraining the deadbolt in the retracted position against the bias of the biasing means and being actuatable to release the deadbolt to enable the biasing means to shift the deadbolt to the extended lock position; and trigger means. For actuating the restraining means to release the deadbolt and thereby allow the biasing means to shift the deadbolt to the extended lock position.

Such a door lock assembly is for use in a door frame and thus the invention extends to the door lock assembly of the present invention in cooperation with a door frame.

Some deadbolt locks are automatically actuated with closure of the door, the deadbolt being mechanically actuated to the extended lock position. The deadbolt in its retracted position is spring-biased toward the extended lock position, but is retained in a cocked condition by a deadbolt restraining and releasing device which is trigger actuatable to activate the deadbolt into its locked condition. The trigger mechanism may have a portion that protrudes from the door to engage the door strike of the door frame upon closure of the door, thereby causing the deadbolt to be released and shifted to the locked condition. The protruding portion of the trigger mechanism can also serve to hold the door snug against rattling.

In another door lock assembly for a hinged door and cooperative with a door strike of a door frame, a deadbolt is provided mounting in the door. The dead bolt is shift able between a retracted non-lock position and an extended lock position. It includes a manually operable device for shifting the deadbolt from the extended lock position to the retracted non-lock position. A biasing device applies a bias on the deadbolt toward the extended lock position. A restraining device is biased into a restraining relationship with the deadbolt in the retracted position. This restrains the deadbolt in the retracted position against the bias of the biasing device. A trigger releases a restraining means when the trigger is actuated and includes a protruding portion for engaging a door strike for actuating the trigger. A door strike includes a surface to engage and depress the trigger protruding portion for actuation of the trigger and release of the deadbolt restraining means, and includes an opening to receive the deadbolt when extended.

The use of electronic systems for the control and operation of locks is becoming increasingly common. The present invention is directed to an arrangement that permits the electronic and manual control of the lock operation to be separated to allow manual operation of the lock independently of the electronic drive system for the lock. The lock of the present invention is useful in situations where an electronic controller is temporarily unavailable, for example where a controller has been lost, misplaced or damaged.

There are currently some electronic deadbolt lock arrangements. In one device, a lock has a bolt movable between locked and unlocked conditions. The lock has a manual control device that serves to operate the lock between locked and unlocked conditions. A power drive is coupled by a transmission to the manual control device. The lock is operated between the locked and unlocked conditions in response to operation of the power drive. A transmission mechanism couples the manual control device and the power drive, whereby the lock moves between the locked and unlocked conditions. The transmission mechanism is operable to decouple the power drive from the manual control means to enable the lock to be operated by the manual control device independently of the power drive.

There is a need to provide a lock and unlock system for an intelligent door lock system. There is a further need for a knocking/tapping system for unlocking and locking an intelligent door lock system. There is yet another need for a vibration/tapping sensing device for locking and unlocking a lock of that is integrated with an intelligent door lock system. There is a further need for a vibration/tapping sensing device for locking and unlocking a lock of an intelligent door lock system, where the vibration/tapping sensing device is not integrated with the intelligent door lock system.

SUMMARY

An object of the present invention is to provide a vibration/tapping sensing device to lock or unlock a door.

Another object of the present invention is to provide an intelligent door lock system in communication with a vibration/tapping sensing device to lock or unlock a door.

A further object of the present invention is to provide an intelligent door lock system and a vibration/tapping sensing device to lock or unlock a door that can be integrated with or non-integrated with the intelligent door lock system.

These and other objects of the present invention are achieved in an intelligent door lock system. A drive shaft of a lock device and a circuit coupled to an engine with a memory are provided. A vibration/tapping sensing device is configured to be coupled to the lock device to lock or unlock the door. A device converts energy into mechanical energy coupled to the drive shaft.

In another embodiment, an intelligent door lock system includes a drive shaft means of a lock device and a circuit means coupled to an engine means with a memory means. A vibration/tapping sensing device means is configured to be coupled to the lock device means to lock or unlock the door. A device means converts energy into mechanical energy and is coupled to the drive shaft.

In another embodiment a method of unlocking or locking a door lock system. A drive shaft of a lock device is provided. A circuit is coupled to an engine with a memory. A vibration/tapping sensing device is used to lock or unlock the door. A device is used that converts energy into mechanical energy coupled to the drive shaft.

BRIEF DESCRIPTION OF THE DRAWINGS

FIG. 1(*b*) illustrates various embodiments of a positioning sensing device coupled to a drive shaft.

FIG. 1 (*c*) illustrates one embodiment of a door lock device that can be used for retrofitting with an embodiment of an intelligent door lock device of the present invention.

FIG. 1(*d*) illustrates coupling of a positioning sensing device with a drive shaft of a door lock device.

FIG. 1(*e*) illustrates one embodiment of an intelligent door lock system of the present invention with an off-center drive.

FIG. 1(*f*) illustrates a wireless bridge that can be used in one embodiment of the present invention.

FIG. 1(*g*) illustrates one embodiment of elements coupled to a circuit in one embodiment of the present invention, including a haptic device.

FIGS. 2(*d*)-(*f*) illustrate an embodiment of non-wire, direct connection between PCBAs in one embodiment of the present invention, with position of a PCBA in intelligent door lock device.

FIGS. 15(*c*)-(*d*) illustrate an embodiment of an accelerometer FPC service loop.

DETAILED DESCRIPTION

Figure 1A:
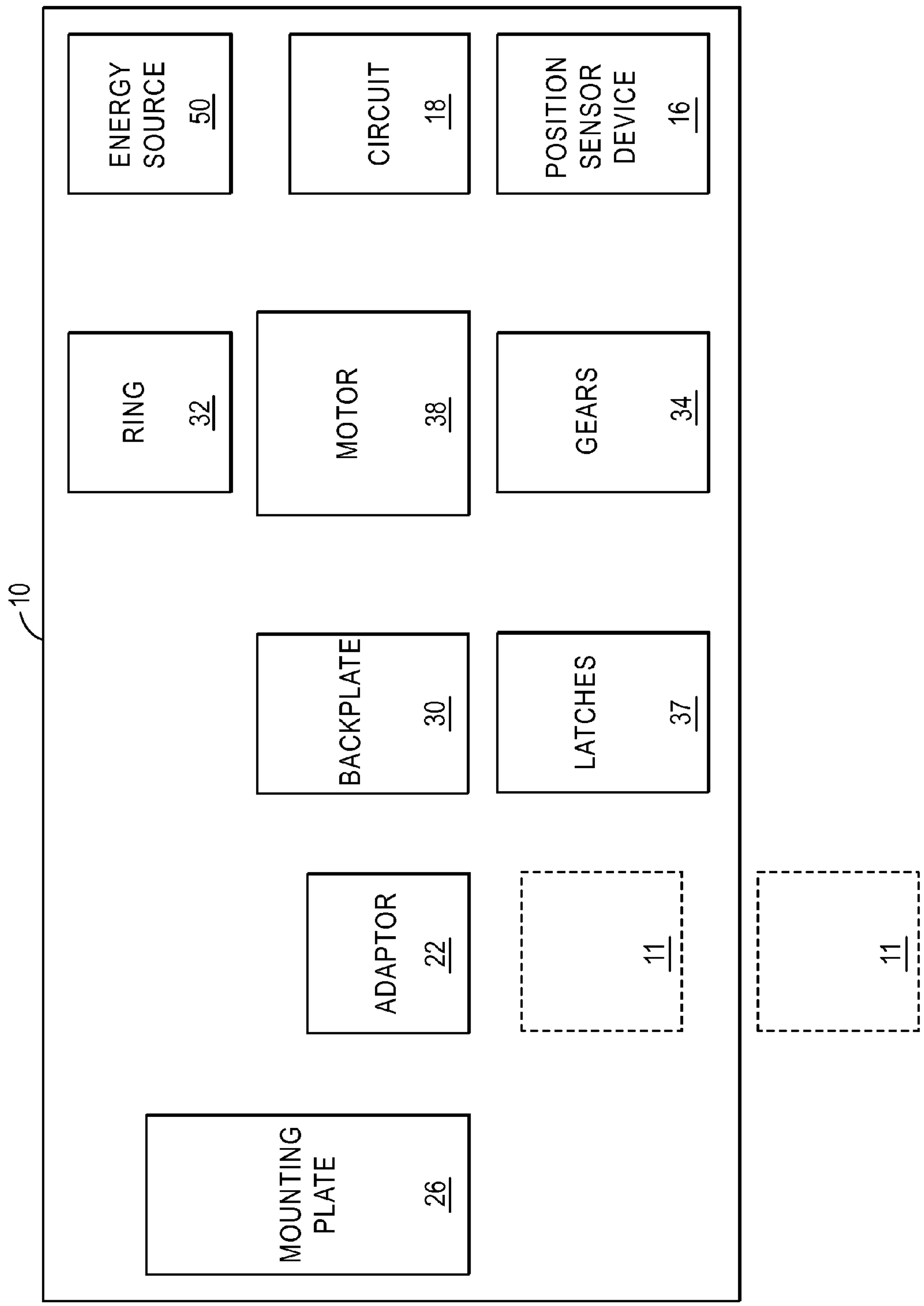
FIG. 1(*a*) is an exploded view of a mounting assembly of an intelligent door lock device that can be used with the present invention.
Figure 1B:
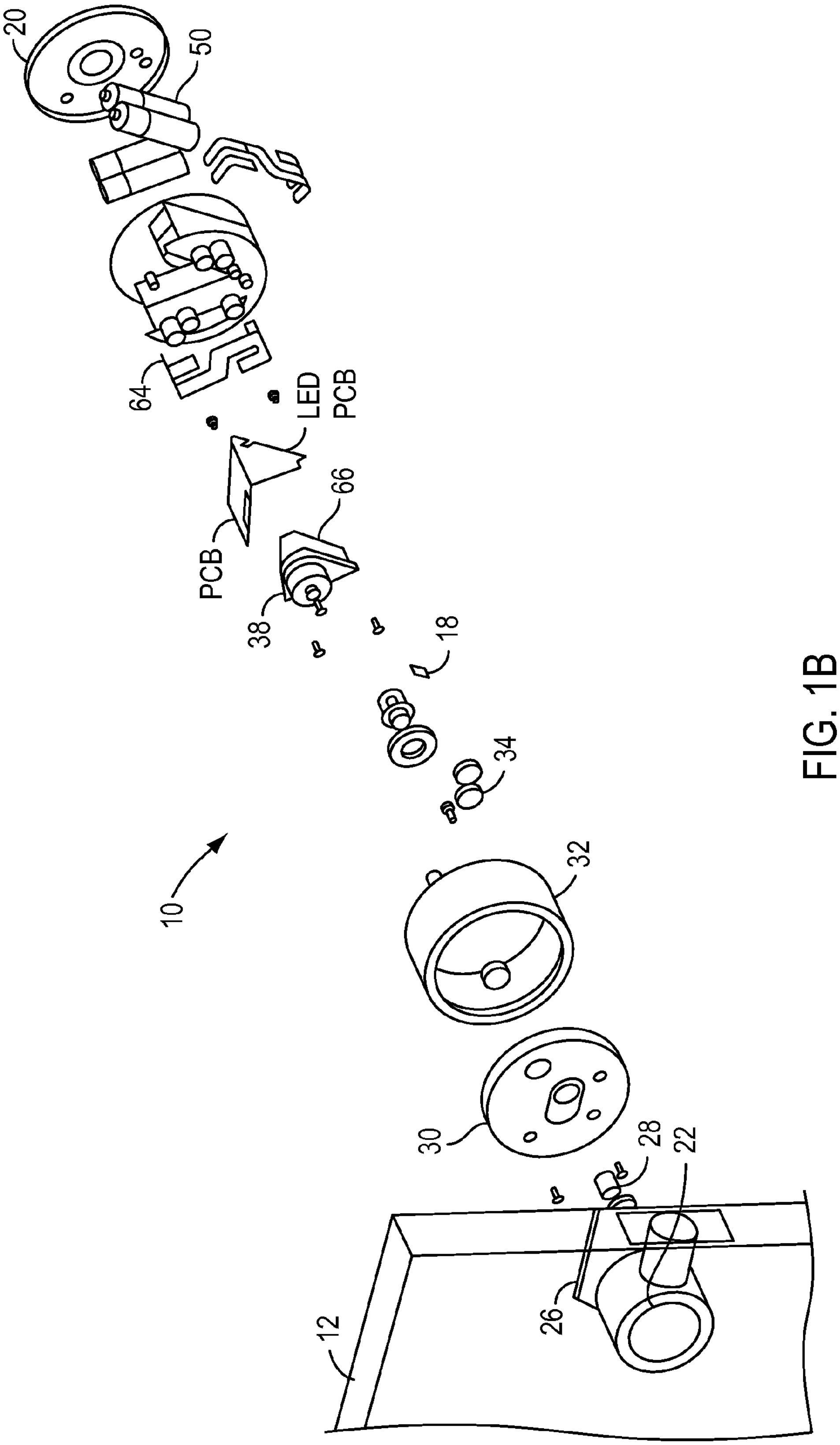
Figure 1C:
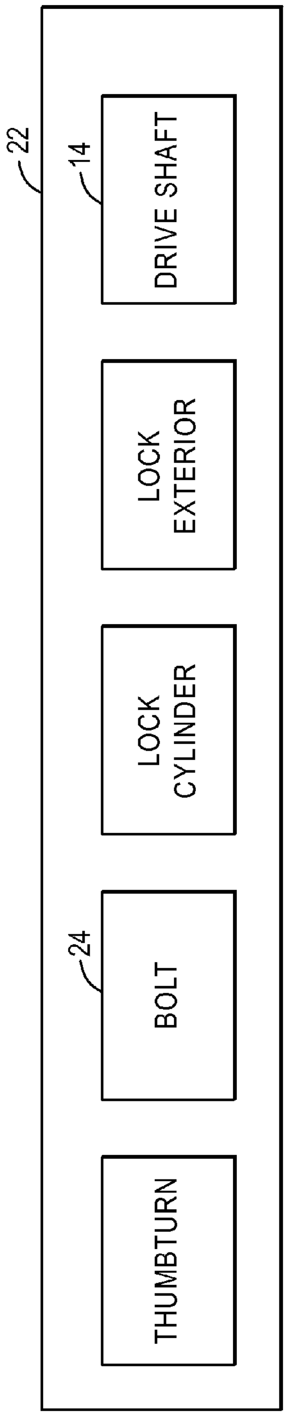
Figure 1D:
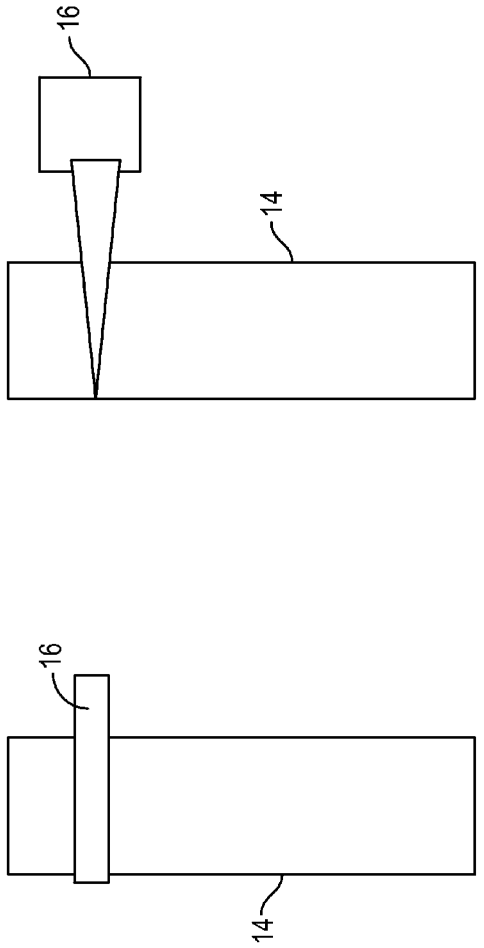
Figure 1E:
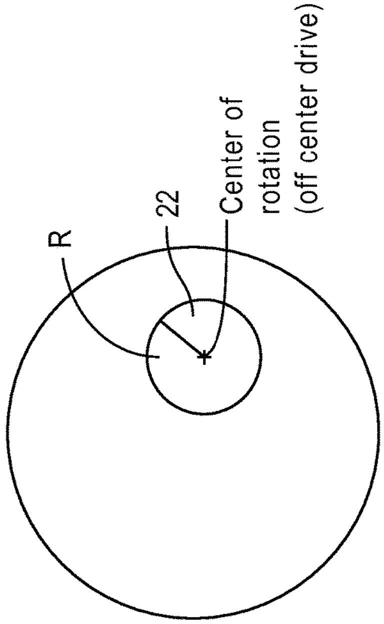
Figure 1F:
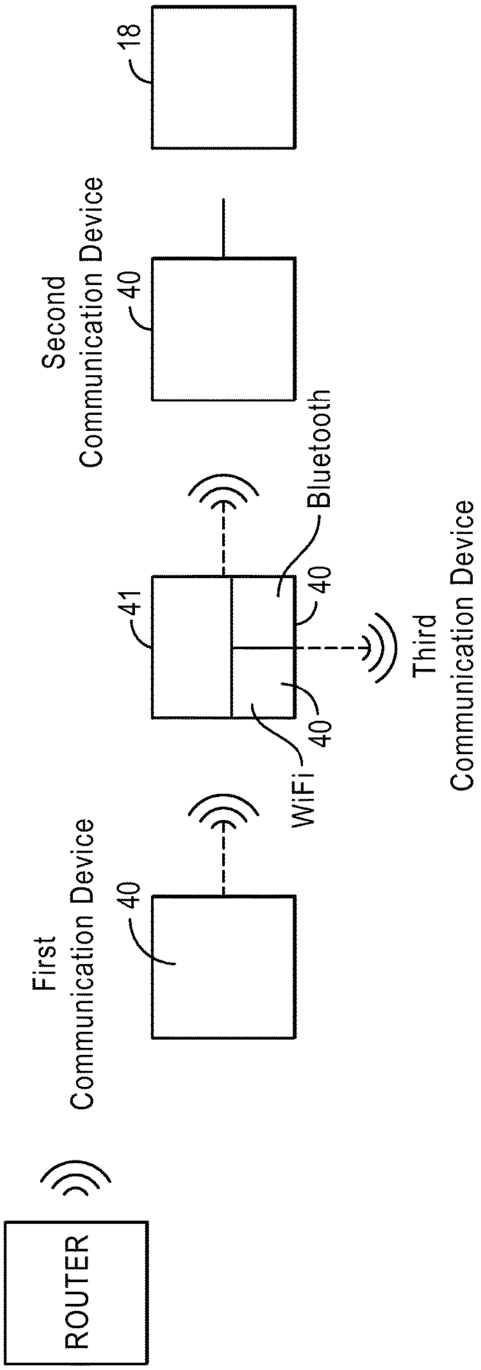
Figure 1G:
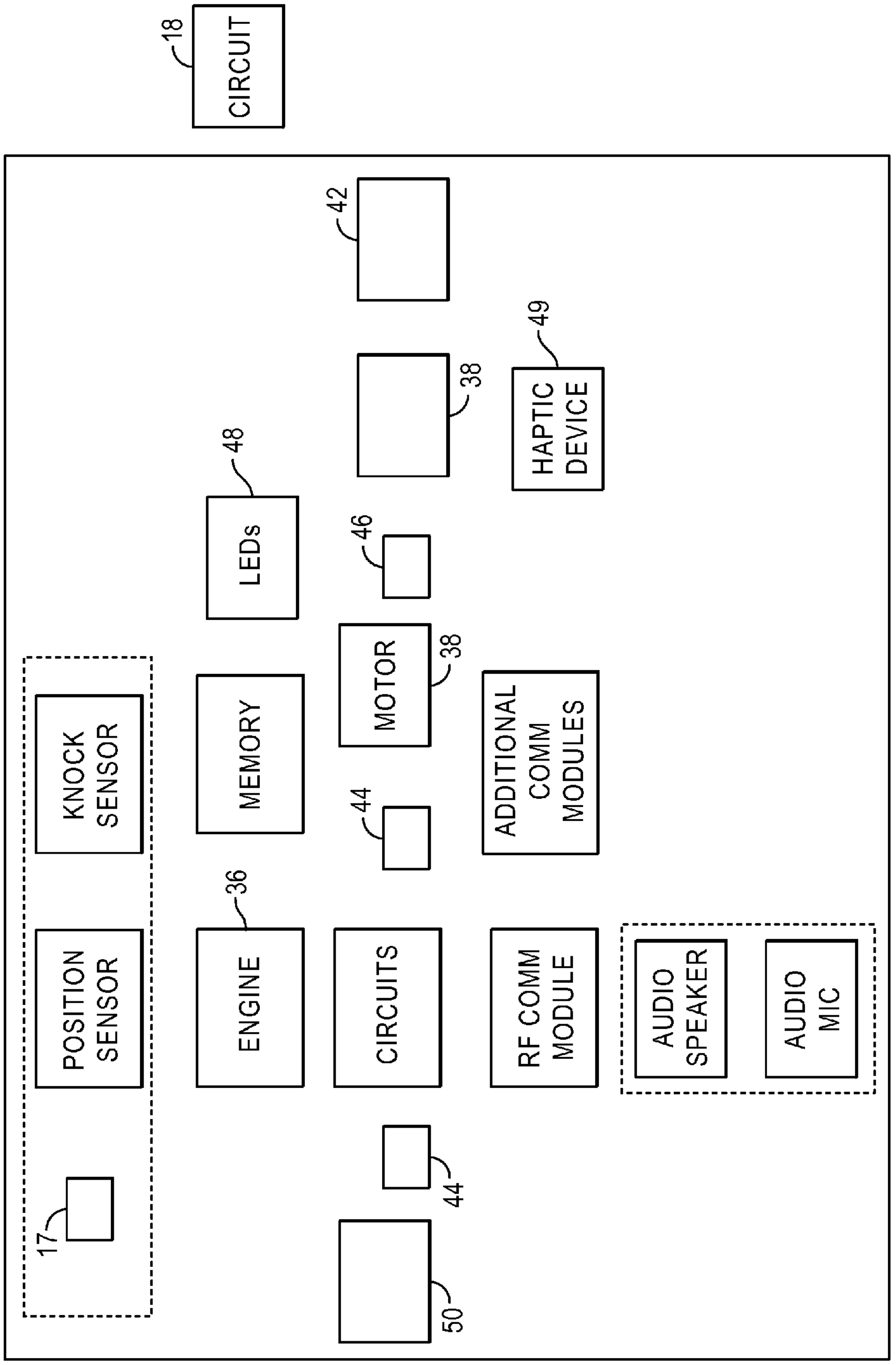
Figure 2A:
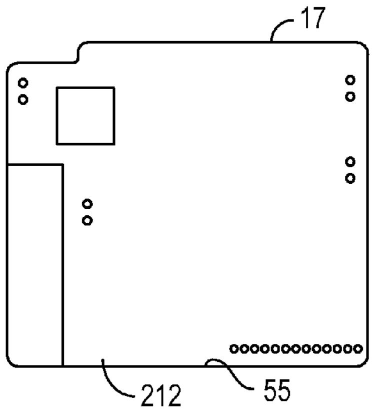
FIGS. 2(*a*)-(*c*) illustrate embodiments of front and back surfaces of a main circuit that can be used and included in the intelligent door lock device of the present invention.
Figure 2B:
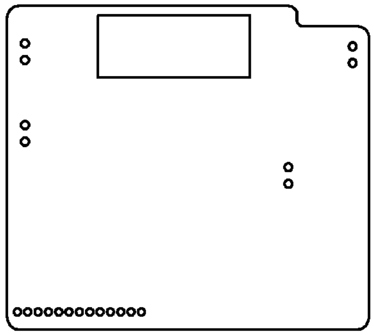
Figure 2C:
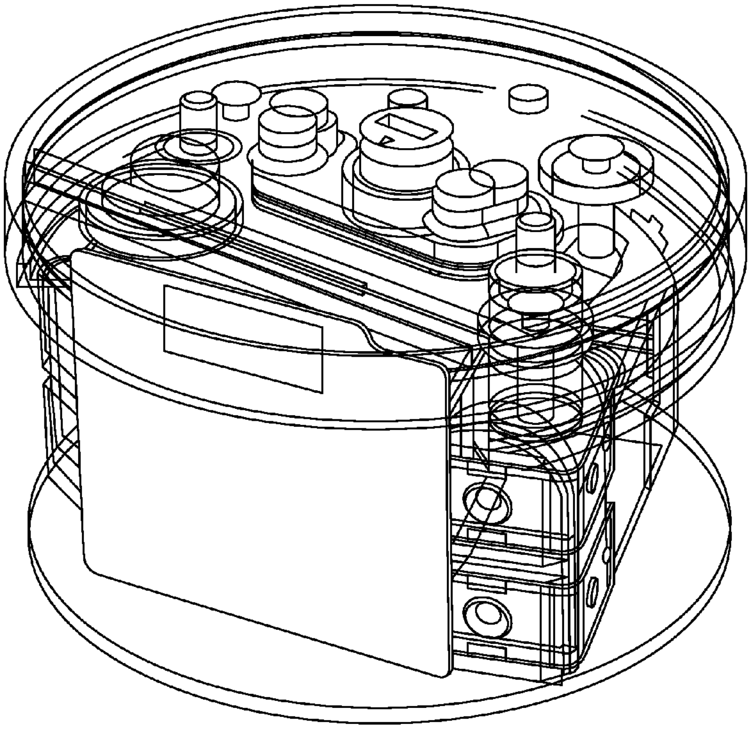
Figure 2D:
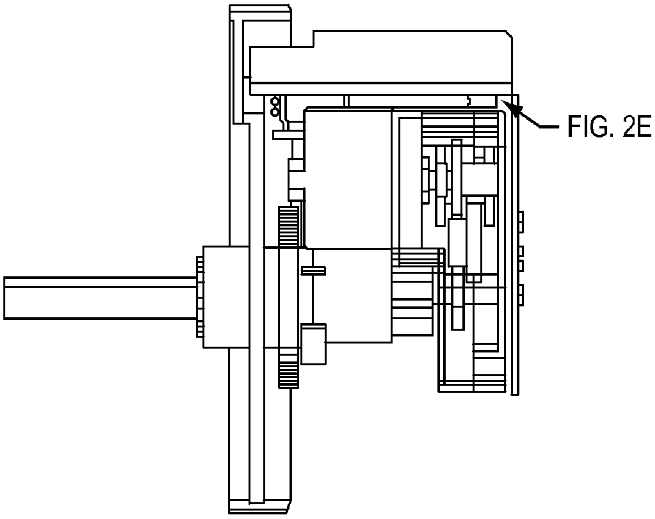
Figure 2E:
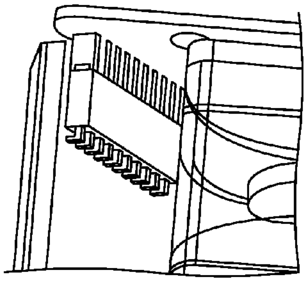
Figure 2F:
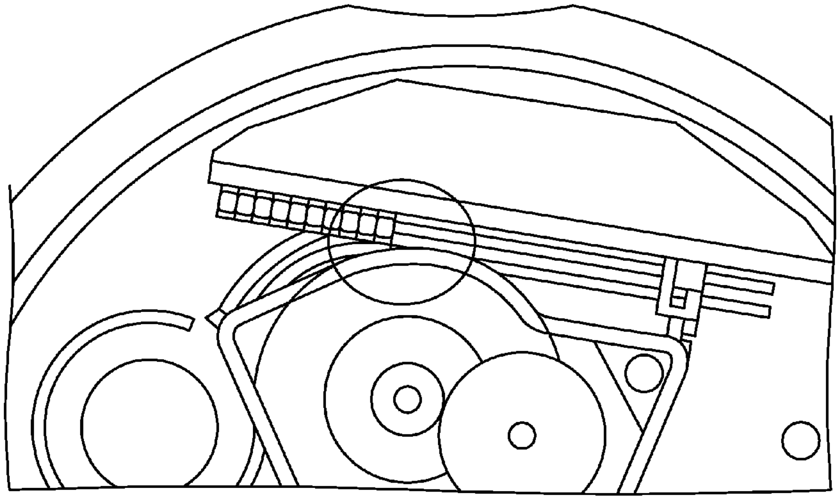
Figure 3B:
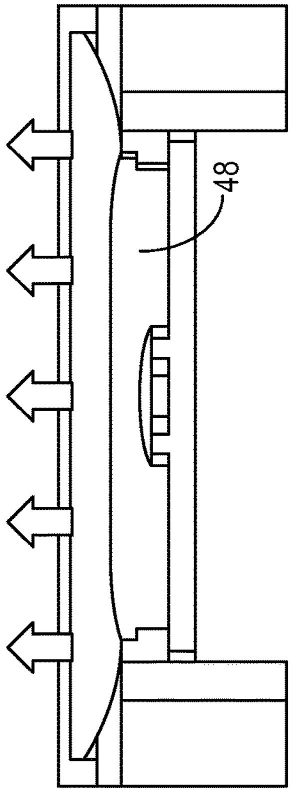
FIGS. 3(*a*)-(*d*) illustrate embodiments of LED lighting that can be used with the present invention.
Figure 3D:
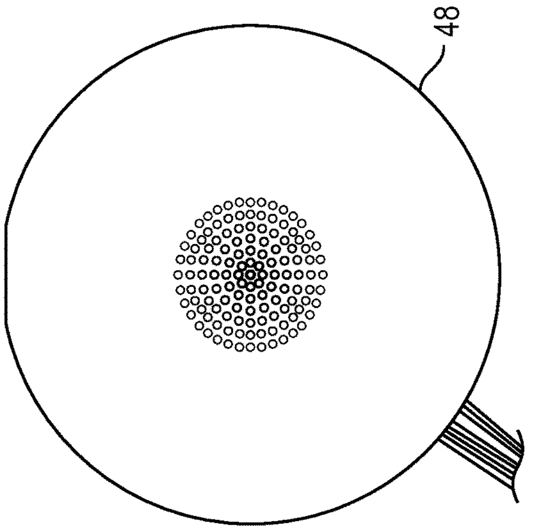
Figure 3A:
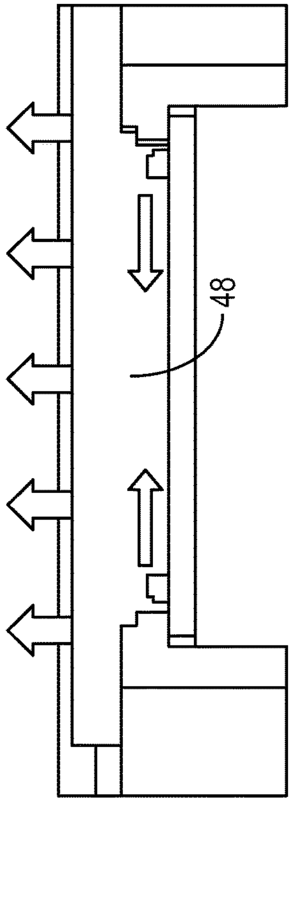
Figure 3C:
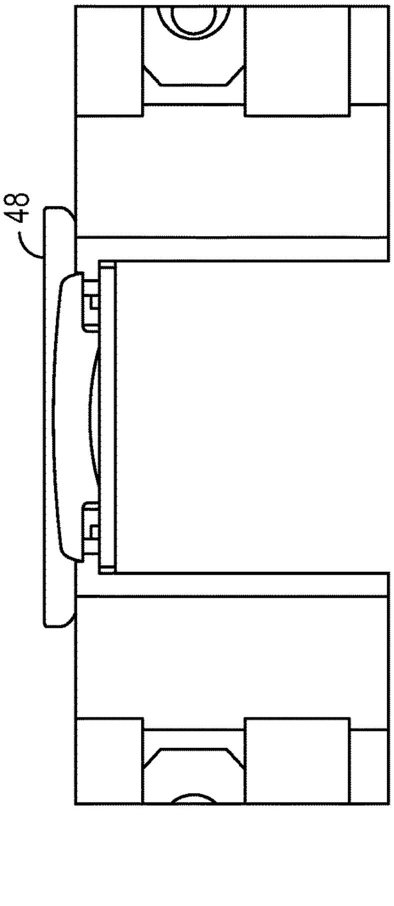
Figure 4A:
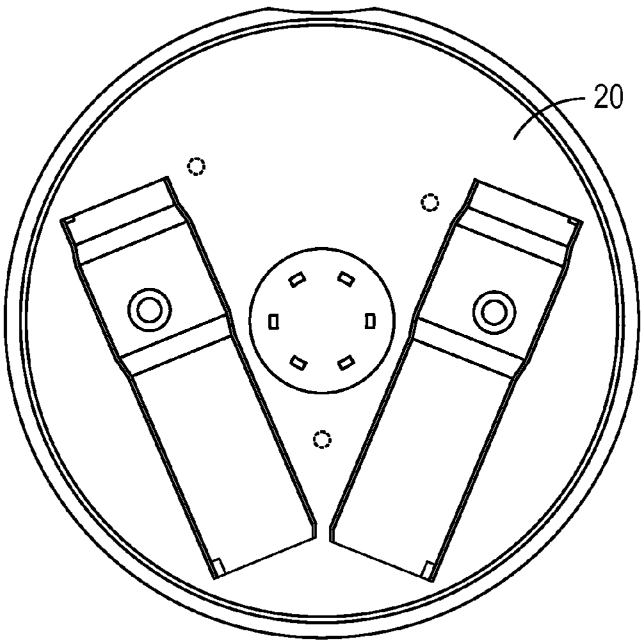
FIGS. 4(*a*)-(*d*) illustrate one embodiment of a faceplate and views of a housing that can be used with the present invention.
Figure 4B:
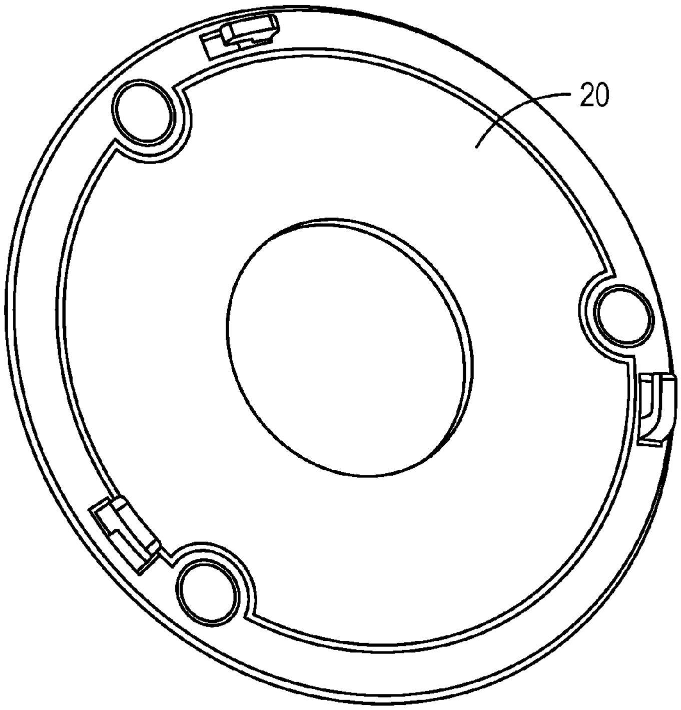
Figure 4C:
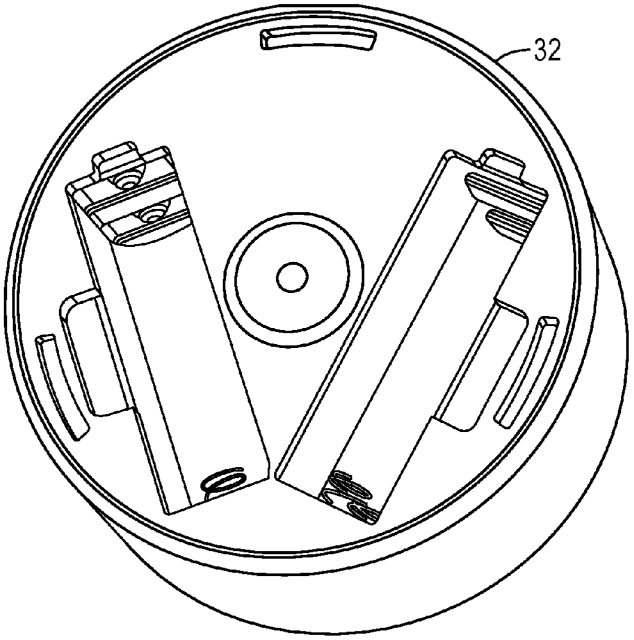
Figure 4D:
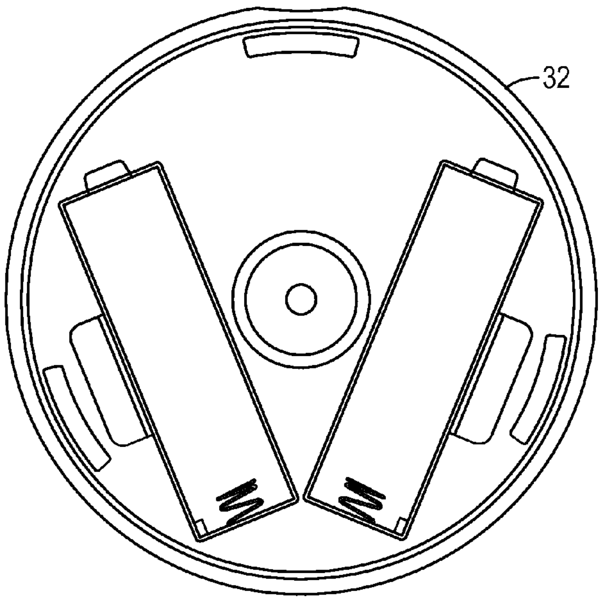

As used herein, the term engine refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a server to verify information. Typical components of mobile device may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device. A mobile device can be a key fob A key fob which can be a type of security token which is a small hardware device with built in authentication mechanisms. It is used to manage and secure access to network services, data, provides access, communicates with door systems to open and close doors and the like.

As used herein, the term "computer" or "mobile device or computing device" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture, and can also include a mobile device network, e.g., a cellular network.

As used herein, the term "extranet" is a computer network that allows controlled access from the outside. An extranet can be an extension of an organization's intranet that is extended to users outside the organization that can be partners, vendors, and suppliers, in isolation from all other Internet users. An extranet can be an intranet mapped onto the public Internet or some other transmission system not accessible to the general public, but managed by more than one company's administrator(s). Examples of extranet-style networks include but are not limited to:

- LANs or WANs belonging to multiple organizations and interconnected and accessed using remote dial-up
- LANs or WANs belonging to multiple organizations and interconnected and accessed using dedicated lines
- Virtual private network (VPN) that is comprised of LANs or WANs belonging to multiple organizations, and that extends usage to remote users using special "tunneling" software that creates a secure, usually encrypted network connection over public lines, sometimes via an ISP As used herein, the term "Intranet" is a network that is owned by a single organization that controls its security policies and network management. Examples of intranets include but are not limited to:

- A LAN
- A Wide-area network (WAN) that is comprised of a LAN that extends usage to remote employees with dial-up access
- A WAN that is comprised of interconnected LANs using dedicated communication lines
- A Virtual private network (VPN) that is comprised of a LAN or WAN that extends usage to remote employees or networks using special "tunneling" software that creates a secure, usually encrypted connection over public lines, sometimes via an Internet Service Provider (ISP)

For purposes of the present invention, the Internet, extranets and intranets collectively are referred to as ("Network Systems").

Referring now to FIG. 1(*a*), one embodiment of an intelligent door lock system 10 is illustrated, as more fully described hereafter.

In one embodiment the door lock system 10 includes a vibration/tapping sensing device 11 configured to be coupled intelligent lock system 10. In one embodiment the vibration/tapping sensing device 11 senses knocking on the door and locks or unlocks the door. In one embodiment the vibration/tapping sensing device 11 is not included as part of the actual intelligent door lock system. In one embodiment the vibration/tapping sensing device 11 is coupled to the drive shaft 14. It will be appreciated that the vibration/tapping sensing device 11 can be coupled to other elements of the intelligent door lock system 10. The vibration/tapping sensing device detects vibration or knocking applied to a door that is used to unlock or lock the intelligent door lock system 10. This occurs following programming the intelligent door lock system 10. The programming includes a user's vibration code/pattern, and the like. Additionally, a user can give a third person a knock code/pattern to unlock the intelligent door lock system of the door. The knocking is one that is recognized as having been defined by a user of the door lock system as a means to unlock the door. The knocking can have a variety of different patterns, tempos, duration, intensity and the like.

The vibration/tapping sensing device 11 detects oscillatory motion resulting from the application of oscillatory or varying forces to a structure. Oscillatory motion reverses direction. The oscillation may be continuous during some time period of interest or it may be intermittent. It may be periodic or nonperiodic, i.e., it may or may not exhibit a regular period of repetition. The nature of the oscillation depends on the nature of the force driving it and on the structure being driven.

Motion is a vector quantity, exhibiting a direction as well as a magnitude. The direction of vibration is usually described in terms of some arbitrary coordinate system (typically Cartesian or orthogonal) whose directions are called axes. The origin for the orthogonal coordinate system of axes is arbitrarily defined at some convenient location.

In one embodiment, the vibratory responses of structures can be modeled as single-degree-of-freedom spring mass systems, and many vibration sensors use a spring mass system as the mechanical part of their transduction mechanism.

In one embodiment the vibration/tapping sensing device 11 can measure displacement, velocity, acceleration, and the like.

A variety of different vibration/tapping sensing devices 11 can be utilized, including but not limited to accelerometers, optical devices, electromagnetic and capacitive sensors, contact devices, transducers, displacement transducers, piezoelectric sensors, piezoresistive devices, variable capacitance, servo devices, audio devices where transfer of the vibration can be gas, liquid or solid, including but not limited to microphones, geo-phones, and the like.

Suitable accelerometers include but are not limited to: Piezoelectric (PE); high-impedance output; Integral electronics piezoelectric (IEPE); low-impedance output Piezoresistive (PR); silicon strain gauge sensor Variable capacitance (VC); low-level, low-frequency Servo force balance; and the like.

The vibration/tapping sensing device 11 can be in communication with an intelligent door lock system back-end 68, via Network Systems, as more fully described hereafter.

In one embodiment, the intelligent door lock system 10 is configured to be coupled to a structure door 12, including but not limited to a house, building and the like, window, locked cabinet, storage box, bike, automobile door or window, computer locks, vehicle doors or windows, vehicle storage compartments, and the like. In one embodiment, the intelligent door lock system 10 is coupled to an existing drive shaft 14 of a lock device 22 already installed and is retrofitted to all or a portion of the lock device 22, which includes a bolt/lock 24. In another embodiment, the intelligent door lock system 10 is attached to a door 12, and the like, that does not have a pre-existing lock device. FIG. 1(*b*) illustrates door lock elements that can be at an existing door, to provide for the mounting of the intelligent door lock system 10 with an existing lock device 22.

FIG. 1(*b*) illustrates one embodiment of a lock device 22 that can be pre-existing at a door 10 with the intelligent door lock system 10 retrofitted to it. Components of the lock device 22 may be included with the intelligent door lock device 10, as more fully discussed hereafter.

In one embodiment, the intelligent door lock system 10 includes a positioning sensing device 16, a motor 38, an engine/processor 36 with a memory and one or more wireless communication devices 40 coupled to a circuit 18. The motor 38 converts any form of energy into mechanical energy. As a non-limiting example, three more four wireless communications devices 40 are in communication with circuit 18. In one embodiment the vibration/tapping sensing device 11 can be included with the positioning sensing device.

In one embodiment, the intelligent door lock system 10 is provided with the position sensing device 16 configured to be coupled to the drive shaft 14 of the lock device 22. The position sensing device 16 senses position of the drive shaft 14 and assists in locking and unlocking the bolt/lock 24 of the lock device 22. The engine 36 is provided with a memory. The engine 36 is coupled to the positioning sensing device 16. A circuit 18 is coupled to the engine 36 and an energy source 50 is coupled to the circuit. A device 38 converts energy into mechanical energy and is coupled to the circuit 18, positioning sensing device 16 and the drive shaft 14. Device 38 is coupled to the energy source 50 to receive energy from the energy source 50, which can be via the circuit 18.

In one embodiment, the intelligent door lock system 10 includes any or all of the following, a face plate 20, ring 32, latches such as wing latches 37, adapters 28 coupled to a drive shaft 14, one or more mounting plates 26, a back plate 30, a power sensing device 46, energy sources, including but not limited to batteries 50, and the like.

In one embodiment (see FIG. 1(*c*)), the intelligent door lock system 10 retrofits to an existing lock device 22 already installed and in place at a door 12, and the like. The existing lock device 12 can include one or more of the following elements, drive shaft 14, a lock device 22 with the bolt/lock 24, a mounting plate 26, one or more adapters 28 for different lock devices 22, a back plate 30, a plurality of motion transfer devices 34, including but not limited to, gears 34, and the like.

In one embodiment, the memory of engine/processor 36 includes states of the door 12. The states are whether the door 12 is a left handed mounted door, or a right handed mounted door, e.g, opens from a left side or a right side relative to a door frame. The states are used with the position sensing device 16 to determine via the engine/processor 36 if the lock device 22 is locked or unlocked.

In one embodiment, the engine/processor 36 with the circuit 18 regulates the amount of energy that is provided from energy source 50 to the motor 38. This thermally protects the motor 38 from receiving too much energy and ensures that the motor 38 does not overheat or become taxed.

FIG. 1(*d*) illustrates various embodiments of the positioning sensing device 16 coupled to the drive shaft 14.

A variety of position sensing devices 16 can be used, including but not limited to, accelerometers, optical encoders, magnetic encoders, mechanical encoders, Hall Effect sensors, potentiometers, contacts with ticks, optical camera encoders, and the like.

As a non-limiting example, an accelerometer 16, well known to those skilled in the art, detects acceleration. The accelerometer 16 provides a voltage output that is proportional to a detected acceleration. Suitable accelerometers 16 are disclosed in, U.S. Pat. Nos. 8,347,720, 8,544,326, 8,542, 189, 8,522,596. EP0486657B1, EP 2428774 A1, incorporated herein by reference.

In one embodiment, the position sensing device 16 is an accelerometer 16. Accelerometer 16 includes a flex circuit coupled to the accelerometer 16. The accelerometer reports X, Y, and X axis information to the engine/processor 36 of the drive shaft 14. The engine/processor 36 determines the orientation of the drive shaft 14, as well as door knocking, bolt/lock 24 position, door 12 close/open (action) sensing, manual key sensing, and the like, as more fully explained hereafter.

Suitable optical encoders are disclosed in U.S. Pat. Nos. 8,525,102, 8,351,789, and 8,476,577, incorporated herein by reference.

Suitable magnetic encoders are disclosed in U.S. Publication 20130063138, U.S. Pat. No. 8,405,387, EP2579002A1, EP2642252 A1, incorporated herein by reference.

Suitable mechanical encoders are disclosed in, U.S. Pat. No. 5,695,048, and EP2564165A2, incorporated herein by reference.

Suitable Hall Effect sensors are disclosed in, EP2454558B1 and EP0907068A1, incorporated herein by reference.

Suitable potentiometers are disclosed in, U.S. Pat. No. 2,680,177, EP1404021A3, CA2676196A1, incorporated herein by reference.

In various embodiments, the positioning sensing device 16 is coupled to the drive shaft 14 by a variety of means, including but not limited to the adapters 28. In one embodiment, the position sensing device 16 uses a single measurement, as defined herein, of drive shaft 14 position sensing which is used to determine movement in order the determine the location of the drive shaft 14 and the positioning sensing device 16. The exact position of the drive shaft 14 can be measured with another measurement without knowledge of any previous state. Single movement, which is one determination of position sensing, is the knowledge of whether the door 12 is locked, unlocked or in between. One advantage of the accelerator is that one can determine position, leave if off, come back at a later time, and the accelerometer 16 will know its current position even if it has been moved since it has been turned off. It will always know its current position.

In one embodiment, the positioning sensing device 16 is directly coupled to the drive shaft 14, as illustrated in FIG. 1(*d*). Sensing position of the positioning sensing device 16 is tied to the movement of the drive shaft 14. In one embodiment with an accelerometer 16, the accelerometer 16 can detect X, Y and Z movements. Additional information is then obtained from the X, Y, and Z movements. In the X and Y axis, the position of the drive shaft 14 is determined; this is true even if the drive shaft 14 is in motion. The Z axis is used to detect a variety of things, including but not limited to, door 12 knocking, picking of the lock, break-in and unauthorized entry, door 12 open and closing motion. If a mobile device 201 is used to open or close, the processor 36 determines the lock state.

In one embodiment, the same positioning sensing device 16 is able to detect knocks by detecting motion of the door 12 in the Z axis. As a non-limiting example, position sensing is in the range of counter and dock wise rotation of up to 180 degrees for readings. The maximum rotation limit is limited by the position sensing device 16, and more particularly to the accelerometer cable. In one embodiment, the result is sub 1° resolution in position sensing. This provides a higher lifetime because sampling can be done at a slower rate, due to knowing the position after the position sensing device 16 has been turned off for a time period of no great 100 milli seconds. With the present invention, accuracy can be enhanced taking repeated measurements. With the present invention, the positioning sensing device 16, such as the accelerometer, does not need to consume additional power beyond what the knock sensing application already uses.

In one embodiment, the position sensing device 16 is positioned on the drive shaft 14, or on an element coupled to the drive shaft 14. In one embodiment, a position of the drive shaft 14 and power sensing device and/or a torque limited link 38 are known. When the position of the drive shaft 14 is known, it is used to detect if the bolt/lock 24 of a door lock device 22 is in a locked or unlocked position, as well as a depth of bolt/lock 24 travel of lock device 22, and the like. This includes but is not limited to if someone, who turned the bolt/lock 24 of lock device 22 from the inside using the ring 32, used the key to open the door 12, if the door 12 has been kicked down, attempts to pick the bolt/lock 24, bangs on the door 12, knocks on the door 12, opening and closing motions of the door 12 and the like. In various embodiments, the intelligent door lock system 10 can be interrogated via hardware, including but not limited to a key, a mobile device, a computer, key fob, key cards, personal fitness devices, such as fitbit®, nike fuel, jawbone up, pedometers, smart watches, smart jewelry, car keys, smart glasses, including but not limited to Google Glass, and the like.

During a power up mode, the current position of the drive shaft 14 is known.

Real time position information of the drive shaft 14 is determined and the bolt/lock 24 of lock device 22 travels can be inferred from the position information of the drive shaft 14. The X axis is a direction along a width of the door 12, the axis is in a direction along a length of a door 12, and the Z axis is in a direction extending from a surface of the door 12.

In one embodiment, the accelerometer 16 is the knock sensor. Knocking can be sensed, as well as the number of times a door 12 is closed or opened, the physical swing of the door 12, and the motion the door 12 opening and closing. With the present invention, a determination is made as to whether or not someone successfully swung the door 12, if the door 12 was slammed, and the like. Additionally, by coupling the position sensing device 16 on the moveable drive shaft 14, or coupled to it, a variety of information is provided, including but not limited to, if the bolt/lock 24 is stored in the correct orientation, is the door 12 properly mounted and the like.

In one embodiment, a calibration step is performed to determine the amount of drive shaft 14 rotations to fully lock and unlock the bolt/lock 24 of lock device 22. The drive shaft 14 is rotated in a counter-counter direction until it can no longer rotate, and the same is then done in the clock-wise direction. These positions are then stored in the engine memory. Optionally, the force is also stored. A command is then received to rotate the drive shaft 14 to record the amount of rotation. This determines the correct amount of drive shaft 14 rotations to properly lock and unlock the lock device 22.

In another embodiment, the drive shaft 14 is rotated until it does not move anymore. This amount of rotation is then stored in the memory and used for locking and unlocking the lock device 22.

In another embodiment, the drive shaft 14 is rotated until it does not move anymore. However, this may not provide the answer as to full lock and unlock. It can provide information as to partial lock and unlock. Records from the memory are then consulted to see how the drive shaft 14 behaved in the past. At different intervals, the drive shaft 14 is rotated until it does not move anymore. This is then statistically analyzed to determine the amount of drive shaft 14 rotation for full locking and unlocking. This is then stored in the memory.

In one embodiment, the engine/processor 36 is coupled to at least one wireless communication device 40 that utilizes audio and RF communication to communicate with a wireless device, including but not limited to a mobile device/key fob 210, with the audio used to communicate a security key to the intelligent door lock system 10 from the wireless device 210 and the RF increases a wireless communication range to and from the at least one wireless communication device 40. In one embodiment, only one wireless communication device 40 is used for both audio and RF. In another embodiment, one wireless communication device 40 is used for audio, and a second wireless communication device 40 is used for RF. In one embodiment, the bolt/lock 22 is included in the intelligent door lock system 10. In one embodiment, the audio communications initial set up information is from a mobile device/key fob 210 to the intelligent door lock system 10, and includes at least one of, SSID WiFi, password WiFi, a Bluetooth key, a security key and door configurations.

In one embodiment, an audio signal processor unit includes an audio receiver, a primary amplifier circuit, a secondary amplifier circuit, a current amplifier circuit, a wave detection circuit, a switch circuit and a regulator circuit. In one embodiment, the audio receiver of each said audio signal processor unit is a capacitive microphone. In one embodiment, the switch circuit of each audio signal processor unit is selected from one of a transistor and a diode. In one embodiment, the regulator circuit of each audio signal processor unit is a variable resistor. In one embodiment, the audio mixer unit includes a left channel mixer and a right channel mixer. In one embodiment, the amplifier unit includes a left audio amplifier and a right audio amplifier. In one embodiment, the Bluetooth device includes a sound volume control circuit with an antenna, a Bluetooth microphone and a variable resistor, and is electrically coupled with the left channel mixer and right channel mixer of said audio mixer unit. Additional details are in U.S. Publication US20130064378 A1, incorporated fully herein by reference.

In one embodiment, the faceplate 20 and/or ring 32 is electrically isolated from the circuit 18 and does not become part of circuit 18. This allows transmission of RF energy through the faceplate 20. In various embodiments, the faceplate and/or ring are made of materials that provide for electrical isolation. In various embodiments, the faceplate 20, and/or the ring 32 are at ground. As non-limiting examples, (i) the faceplate 20 can be grounded and in non-contact with the ring 32, (ii) the faceplate 20 and the ring 32 are in non-contact with the ring 32 grounded, (iii) the faceplate 20 and the ring can be coupled, and the ring 32 and the faceplate 20 are all electrically isolated from the circuit 18. In one embodiment, the ring 32 is the outer enclosure to the faceplate 20, and the bolt/lock 24 and lock device 22 is at least partially positioned in an interior defined by the ring 32 and the faceplate 20.

In one embodiment, the lock device 22 has an off center drive mechanism relative to the outer periphery that allows up to R displacements from a center of rotation of the bolt/lock 24 of lock device 22, where R is a radius of the bolt/lock 24, 0.75 R displacements, 0.5 R displacements, and the like, as illustrated in FIG. 1(*e*). The off center drive mechanism provides for application of mechanical energy to the lock device 22 and bolt/lock 22 off center relative to the outer periphery.

As illustrated in FIG. 1(*f*) in one embodiment, a wireless communication bridge 41 is coupled to a first wireless communication device 40 that communicates with Network Systems via a device, including but not limited to a router, a 3G device, a 4G device, and the like, as well as mobile device 210. The wireless communication bridge 41 is also coupled to a second wireless communication device 40 that is coupled to the processor 38, circuit 18, positioning sensing device 16, motor 38 and the lock device 22 with bolt/lock 24, and provides for more local communication. The first wireless communication device 40 is in communication with the second wireless communication device 40 via bridge 41. The second wireless communication device 40 provides local communication with the elements of the intelligent door lock system 10. In one embodiment, the second communication device 45 is a Bluetooth device. In one embodiment, the wireless communication bridge 41 includes a third wireless communication device 40. In one embodiment, the wireless communication bridge 41 includes two wireless communication devices 40, e.g, and third and fourth wireless communication devices 40. In one embodiment, the wireless communication bridge 41 includes a WiFi wireless communication device 40 and a Bluetooth wireless communication device 40.

FIG. 1(*g*) illustrates various elements that are coupled to the circuit 18 in one embodiment of the present invention.

In one embodiment of the present invention, a haptic device 49 is included to provide the user with haptic feedback for the intelligent door lock system 10, see FIG. 1(*g*). The haptic device is coupled to the circuit 18, the processor 38, and the like. In one embodiment, the haptic device provides a visual indication that the bolt/lock 24 of lock device 22 has reach a final position. In another embodiment, the haptic device 49 provides feedback to the user that the bolt/lock 24 of lock device 22 has reached a home open position verses a final position so the user does not over-torque. A suitable haptic device 49 is disclosed in U.S. Publication No. 20120319827 A1, incorporated herein by reference.

In one embodiment, the wing latches 37 are used to secure the intelligent door lock system 10 to a mounting plate 26 coupled to the door 12. In one embodiment, the wing latches 37 secure the intelligent door lock system 10 to a mounting plate 26 coupled to a door 12 without additional tools other than the wing latches 37.

FIG. 1(*g*) illustrates one embodiment of circuit 18, as well as elements that includes as part of circuit 18, or coupled to circuit 18, as discussed above.

FIGS. 2(*a*)-(*c*) illustrate front and back views of one embodiment of circuit 18, and the positioning of circuit 18 in the intelligent door lock system 10. FIGS. 2(*d*)-(*e*) illustrate an embodiment of non-wire, direct connection between PCBAs. FIG. 2 (*e*) shows the relative positioning of a PCBA in the intelligent door lock device 10.

In one embodiment, the main circuit 18 is coupled to, the engine 36 with a processor and memory, the motor 38, wireless communication device 40 such as a WiFi device including but not limited to a Bluetooth device with an antenna, position sensing device 16, speaker (microphone) 17, temperature sensor 42, battery voltage sensor 44, current sensor or power sensor 46 that determines how hard the motor 38 is working, a protection circuit to protect the motor from overheating, an LED array 48 that reports status and one or more batteries 50 that power circuit 18, see FIG. 1(*g*).

The current sensor 46 monitors the amount of current that goes to the motor 38 and this information is received and processed by the engine/processor 36 with memory and is coupled to the circuit 18. The amount of current going to the motor 38 is used to determine the amount of friction experienced by door 12 and/or lock device 22 with lock/bolt 24 in opening and/or closing, as applied by the intelligent door lock system 10 and the positioning sensing device 16 to the drive shaft 14. The circuit 18 and engine/processor 36 can provide for an adjustment of current. The engine/processor 36 can provide information regarding the door and friction to the user of the door 12.

FIGS. 3(*a*)-(*d*) illustrate embodiments of LED 48 lighting that can include diffusers, a plurality of LED patterns point upward, inward, and outward and a combination of all three. In one embodiment two control PCDs are provide to compare side by side. Each LED 48 can be independently addressable to provide for maximization of light with the fewest LEDs 48. In one embodiment, an air gap is provided.

FIGS. 4(*a*)-(*d*), illustrate one embodiment of a faceplate 20 and views of the housing 32 and faceplate 20.

Figure 5A:
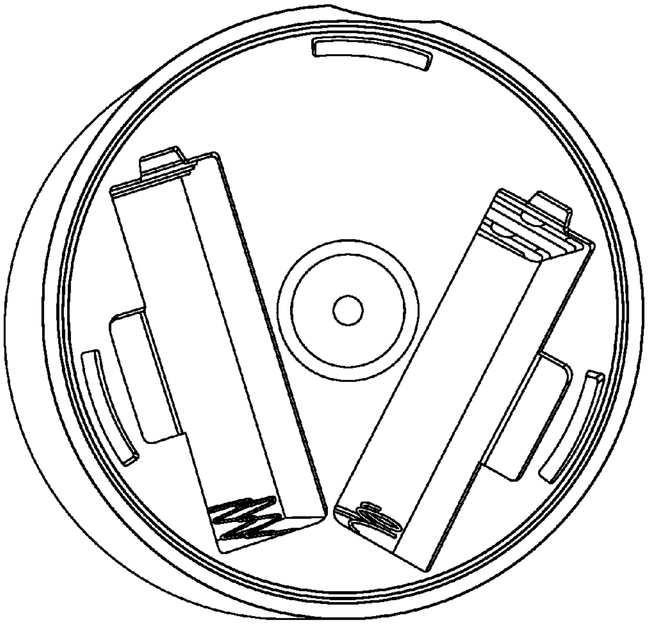
FIGS. 5(*a*) and (*b*) illustrate the rotation range, with a minimized slot length of a faceplate lock that can be used in one embodiment of the present invention.
Figure 5B:
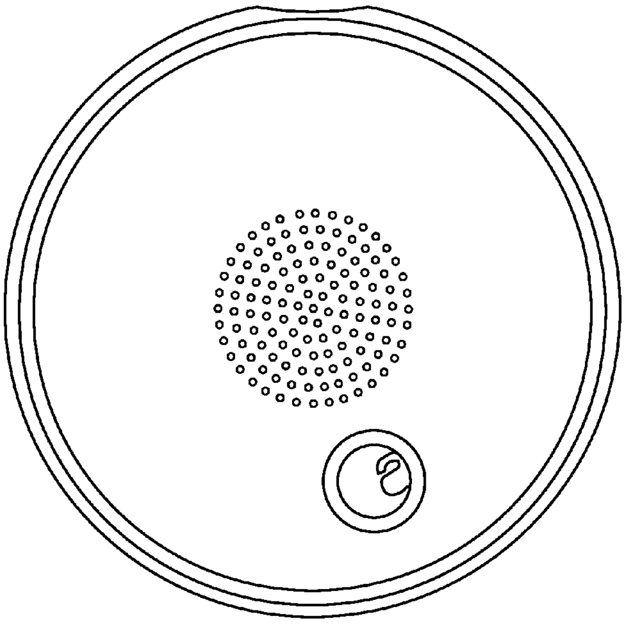

FIGS. 5(*a*) and (*b*) illustrate the rotation range of the ring 32, with a minimized slot length of a bolt/lock 24 of lock device 22 in one embodiment of the present invention. In one embodiment, there is a 1:1 relationship of ring 32 and shaft rotation. In other embodiments, the ratio can change. This can be achieved with gearing. In various embodiments, the bolt/lock 24 and/or lock device 22 can have a rotation of 20-5 and less turns clockwise or counterclockwise in order to open the door 12. Some lock devices 22 require multiple turns.

Figure 6A:
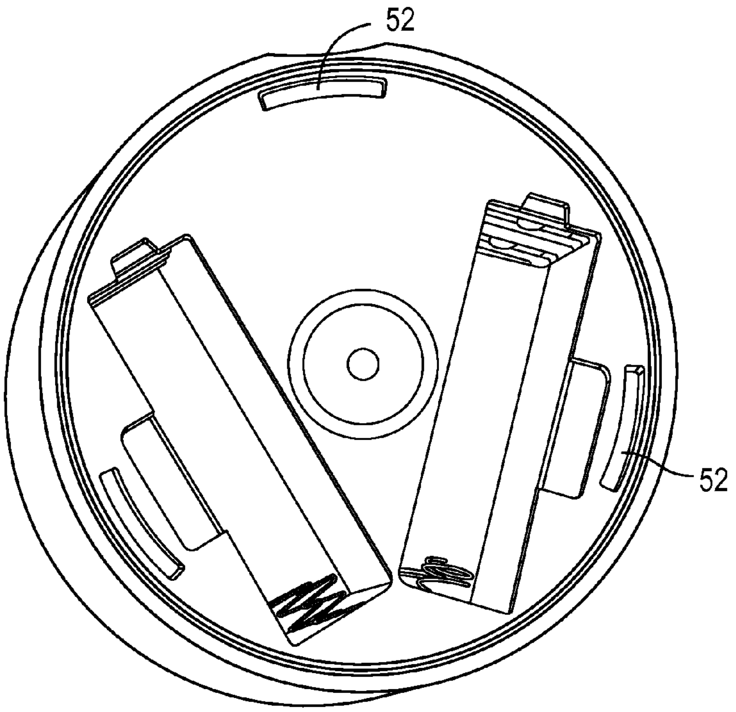
FIGS. 6(*a*) and (*b*) illustrate hook slots that can be used with the present invention.
Figure 6B:
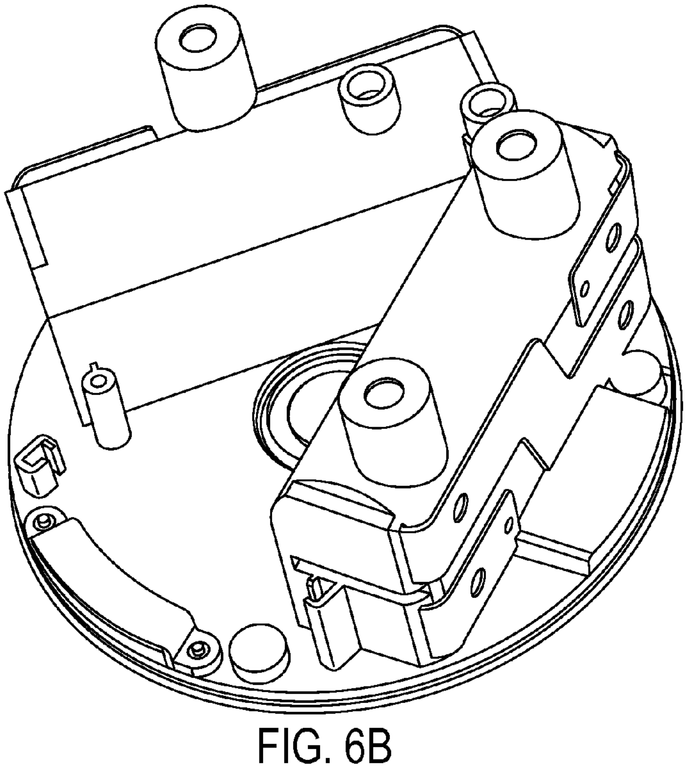
Figure 7A:
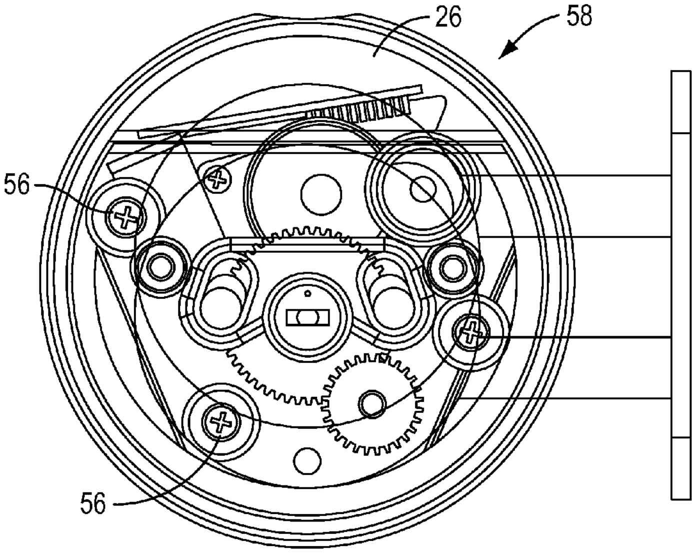
FIGS. 7(*a*) through (*e*) illustrate one embodiment of a mount, with attachment to the mounting plate that can be used with the present invention.
Figure 7B:
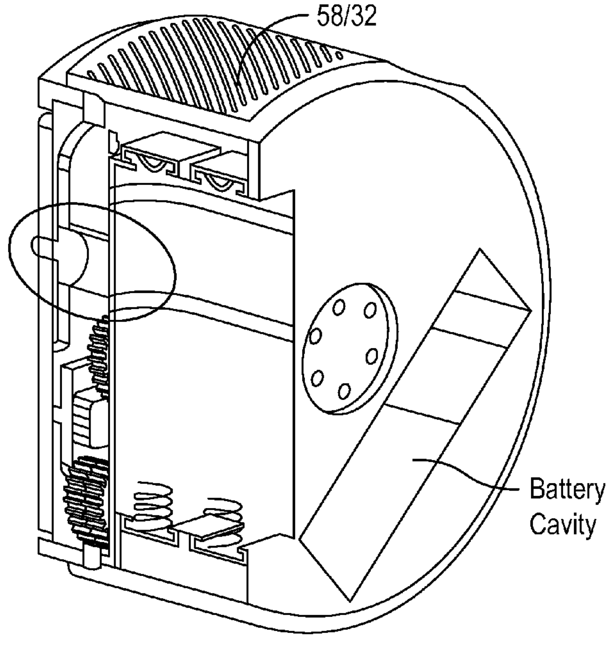
Figure 7C:
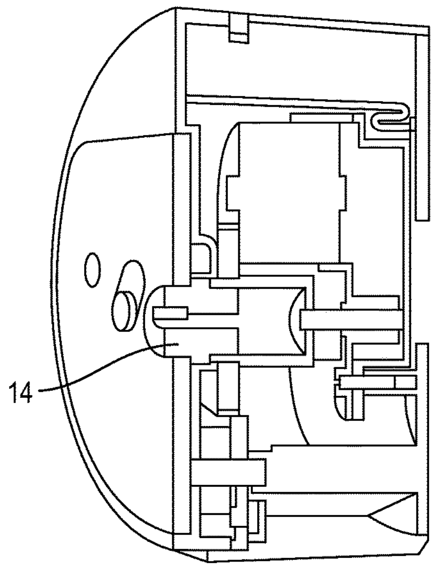
Figure 7D:
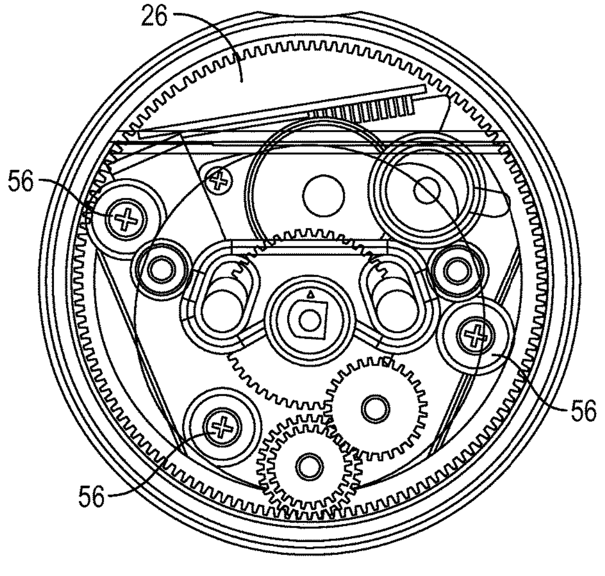
Figure 7E:
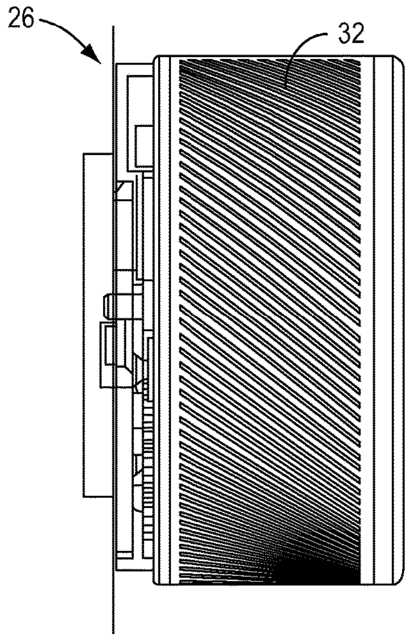

FIGS. 6(*a*) and (*b*), with front and back views, illustrate hook slots 52 that can be used with the present invention.

FIGS. 7(*a*) through (*f*) illustrate an embodiment of a mount 54, with attachment to the mounting plate 26. Screws 56 are captured in the housing 58, and/or ring 32 and accessed through a battery cavity. A user can open holes for access and replace the screws 56. In one embodiment, the screws extend through the mounting plate 26 into a door hole. In one embodiment, a height of the mounting plate 26 is minimized. During assembly, the lock device 22 is held in place, FIG. 7(*c*), temporarily by a top Up. FIG. 7(*d*) and the lock drive shaft 14.

Figure 8A:
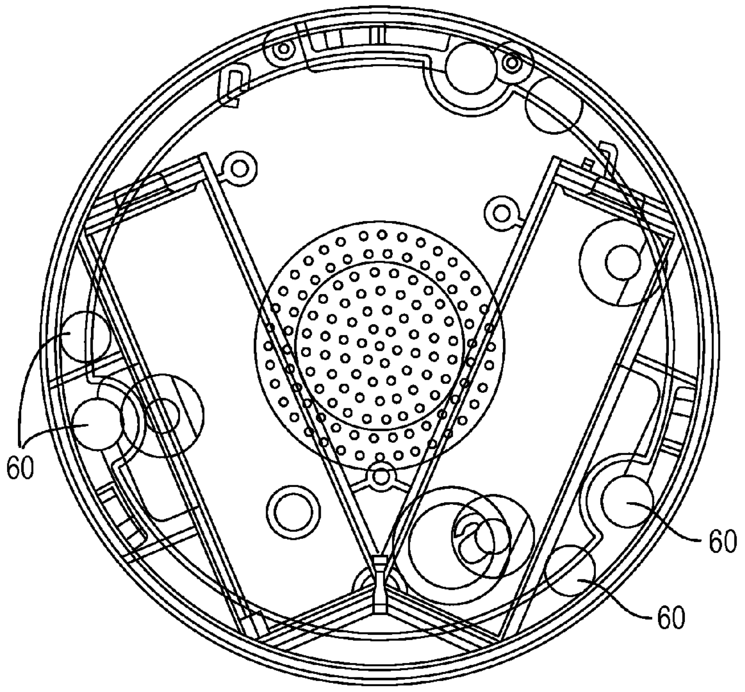
FIGS. 8(*a*)-(*b*) illustrate embodiments of the present invention where magnets are utilized.
Figure 8B:
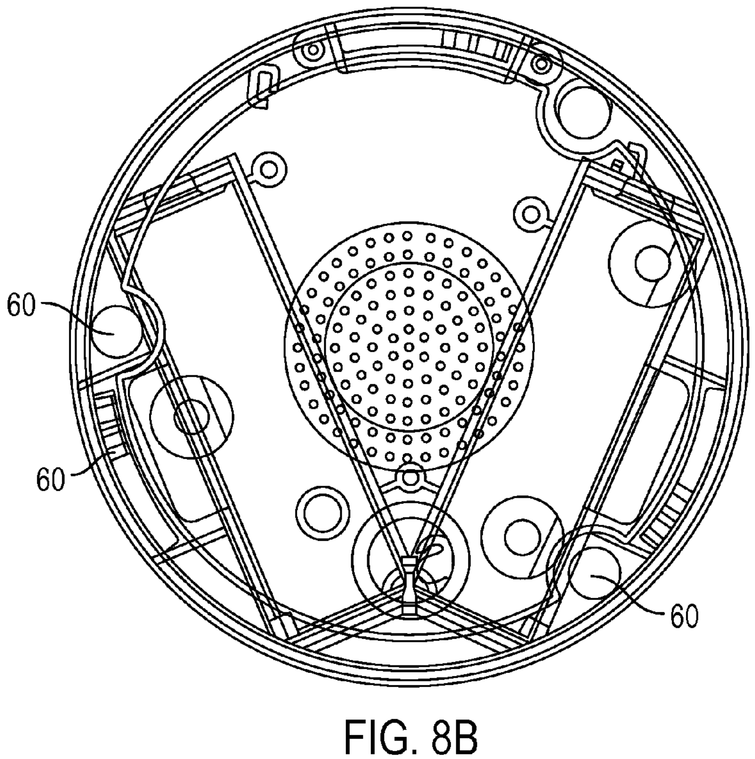
Figure 9A:
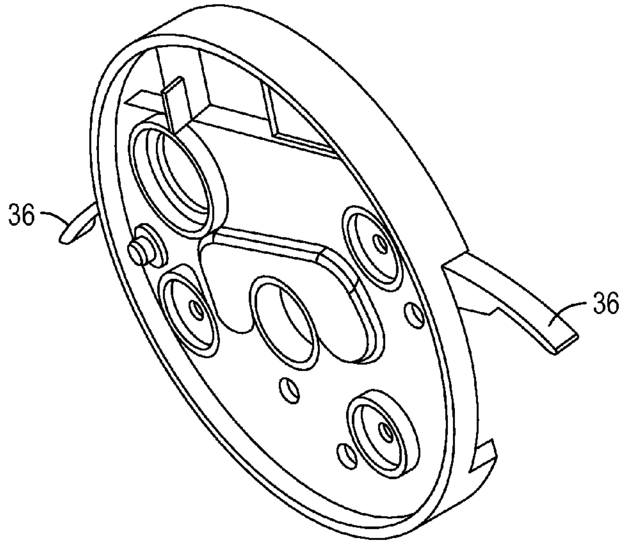
FIGS. 9(*a*)-(*e*) illustrate embodiments of the present invention with wing latches.
Figure 9B:
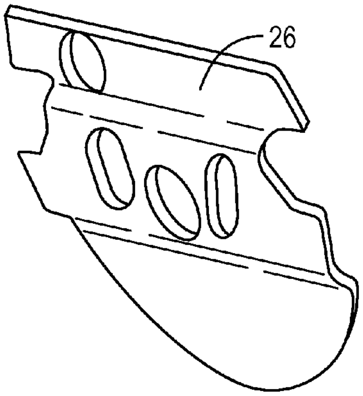
Figure 9C:
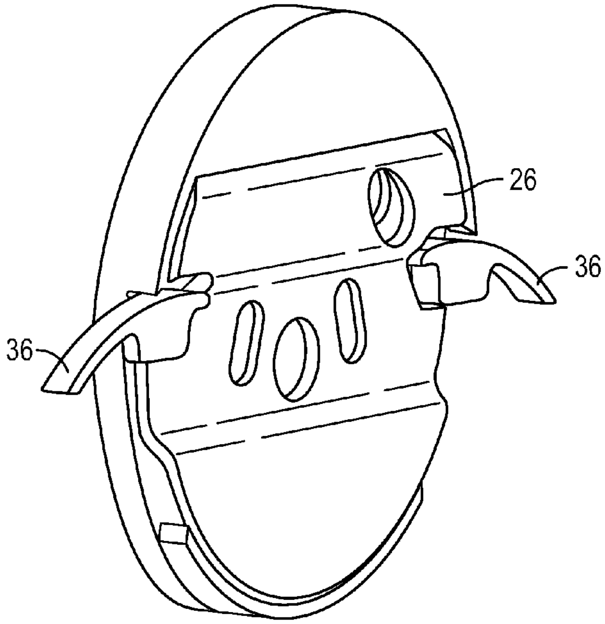
Figure 9E:
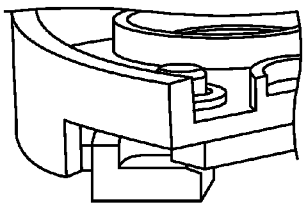
Figure 9D:
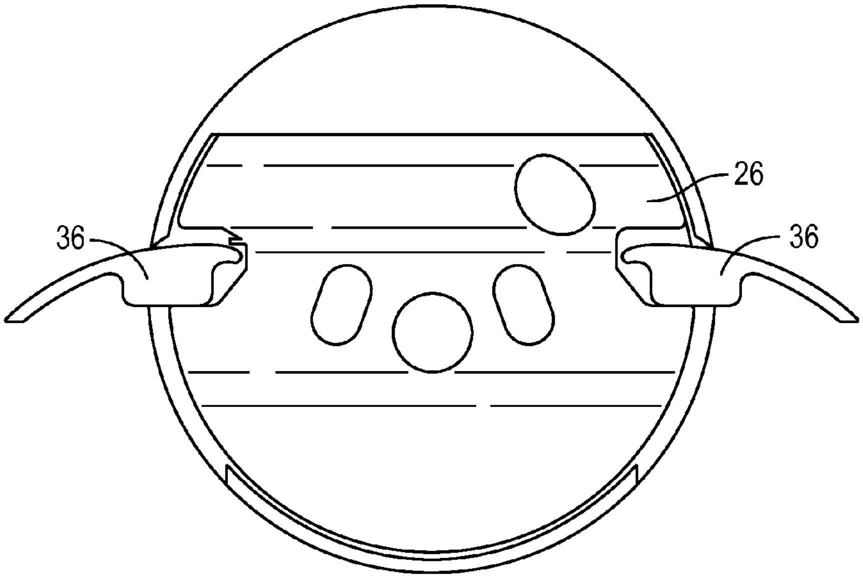

FIGS. 8(*a*)-(*b*) illustrate embodiments where magnets 60 are utilized. The magnet 60 locations are illustrated as are the tooled recesses from the top and side. In one embodiment, the magnets 60 are distanced by ranges of 1-100 mm, 3-90, 5-80 mm apart and the like.

FIGS. 9(*a*)-(*e*) illustrate embodiments of the present invention with wing latches 36. The wing latches 36 allow for movement of the lock device 22 with bolt/lock 24 towards its final position, in a Z-axis direction towards the door 12. Once the lock device 22 with bolt/lock 24 is in a final position, the wing latches 36 allows for the secure mounting without external tools. The wing latches 36 do the mounting. Wing latches 36 enable mounting of the lock device 22 and bolt/lock 24 with use of only the Z axis direction only, and X and Y directionality are not needed for the mounting.

In one embodiment, a lead in ramp, FIG. 9 (*e*) is used to pull the elements together.

Figure 10A:
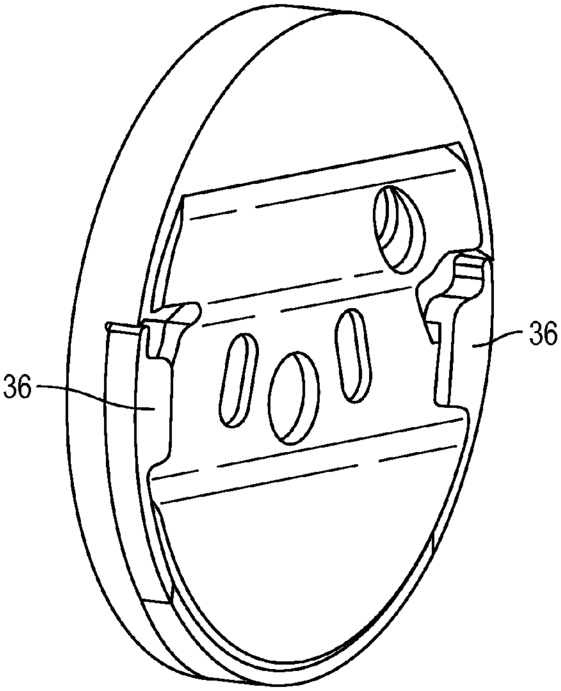
FIGS. 10(*a*)-(*c*) and FIGS. 11(*a*)-(*d*) illustrate further details of wing latching that is used in certain embodiments of the present invention.
Figure 10B:
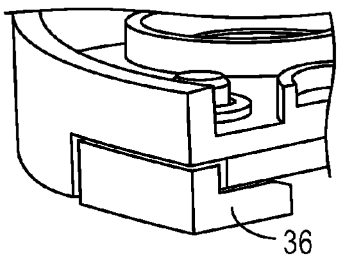
Figure 10C:
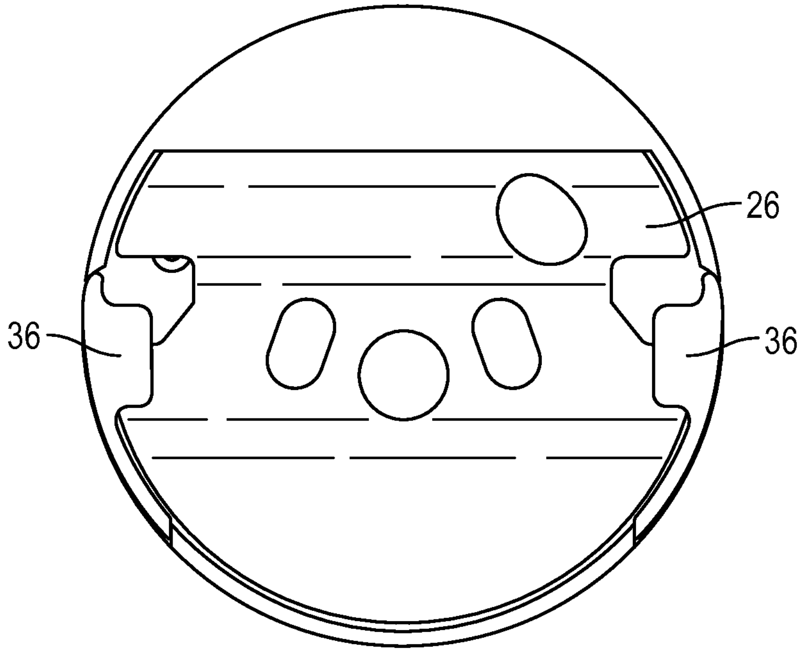
Figure 11A:
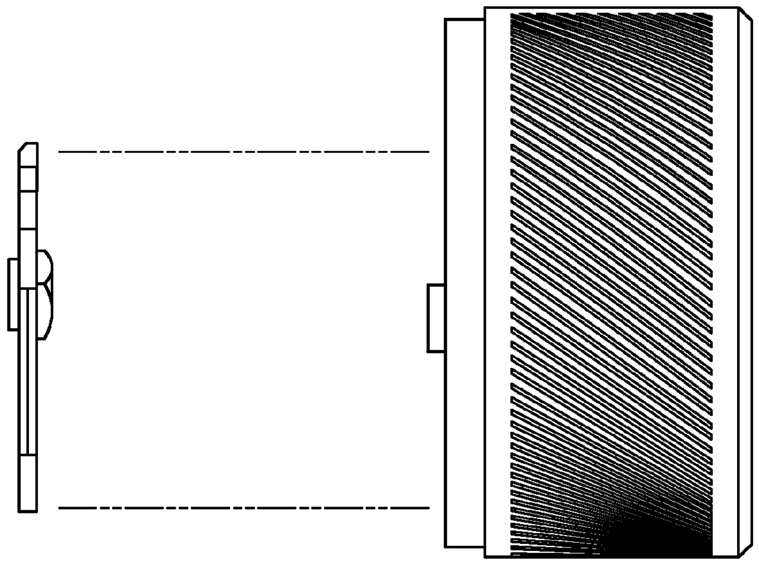
Figure 11B:
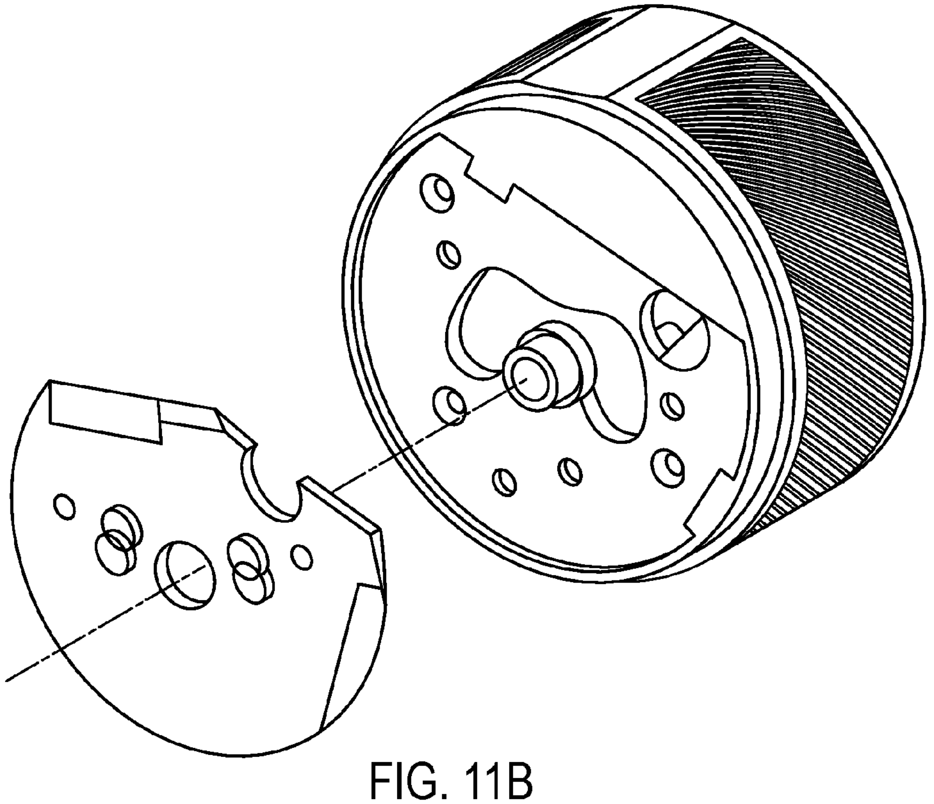
Figure 11C:
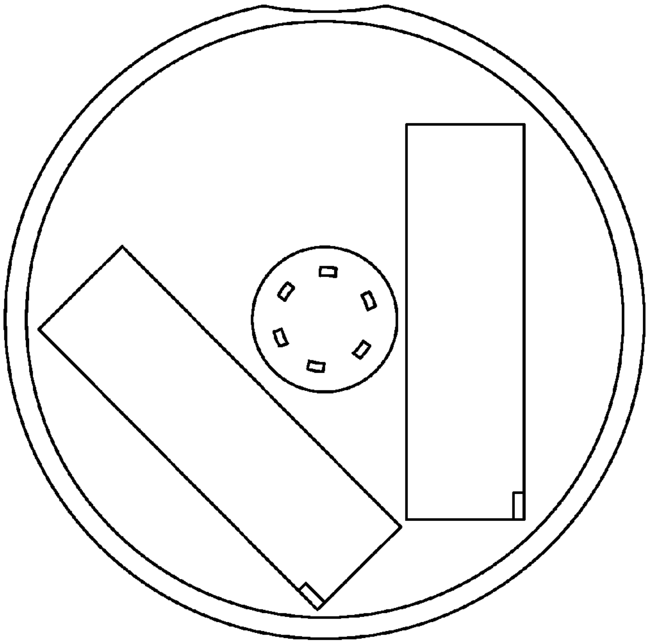
Figure 11D:
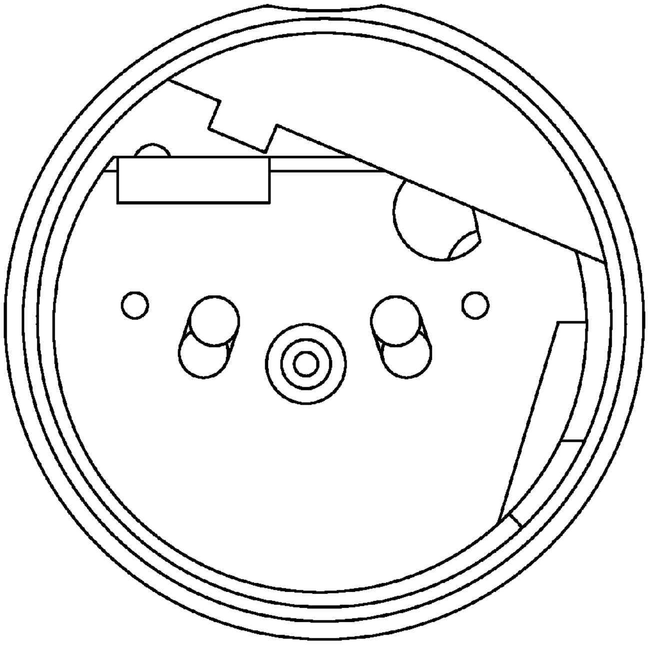
Figure 12A:
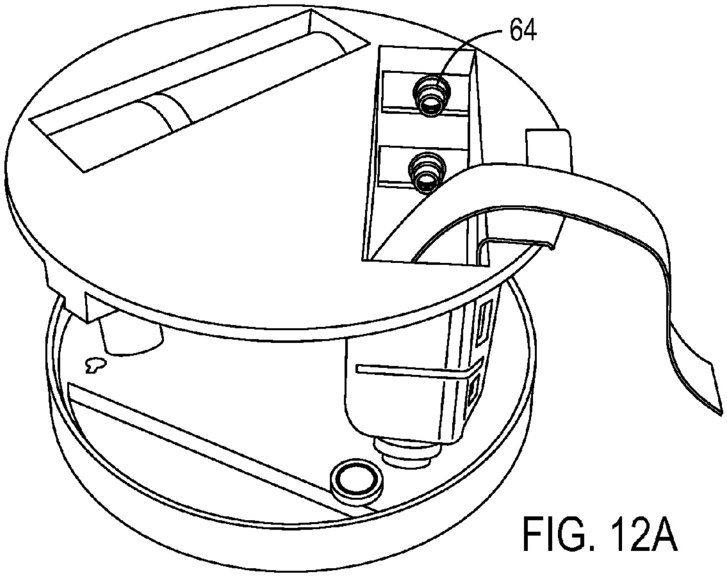
FIGS. 12(*a*)-(*d*) illustrate embodiments of battery contacts that can be used with the present invention.
Figure 12B:
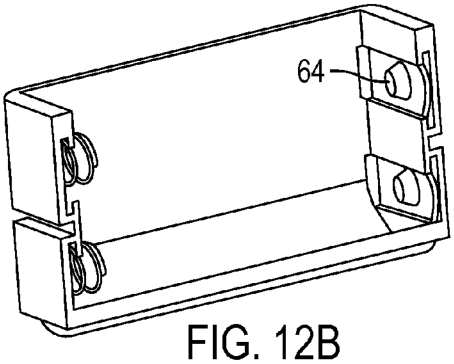
Figure 12C:
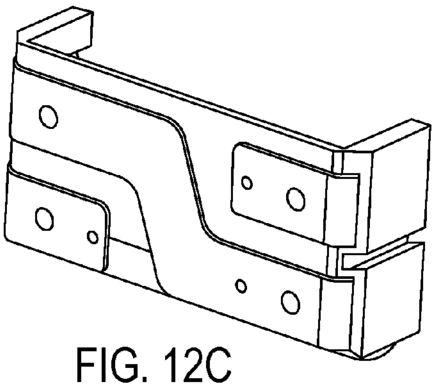
Figure 12D:
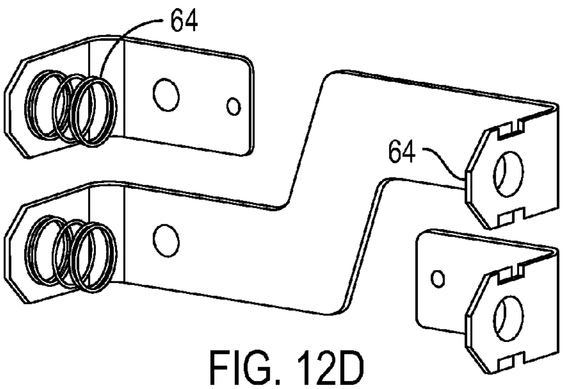

FIGS. 10(*a*)-(*c*) and FIGS. 11(*a*)-(*d*) illustrate further details of wing latching.

FIGS. 12(*a*)-(*d*) illustrate embodiments of battery contacts 64.

Figure 13A:
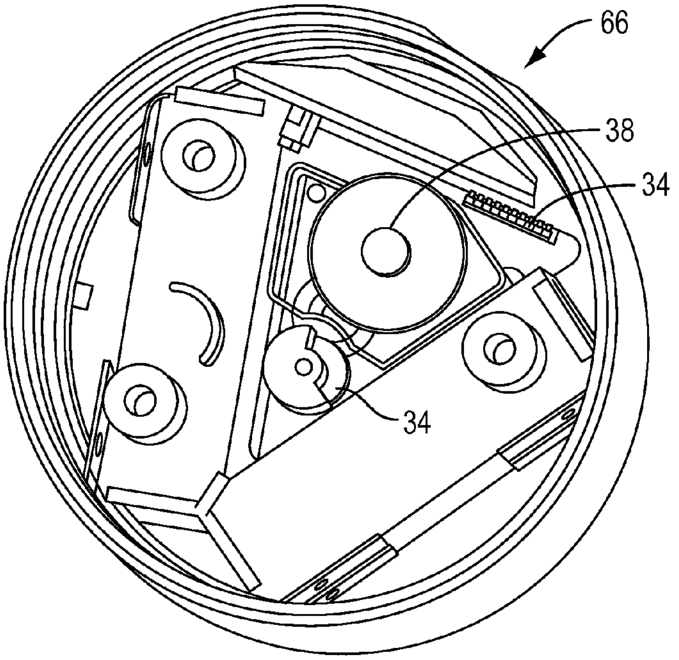
FIGS. 13(*a*) and (*b*) illustrate embodiments of a motor and gears in one embodiment of the present invention.
Figure 13B:
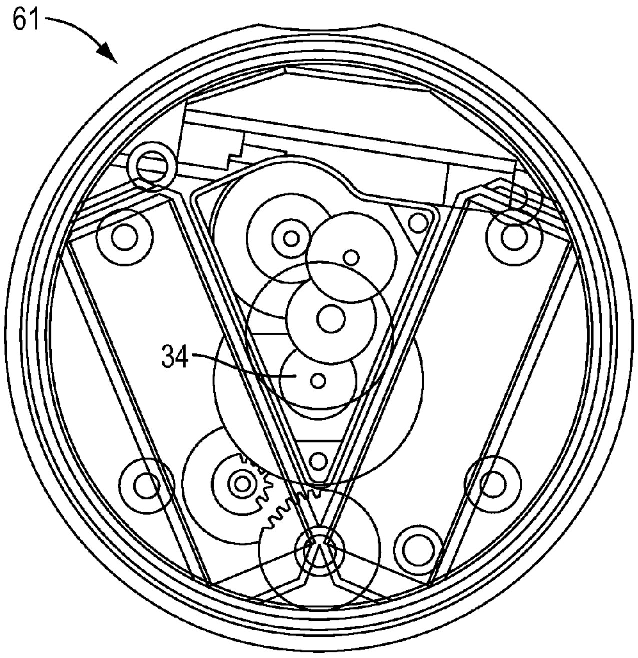

FIGS. 13(*a*) and (*b*) illustrate embodiments of motor 38 and one or more gears 34, with a gearbox 66. In one embodiment, a first gear 34 in sequence takes a large bad if suddenly stopped while running.

Figure 14:
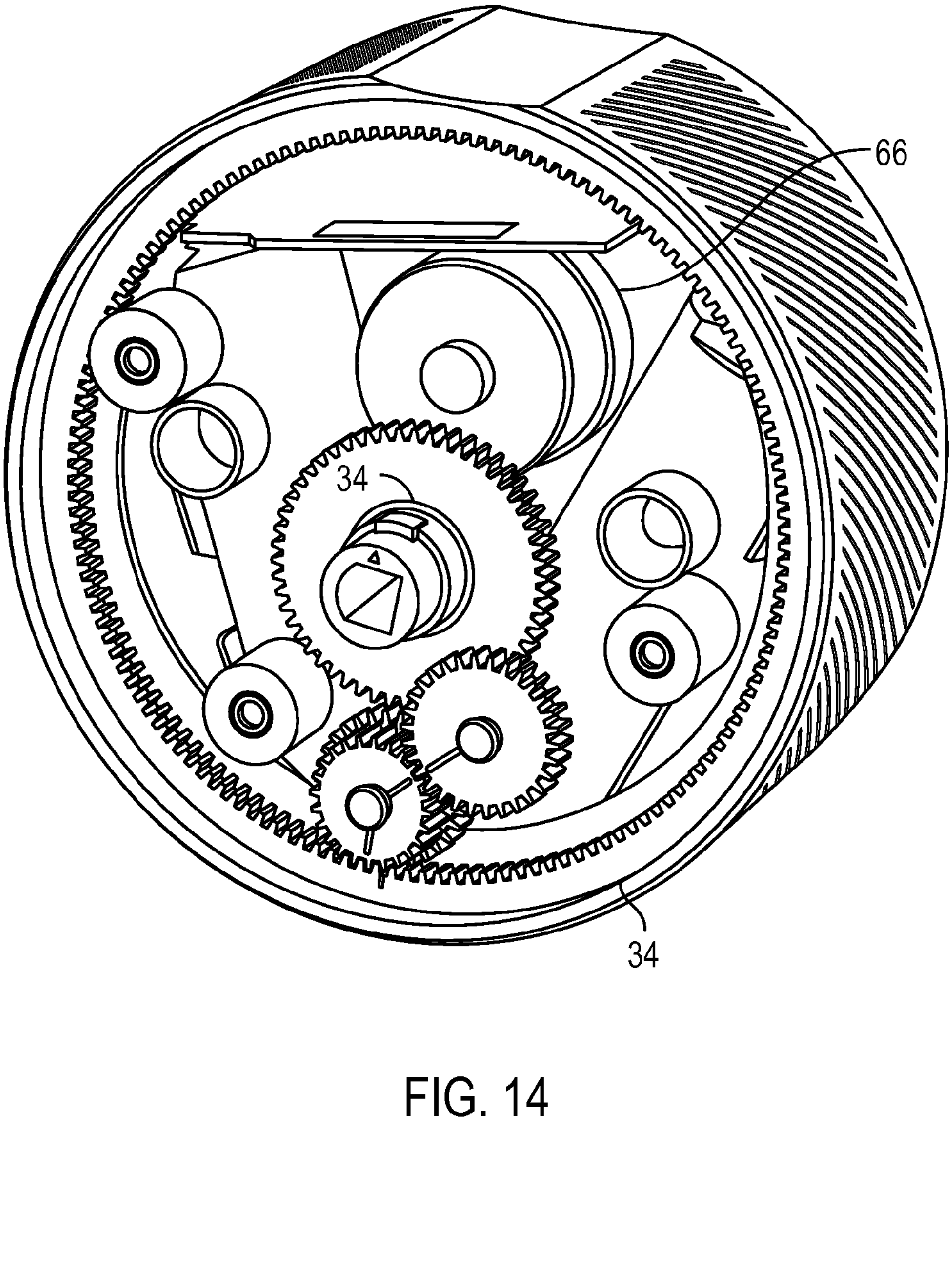
FIG. 14 illustrates an embodiment of the plurality of motion transfer device, including but not limited to gears, used in one embodiment of the present invention.
Figure 15A:
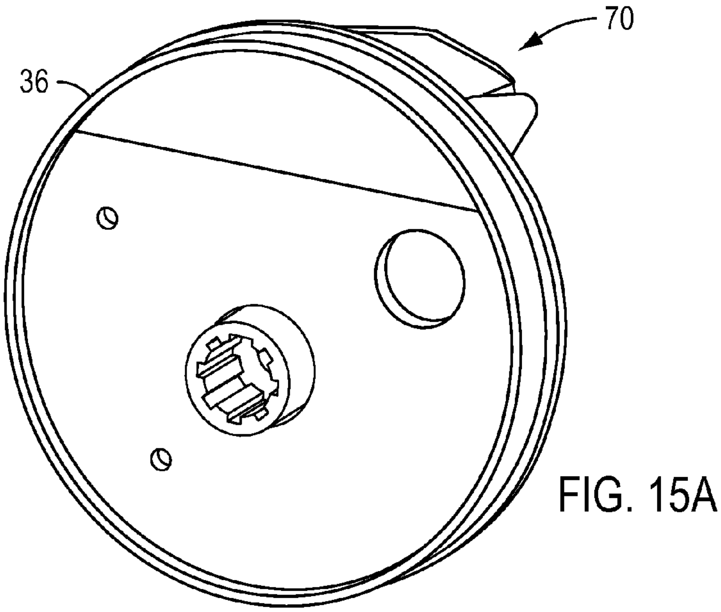
FIGS. 15(*a*)-(*b*) illustrate an embodiment of a speaker mounting.
Figure 15B:
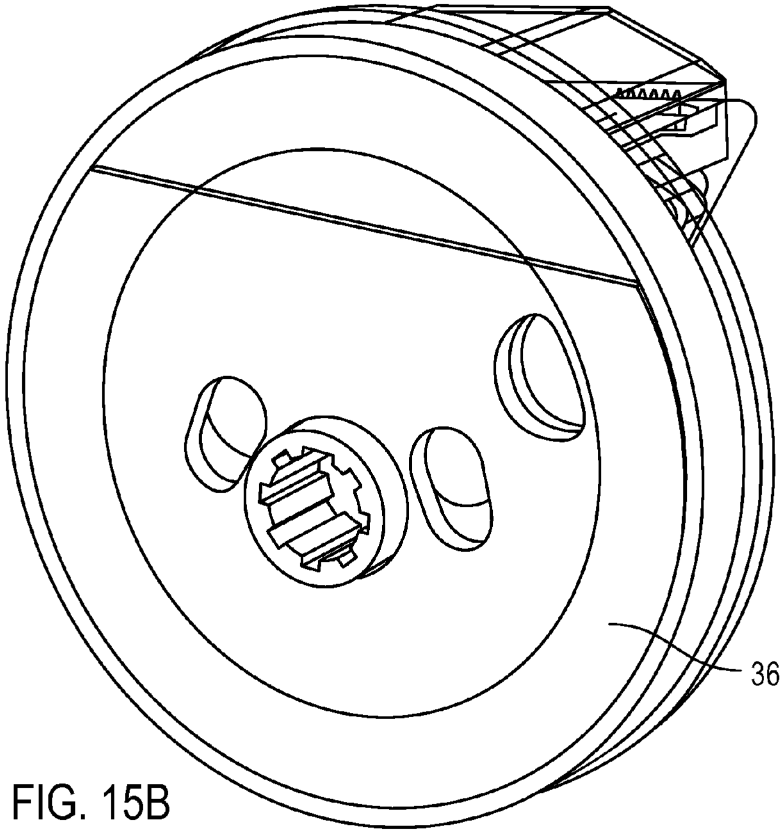
Figure 15C:
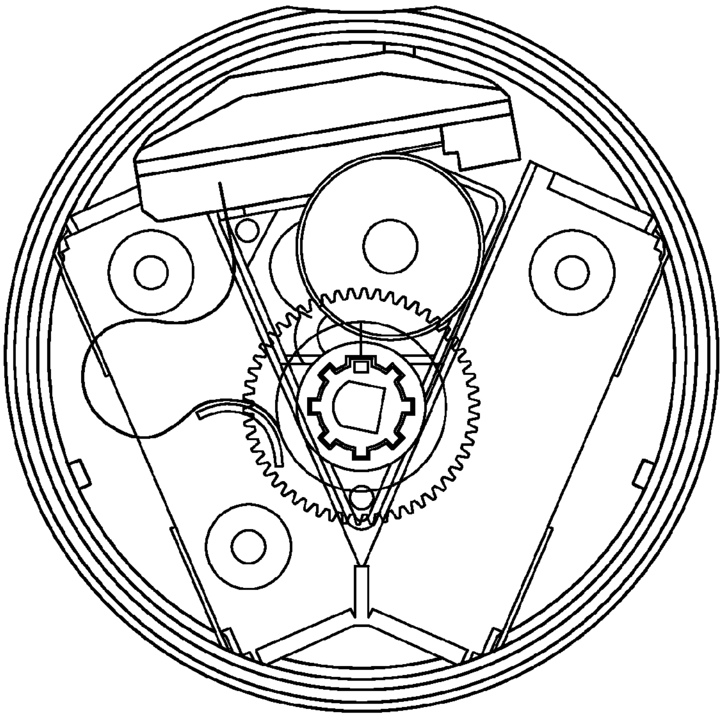
Figure 15D:
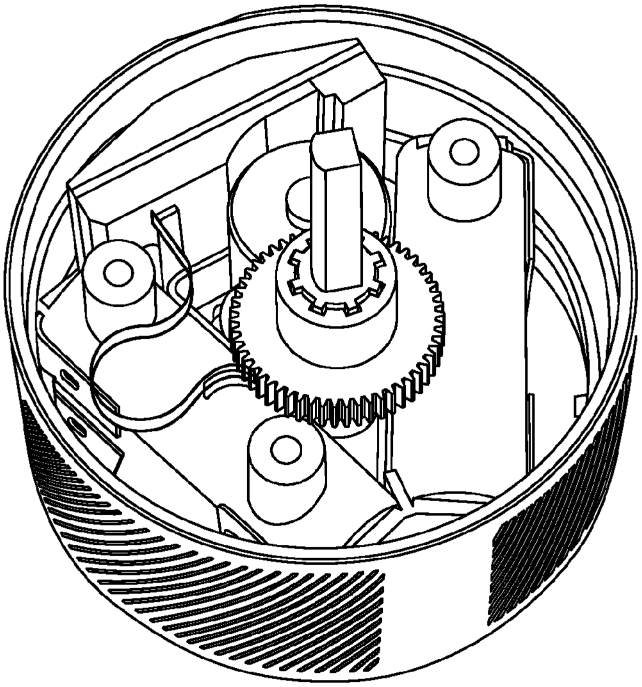

FIG. 14 illustrates an embodiment of a plurality of motion transfer devices such as gears 34. There can be come backlash in a gear train as a result of fits and tolerances. There can also be play between adapters 28 and lock drive shafts 14. This can produce play in an out gearbox 66 ring. This can be mitigated with a detent that located the outer ring.

The intelligent door lock system 10 can be in communication with an intelligent door lock system back-end 68, via Network Systems, as more fully described hereafter.

In one embodiment, the flex circuit 18, which has an out-of plane deflection of at least 1 degree, includes a position detector connector 46, Bluetooth circuit, and associated power points, as well as other elements.

In one embodiment, the intelligent door lock system 10 can use incremental data transfer via Network Systems, including but not limited to BLUETOOTH® and the like. The intelligent door lock system 10 can transmit data through the inductive coupling for wireless charging. The user is also able to change the frequency of data transmission.

In one embodiment, the intelligent door lock system 10 can engage in intelligent switching between incremental and full syncing of data based on available communication routes. As a non-limiting example, this can be via cellular networks, WiFi, BLUETOOTH® and the like.

In one embodiment, the intelligent door lock system 10 can receive firmware and software updates from the intelligent lock system back-end 68.

In one embodiment, the intelligent door lock system 10 produces an output that can be received by an amplifier, and decoded by an I/O decoder to determine 1/0 logic levels, as well as, both clock and data information. Many such methods are available including ratio encoding, Manchester encoding, Non-Return to Zero (NRZ) encoding, or the like; alternatively, a UART type approach can be used. Once so converted, clock and data signals containing the information bits are passed to a memory at the intelligent door lock system 10 or intelligent door lock system back-end 68.

In one embodiment, the intelligent door lock system 10, or associated back-end 68, can includes a repeatable pseudo randomization algorithm in ROM or in ASIC logic.

FIGS. 15(*a*)-(*b*) illustrate an embodiment of a speaker 17 and speaker mounting 70.

FIGS. 15(*c*)-(*d*) illustrate one embodiment of an accelerometer FPC service loop.

Figure 16:
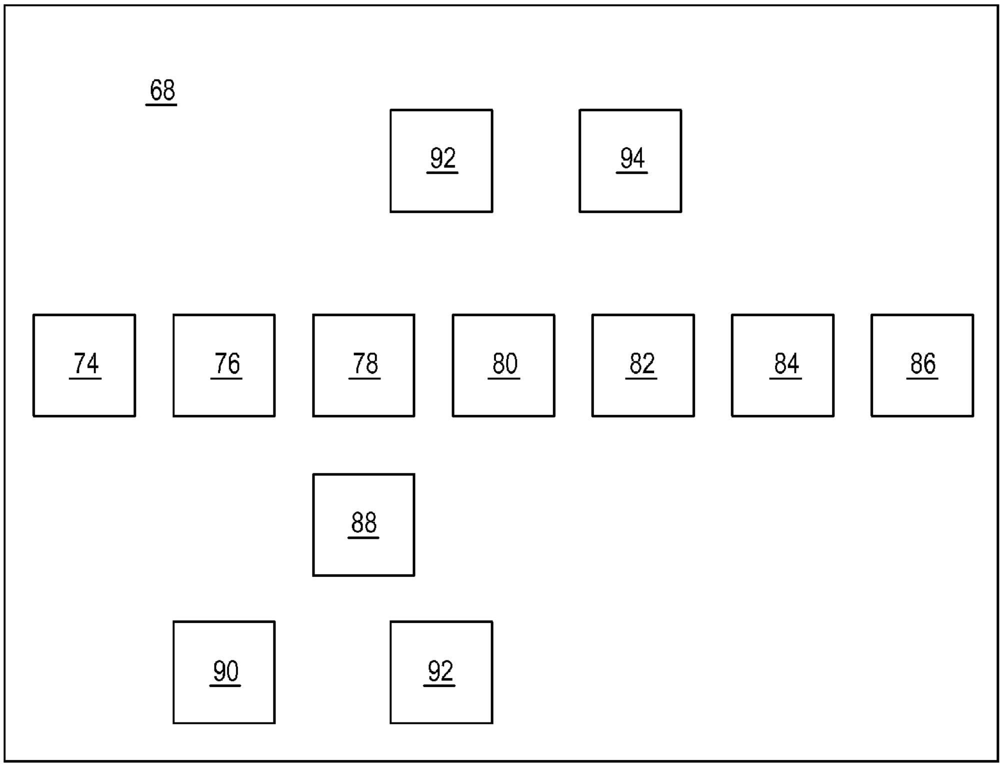
FIG. 16 illustrates one embodiment of a back-end associated with the intelligent door lock system.

As illustrated in FIG. 16, the intelligent door lock system back-end 68 can include one or more receivers 74, one or more engines 76, with one or more processors 78, coupled to conditioning electronics 80, one or more filters 82, one or more communication interfaces 84, one or more amplifiers 86, one or more databases 88, logic resources 90 and the like.

The back-end 68 knows that an intelligent door lock system 10 is with a user, and includes a database with the user's account information. The back-end 68 knows if the user is registered or not. When the intelligent door lock system 10 is powered up, the back-end 68 associated that intelligent door lock system 10 with the user.

The conditioning electronics 80 can provide signal conditioning, including but not limited to amplification, filtering, converting, range matching, isolation and any other processes required to make sensor output suitable for processing after conditioning. The conditioning electronics can provide for, DC voltage and current, AC voltage and current, frequency and electric charge. Signal inputs accepted by signal conditioners include DC voltage and current, AC voltage and current, frequency and electric charge. Outputs for signal conditioning electronics can be voltage, current, frequency, timer or counter, relay, resistance or potentiometer, and other specialized output.

In one embodiment, the one or more processors 78, can include a memory, such as a read only memory, used to store instructions that the processor may fetch in executing its program, a random access memory (RAM) used by the processor 78 to store information and a master dock. The one or more processors 78 can be controlled by a master clock that provides a master timing signal used to sequence the one or more processors 78 through internal states in their execution of each processed instruction. In one embodiment, the one or more processors 78 can be low power devices, such as CMOS, as is the necessary logic used to implement the processor design. Information received from the signals can be stored in memory.

In one embodiment, electronics 92 are provided for use in intelligent door system 10 analysis of data transmitted via System Networks. The electronics 92 can include an evaluation device 94 that provides for comparisons with previously stored intelligent door system 10 information.

Signal filtering is used when the entire signal frequency spectrum contains valid data. Filtering is the most common signal conditioning function, as usually not all the signal frequency spectrum contains valid data.

Signal amplification performs two important functions: increases the resolution of the inputed signal, and increases its signal-to-noise ratio.

Suitable amplifiers 86 include but are not limited to sample and hold amplifiers, peak detectors, log amplifiers, antilog amplifiers, instrumentation amplifiers, programmable gain amplifiers and the like.

Signal isolation can be used in order to pass the signal from to a measurement device without a physical connection. It can be used to isolate possible sources of signal perturbations.

In one embodiment, the intelligent door lock system back-end 68 can provide magnetic or optic isolation. Magnetic isolation transforms the signal from voltage to a magnetic field, allowing the signal to be transmitted without a physical connection (for example, using a transformer). Optic isolation takes an electronic signal and modulates it to a signal coded by light transmission (optical encoding), which is then used for input for the next stage of processing.

In one embodiment, the intelligent door lock system 10 and/or the intelligent door lock system back-end 68 can include Artificial Intelligence (AI) or Machine Learning-grade algorithms for analysis. Examples of AI algorithms include Classifiers, Expert systems, case based reasoning, Bayesian networks, and Behavior based AI, Neural networks, Fuzzy systems, Evolutionary computation, and hybrid intelligent systems.

Information received or transmitted from the back-end 68 to the intelligent door system 10 and mobile device 210 can use logic resources, such as AI and machine learning grade algorithms to provide reasoning, knowledge, planning, learning communication, and create actions.

In one embodiment, AI is used to process information from the intelligent door lock system 10, from mobile device 210, and the like. The back-end 68 can compute scores associated with various risk variables involving the intelligent door lock system 10. These score can be compared to a minimum threshold from a database and an output created. Alerts can be provided to the intelligent door lock system 10, mobile device 210 and the like. The alert can provide a variety of options for the intelligent door lock system 10 to take, categorizations of the received data from the mobile device 210, the intelligent door lock system 10, and the like, can be created. A primary option can be created as well as secondary options.

In one embodiment, data associated with the intelligent door lock system 10 is received. The data can then be pre-processed and an array of action options can be identified. Scores can be computed for the options. The scores can then be compared to a minimum threshold and to each other. A sorted list of the action options based on the comparison can be outputted to the intelligent door lock system 10, the mobile device 210 and the like. Selections can then be received indicating which options to pursue. Action can then be taken. If an update to the initial data is received, the back-end 68 can then return to the step of receiving data.

Urgent indicators can be determined and directed to the intelligent door lock system 10, including unlocking, locking and the like.

Data received by the intelligent door lock system 10 and mobile device 210 can also be compared to third party data sources.

In data evaluation and decision making, algorithm files from a memory can be accessed specific to data and parameters received from the intelligent door lock system 10 and mobile device 210.

Scoring algorithms, protocols and routines can be run for the various received data and options. Resultant scores can then be normalized and weights assigned with likely outcomes.

The intelligent door lock system 10 can be a new lock system mounted to a door 12, with all or most of the elements listed above, or it can be retrofitted over an existing lock device 22.

To retrofit the intelligent door lock system 10 with an existing lock system, the user makes sure that the existing lock device 22 and bolt/lock 24 is installed right-side up. The existing thumb-turn is then removed. With some lock devices 22, additional mounting plates 26 need to be removed and the intelligent door lock system 10 can include replacement screws 56 that are used. The correct mounting plate 26 is then selected. With the existing screws 56 in the thumb-turn, the user sequentially aligns with 1 of 4 mounting plates 26 that are supplied or exist. This assists in determining the correct diameter and replace of the screws 56 required by the bolt/lock 24. The mounting plate 26 is then positioned. The correct adapter 28 is positioned in a center of the mounting plate 26 to assist in proper positioning. Caution is made to ensure that the adapter 28 does not rub the sides of the mounting plate 26 and the screws 56 are then tightened on the mounting plate 26. The intelligent door lock system bolt/lock 24 of lock device 22 is then attached. In one embodiment, this is achieved by pulling out side wing latches 36, sliding the lock device 22 and/or bolt/lock 24 over the adapter 28 and pin and then clamping down the wings 36 to the mounting plate 26. The faceplate is rotated to open the battery compartment and the battery tabs are then removed to allow use of the battery contacts 64. An outer metal ring 32 to lock and unlock the door 12 is then rotated. An app from mobile device 210 and/or key then brings the user through a pairing process.

A door 12 can be deformed, warped, and the like. It is desirable to provide a customer or user, information about the door, e.g., if it is deformed, out of alignment, if too much friction is applied when opening and closing, and the like.

As recited above, the current sensor 46 monitors the amount of current that goes to the motor 38 and this information is received and processed by the engine/processor 36 with memory and is coupled to the circuit 18. The amount of current going to the motor 38 is used to determine the amount of friction experienced by door 12 and/or lock device 22 in opening and/or closing, as applied by the intelligent door lock system 10 and the positioning sensing device 16 to the drive shaft 14. The circuit 18 and engine/processor 36 can provide for an adjustment of current. The engine/processor 36 can provide information regarding the door and friction to the user of the door 12.

In one embodiment of the present invention, the intelligent door lock system 10 provides an ability to sense friction on the lock device 22 and/or door 12 by measuring the torque required to move the bolt/lock 24. The intelligent door lock system 10 increases the applied torque gradually until the bolt/lock 24 moves into its desired position, and the applied torque is the minimum amount of torque required to move the bolt/lock 24, which is directly related to how deformed the door is.

In one embodiment, when a bad door is detected, a customer can be notified that their door may require some servicing. In one embodiment, door deformation can be detected with a torque device is used to determine if the torque applied when the door is rotated is too high. As a non-limiting example, this can be 2-15 in lbs of torque The intelligent door lock system back end 68 can then perform a comparison between the measured torque with a standard, or a norm that is included in the one or more databases 88.

In one embodiment of the present invention, before the door is serviced, the intelligent door lock system 10 allows operation by offering a high-friction mode. As a non-limiting example, the high friction mode is when, as non-limiting examples, 2 inch lbs, 3 inch lbs., 3.5 inch pounds, and the like are required to open the door. In the high friction mode, the bolt/lock 24 is driven while the user is pushing, lifting, torqueing the door, pulling, performing visual inspections of rust, blockage, other conditions that can compromise a door and the like, that is applied to the doorknob. The position sensing device 16 is used to determine if the bolt/lock 24 was moved to a final position. In the high friction mode, motion of the door closing is confirmed. Upon detecting the closing of the door, the bolt/lock 24 is then driven. When the user receives an auditory, visual, or any other type of perceptible confirmation, the user then knows that the door has been locked. In one embodiment, the firmware elements, of the intelligent door lock system 10, as well as other door lock device 22 elements, can also attempt to drive the bolt/lock 24 for a second time when the first time fails. However, this can result in more power consumption, reducing lifetime of the power source, particularly when it is battery 50 based.

In one embodiment of the present invention, the intelligent door lock system 10 seeks to have the motor 38 operate with reduced energy consumption for energy source lifetime purposes, as well as eliminate or reduce undesirable noises, operations, and user experiences that occur when this is a failure in door locking and unlocking, particularly due to door deformation, door non-alignment, as well as other problems with the door that can be irritating to the person locking or unlocking the door.

In one embodiment of the present invention, the intelligent door lock system back-end 68 can track performance of doors and friction levels across time and build a service to encourage users to better maintain their doors. Such service can be a comparison of a door's friction level to other users that are similar geographic locations, at similar weather pattern, such that the user is encouraged to maintain their doors at a competent level. There can be a comparison to standards that at a certain level the door becomes unsafe. Guidelines are provided as to how to maintain their doors. This can be achieved by asking a door user what improves their door, including but not limited to, pushing, lifting, torqueing the door, pulling, visual inspections of rust, blockage, other conditions that can compromise a door, and the like. The analysis and comparison can be conducted at the back-end 68 and the results computed to door lock operator as well as others.

In one embodiment of the present invention, the intelligent door lock system 10 has a deformed operation mode that can be activated after a selected amount of time. As a non-limiting example, this can immediately after the user has been notified, more than 1 pico second, 1 second, 5 seconds, and greater periods of time. The deformed operation mode can be activated by the intelligent door lock system 10 itself, or by the intelligent door lock system back-end 68. It can be activated on the door operator's request. In one embodiment, the back-end 68 can anticipate these problems. As non-limiting examples, these can include but are not limited to, due to analysis of doors 12 in similar geographic areas, doors under similar conditions, doors with similar histories, similar environmental conditions, as well as the history of a particular door, and the like.

The deformed mode provides cooperation with the door user to more readily open the door. In one embodiment, this is a mechanism for the door to communicate back to the door lock operator. As a non-limiting example, feedback can be provided to the door operator. Such feedback can include, but is not limited to, communication via, tactile, audio, visual, temperature, electronic, wirelessly, through a computer, mobile device and the like. In another embodiment, the operator can signify to the door the operator's desire to leave by unlocking and opening the door 12. This is a door operator and lock communication. The door operator can close the door, which is sensed by the intelligent door lock system 10, a timer can then be initiated to provide with door operator with a selected time period in which the door operator can manually alleviate the friction problem. When the time has expired, the intelligent door system 10 can then lock the door 12. Upon detecting a successful door locking event, the intelligent door lock system 10 can advise the door operator that there is a successful door locking. If the door locking is not successful, the intelligent door lock system 10 can provide a message to the door operator via a variety of means, including but not limited to a message or alert to the door lock operator's mobile device. Such a mobile device message provides the door operator with notification that door locking was not successful or achieved, and the door lock operator can then then take action to lock the door 12 either in person, wirelessly, and the like.

For entry, communication with the lock device 22 may be different. In one embodiment, it can be locking coupled with close proximity to a mobile device that is exterior to the door.

In another embodiment of the present invention, the intelligent door lock system back-end 68 can track performance of doors and friction levels across time and build a simple service to encourage users to maintain their doors better, as discussed above.

This information can be stored in the one or more databases 64.

In one embodiment of the present invention, the intelligent door lock system 10 unlocks when a selected temperature is reached, when smoke is detected, when a fire is detected by processor 38 and the like. As non-limiting examples, the intelligent door lock system 10 unlocks the bolt/lock 24 when a temperature is sensed by the temperature sensor 46 that, as non-limiting examples, is greater than 40 degrees C., any temperature over 45 degrees C. and the like. The temperature sensor 46 212 sends a signal to the processor 36 which communicates with the motor 38 that will then cause the drive shaft 14 to rotate sufficiently and unlock the bolt/lock 24. An arm can also be activated. It will be appreciated that the processor 36 can be anywhere as long as it is in communication with the temperature sensor 46, and the motor 38, which can be at the intelligent door lock system 10, at the back-end 68, anywhere in the building, and at any remote location. The processor 36 determines if there is an unsafe condition, e.g., based on a rise in temperature and this then results in an unlocking of the bolt/lock 24.

In one embodiment, the intelligent door lock system back-end 68 can track performance of doors and friction levels across time and build a service to encourage users to better maintain their doors, as discussed above.

Figure 17:
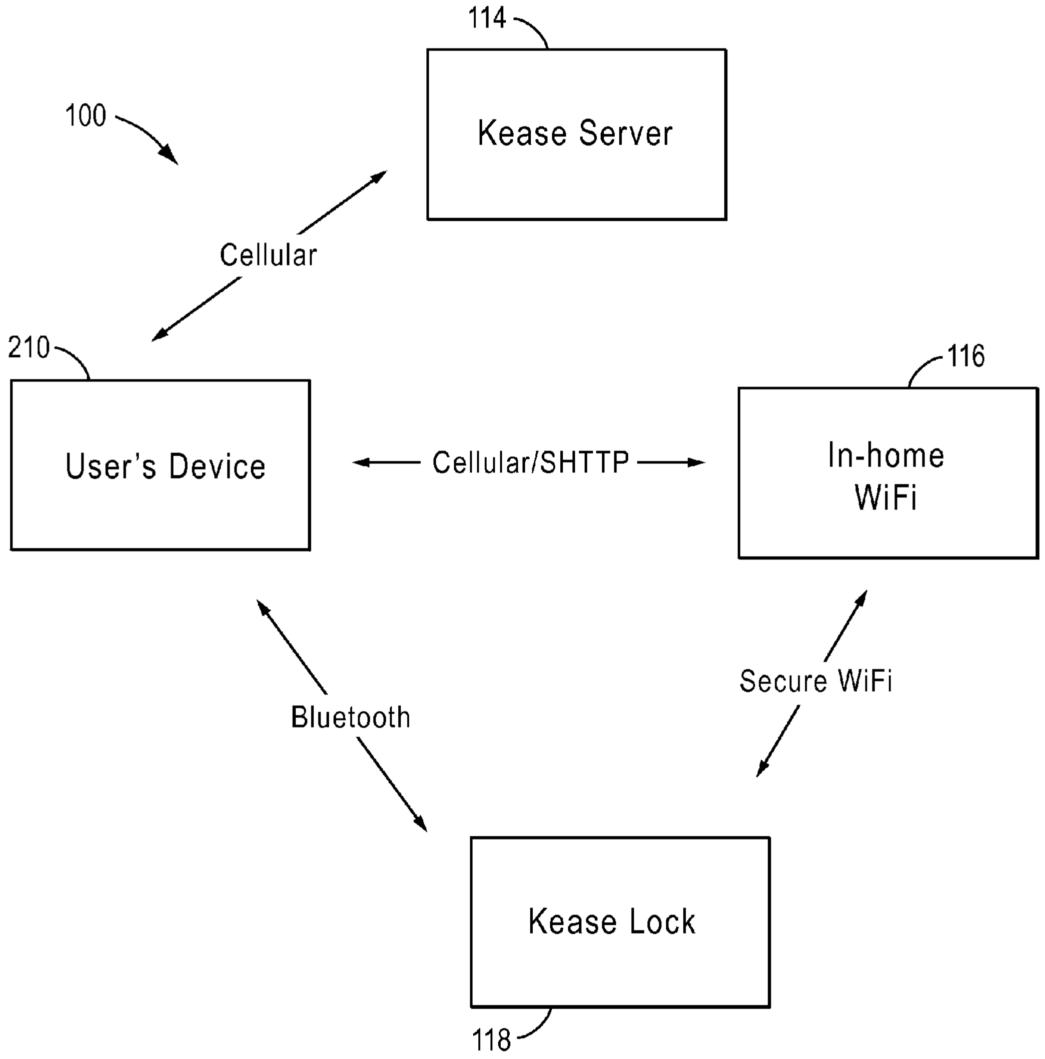
FIG. 17 is a diagram illustrating an implementation of an intelligent door lock system.

FIG. 17 is a diagram illustrating an implementation of an intelligent door look system 100 that allows an intelligent lock on one or more buildings to the controlled, as described above, and also controlled remotely by a mobile device or computer, as well as remotely by an intelligent lock system back-end component 114, a mobile device or a computing device 210 of a user who is a member of the intelligent door lock system 100, as disclosed above. The intelligent door lock system back-end component 114 may be any of those listed above included in the intelligent lock system back-end 68, one or more computing resources, such as cloud computing resources or server computers with the typical components, that execute a plurality of lines of computer code to implement the intelligent door lock system 100 functions described above and below. Each computing device 210 of a user may be a processing unit based device with sufficient processing power, memory and connectivity to interact with the intelligent door lock system back-end component 114. As a non-limiting example, the mobile device or computing device 210 may be as defined above, and include those disclosed below, that is capable of interacting with the intelligent door lock back-end component 114. In one implementation, the mobile device or computing device 210 may execute an application stored in the memory of the mobile device computing device 210 using a processor from the mobile device or computing device 210 to interact with the intelligent door lock back-end component 114. Examples of a user interface for that application is shown in FIGS. 21(*a*)-22(*e*) discussed below in more detail.

In another embodiment, the mobile device or computing device 210 may execute a browser stored in the memory of the mobile or computing device 210 using a processor from the mobile device or computing device 210 to interact with the intelligent door lock system back-end component 114. Each of the elements shown in FIG. 17 may be linked by System Networks, including but not limited to a cellular network, a Bluetooth system, the Internet (HTTPS), a WiFi network and the like.

As shown in FIG. 17, each user's mobile device or computer 210 may interact with the intelligent door lock system back-end 68 over System Networks, including but not limited to a wired or wireless network, such as a cellular network, digital data network, computer network and may also interact with the intelligent door lock system 10 using System Networks. Each mobile device or computing device 210 may also communicate with a WiFi network 115 or Network Systems over, as a non-limiting example, a network and the WiFi network 115 may then communicate with the intelligent door lock system 10.

Figure 18A:
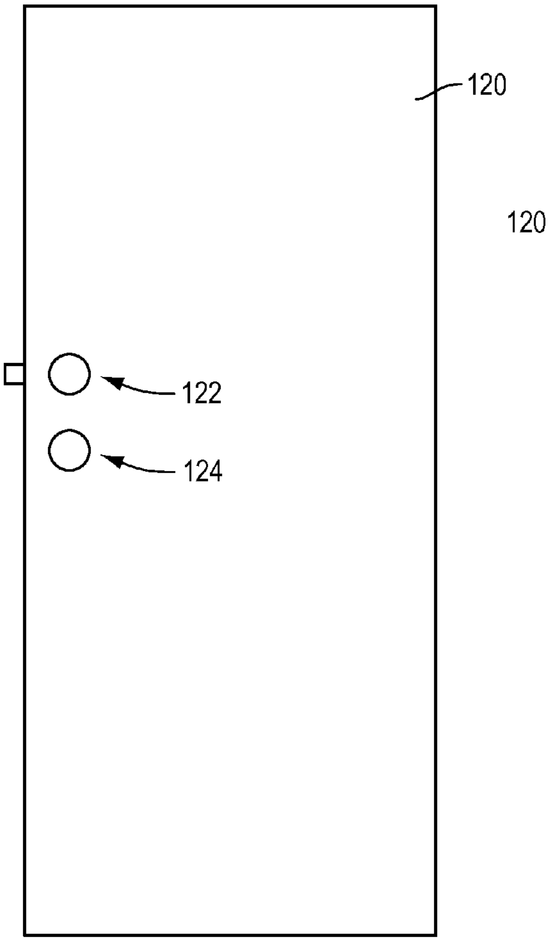
FIGS. 18(*a*) and (*b*) illustrate one embodiment of the present invention with a front view and a back view of a door with a bolt and an intelligent door lock system.
Figure 18B:
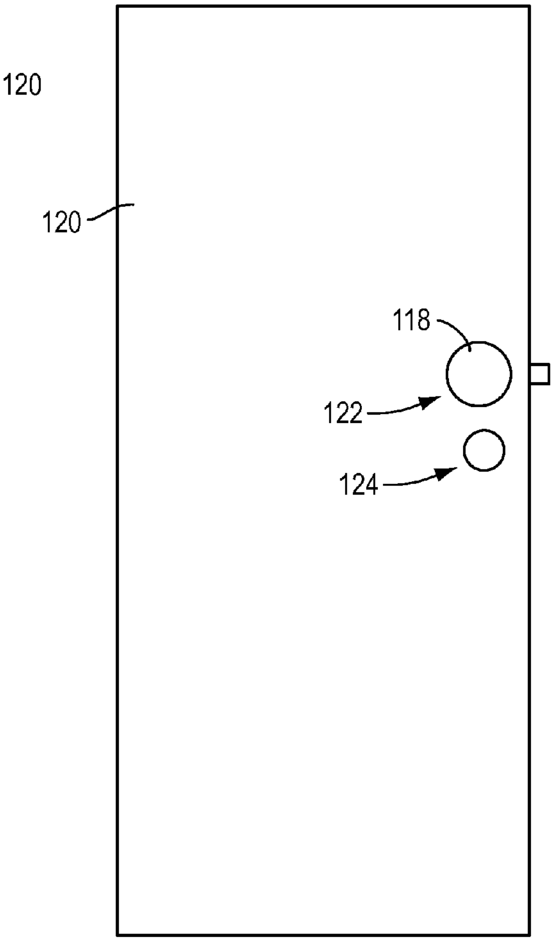

FIGS. 18(*a*) and (*b*) illustrate a front view and a back view, respectively, of a door 120 with intelligent door lock system 10. The front portion of the door 120 (that is outside relative to a building or dwelling) shown in FIG. 17 looks like a typical door 120 with a bolt assembly 122 and a doorknob and lock assembly 124. The back portion of the door 120, that is inside of the dwelling when the door 120 is closed, illustrated in FIG. 18(*b*) has the same doorknob and lock assembly 124, but then has an intelligent door lock system 100 that is retrofitted onto the bolt assembly 124 as described below in more detail.

Figure 23A:
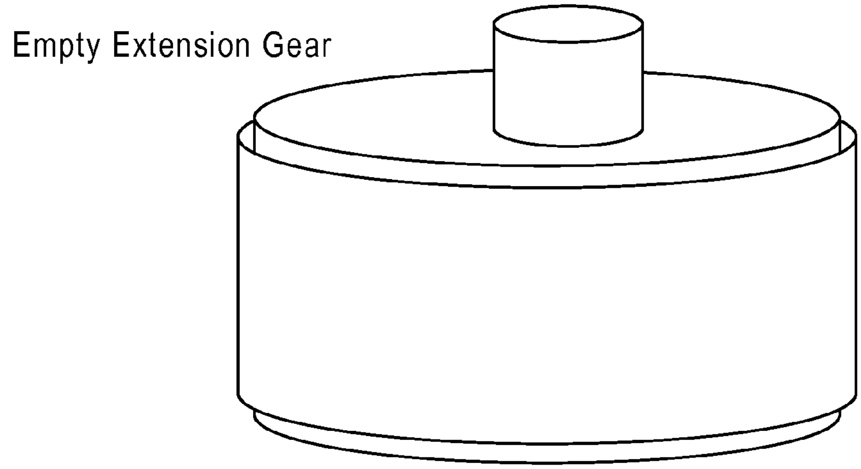
FIGS. 23(*a*) and (*b*) illustrate one embodiment of an intelligent door lock system with an empty extension and extension gear adapters.
Figure 23B:
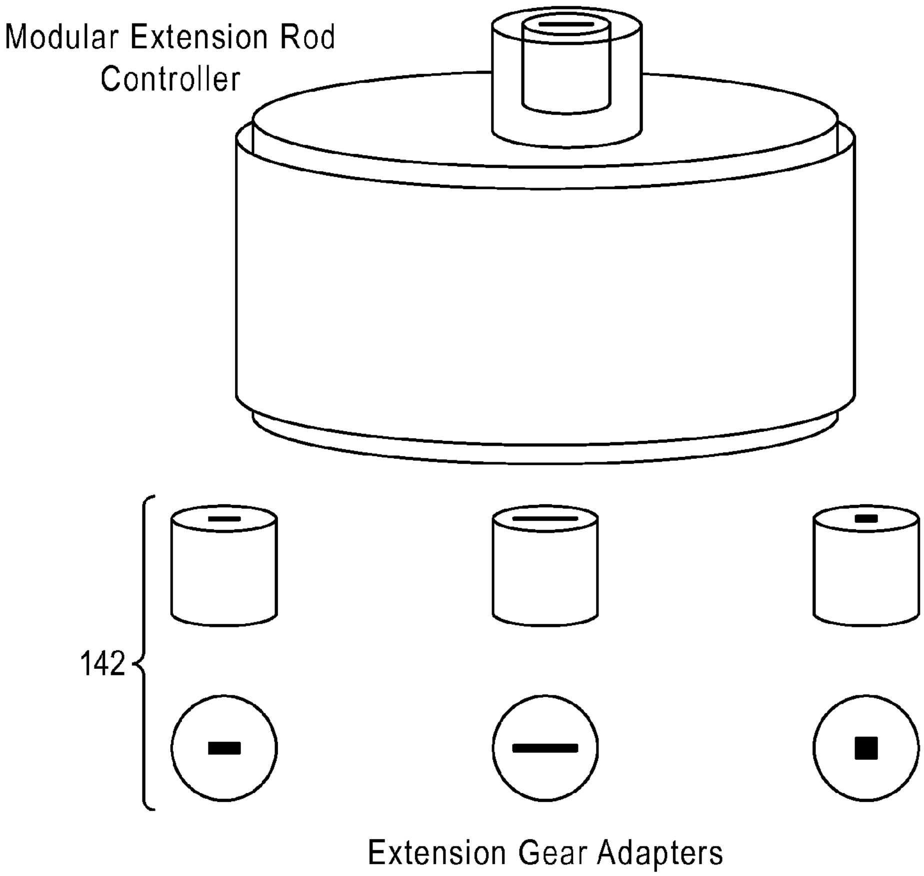

The intelligent door look assembly 100 may have an extension gear which extends through the baseplate of the smart door lock. The baseplate may have one or more oval mounting holes to accommodate various rose screw distances from 18 mm to 32 mm to accommodate various different doors. In one implementation, the intelligent door lock system 100 may have a circular shape and also a rotating bezel. The rotating bezel allows a user to rotate the smart door lock and thus manually lock or unlock the bolt as before. The extension gear extends through the baseplate and then interacts with the existing bolt elements and allows the smart door lock to lock/unlocks the bolt. The extension gear may have a modular adapter slot at its end which interfaces with an extension rod of the bolt assembly 124. These modular adapters, as shown in FIG. 23(*b*), may be used to match the existing extension rod of the bolt assembly 124. The smart door lock housing may further include an energy source, such as a battery, a motor assembly, such as a compact, high-torque, high-accuracy stepper motor, and a circuit board that has at least a processor, a first wireless connectivity circuit and a second wireless connectivity circuit, as described above. In one embodiment, the first wireless connectivity circuit may be a Bluetooth chip that allows the smart door lock to communicate using a Bluetooth protocol with a computing device of a user, such as a smartphone, tablet computer and the like. The second wireless connectivity circuit may be a WiFi chip that allows the smart door lock to communicate using a WiFi protocol with a back-end server system. The circuit board components may be intercoupled to each other and also coupled to the energy source and the motor for power and to control the motor, respectively. Each of the components described here may be coupled to the energy source and powered by the energy source.

Figure 19:
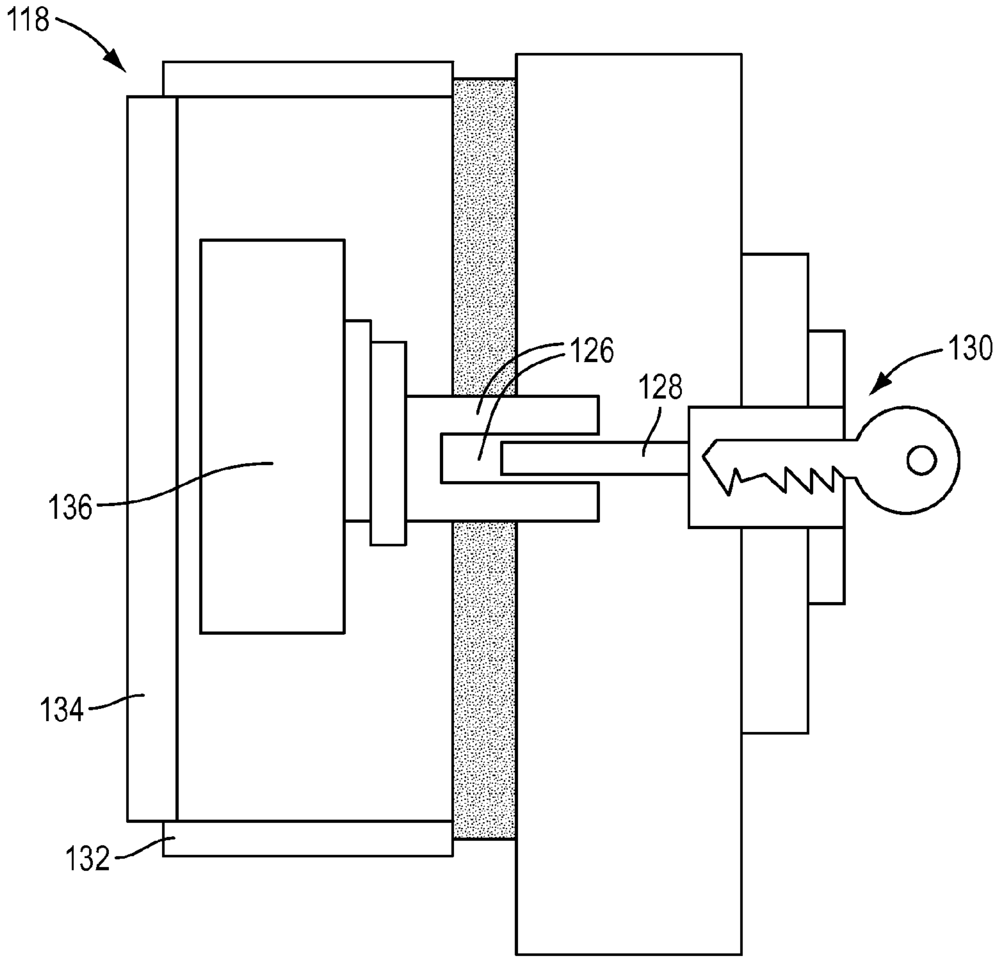
FIG. 19 illustrates more details of an embodiment of an intelligent door lock system of the present invention.

FIG. 19 illustrates the smart door lock system 100 being retrofitted onto a bolt in a door 10. As shown in FIG. 19, when the intelligent door lock system 100 is installed on the door 120, the thumb turn 124 is removed (replaced by the bezel that allows the user to manually unlock or lock the bolt.) In addition, the extension gear 126 of the intelligent door lock system 100, and more specifically the slotted portion 126(*a*) at the end of the extension gear, is mechanically coupled to the extension rod 128 of the bolt assembly as show in FIG. 19. When the intelligent door lock system 100 is installed, as shown in FIG. 19, the user can rotate the bezel 132 to manually lock or unlock the bolt assembly. In addition, when commanded to do so, the motor assembly in the intelligent door lock system 100 can also turn the extension gear 126 that in turn turns the extension rod and lock or unlock the bolt assembly. Thus, the extension gear 126 allows the smart door lock to act as a manual thumb turn (using the bezel) and rotate either clockwise or counter-clockwise to engage or disengage the bolt of a bolt. The extension gear 126 is designed in a manner to control the physical rotation of extension rods/axial actuators/tail pieces/tongues 128 which are traditional rotated by means of a thumb turn. This is achieved by designing the extension gear 126 with modular gear adapters as shown in FIG. 23(*b*) to fit over the extension rod 22 as shown. This allows the extension gear 126 to fit with a variety of existing extension rods.

Figure 20:
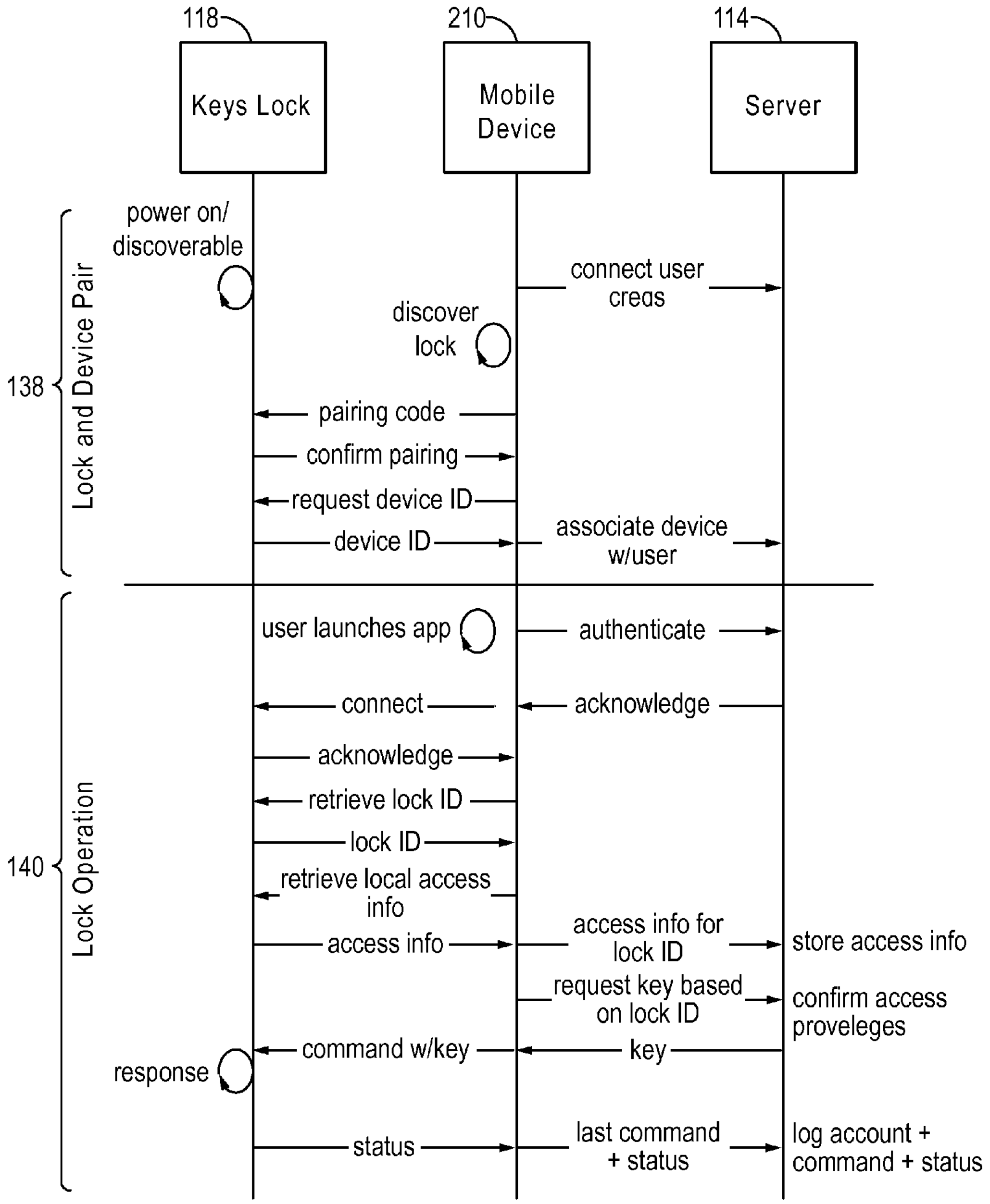
FIG. 20 illustrates one embodiment of the present invention showing a set of interactions between an intelligent door lock system, a mobile or computer and an intelligent door lock system back-end.
Figure 21A:
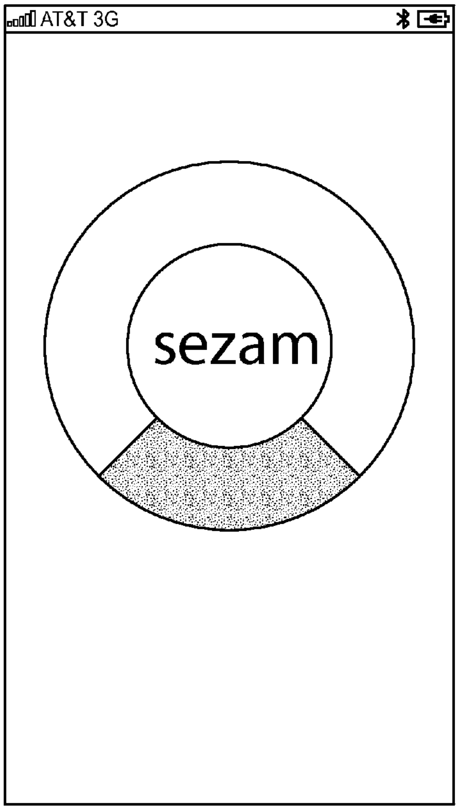
FIG. 21(*a*)-21(*g*) are examples of a user interface for an owner of a building that has an intelligent door lock system in one embodiment of the present invention.
Figure 21B:
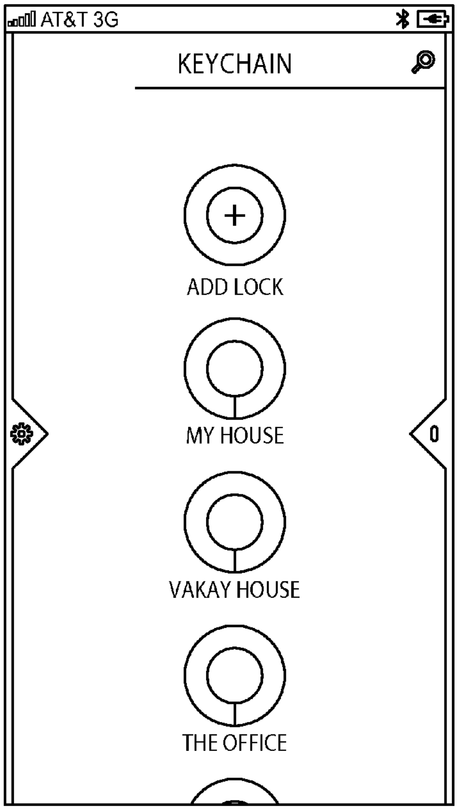
Figure 21C:
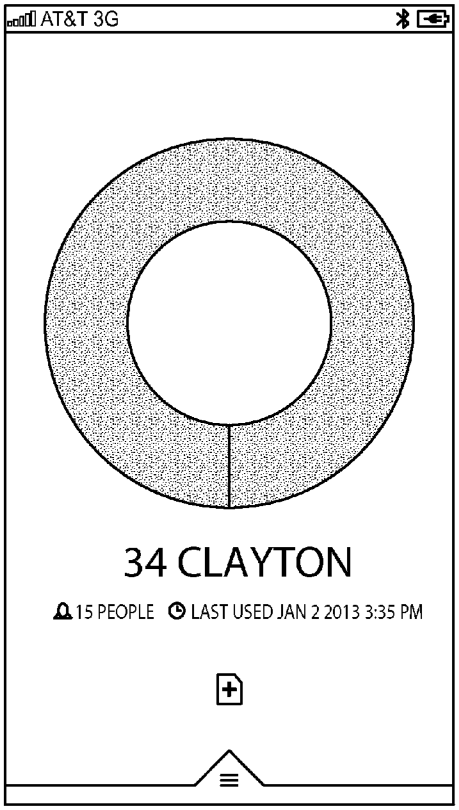
Figure 21D:
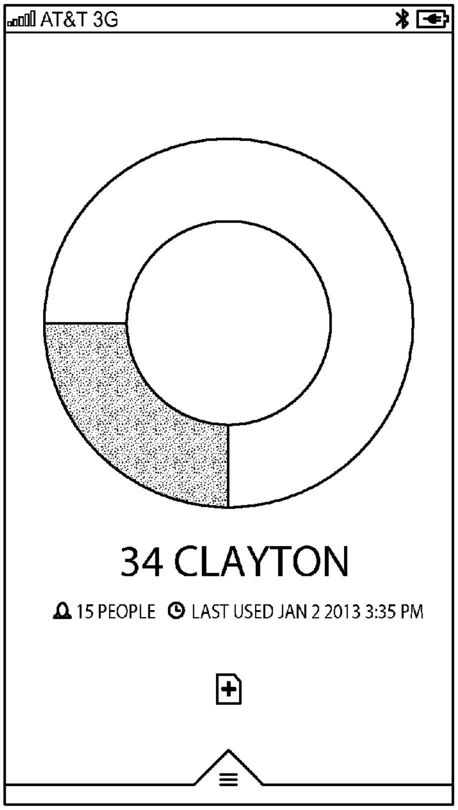
Figure 21E:
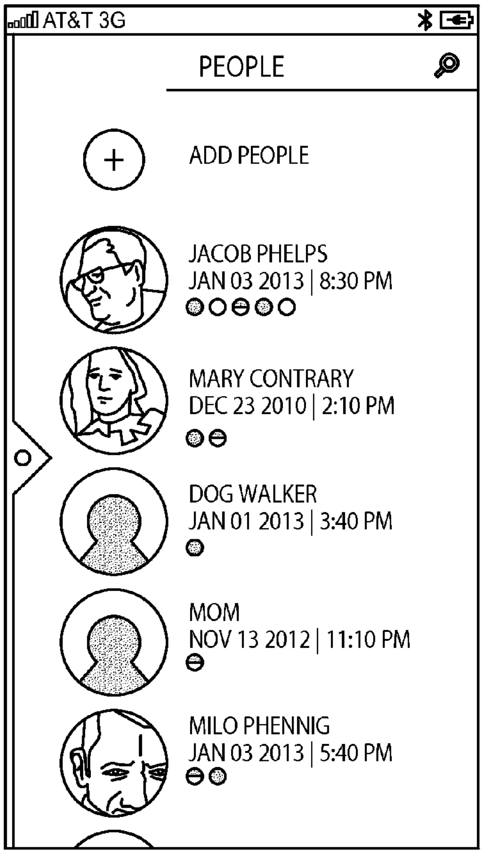
Figure 21F:
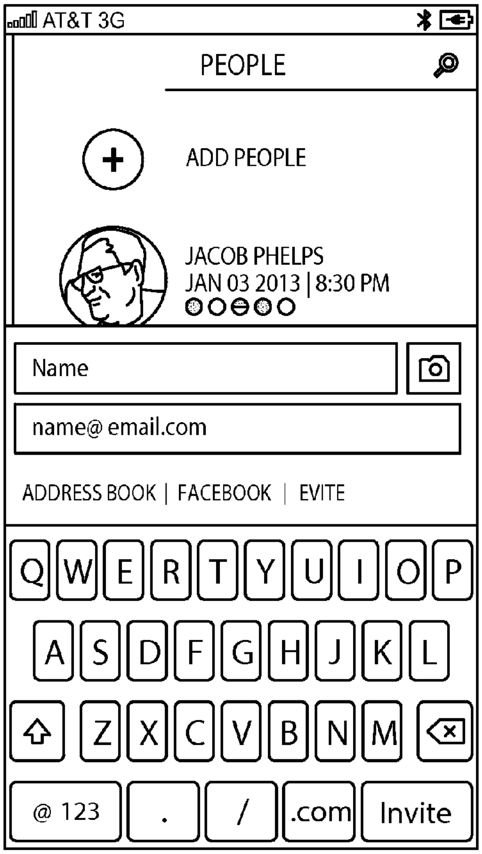
Figure 21G:
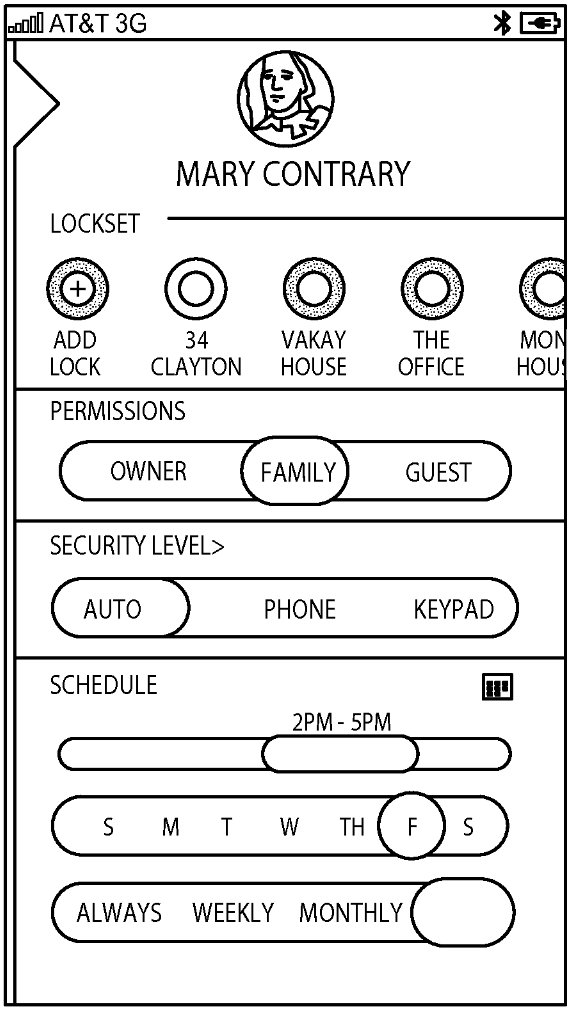
Figure 22A:
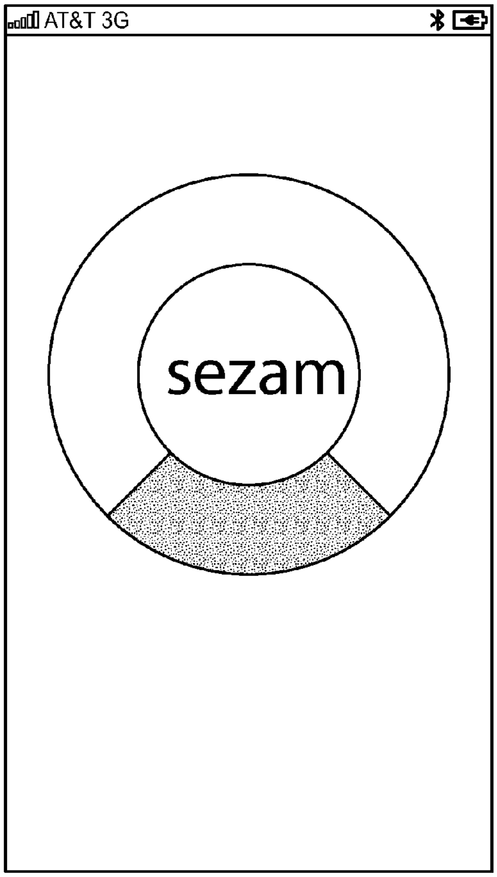
FIGS. 22(*a*)-22(*e*) are examples of a user interface for a guest of an owner of a building that has an intelligent door lock system in one embodiment of the present invention.
Figure 22B:
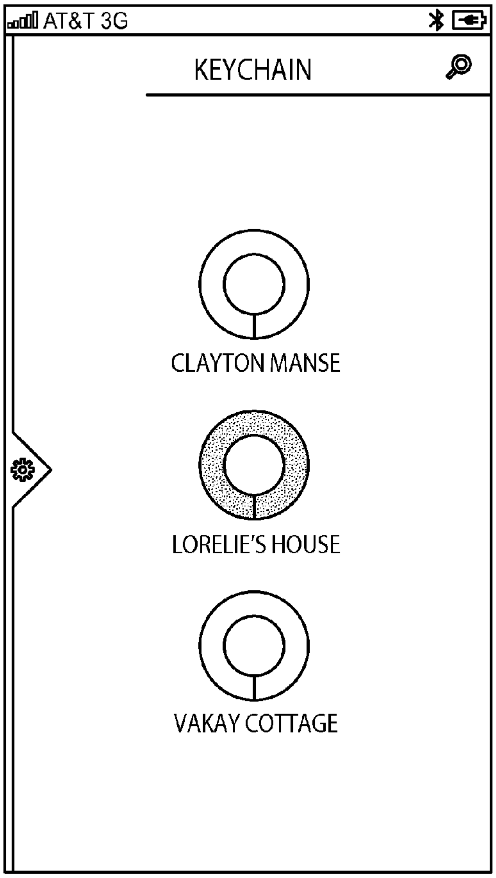
Figure 22C:
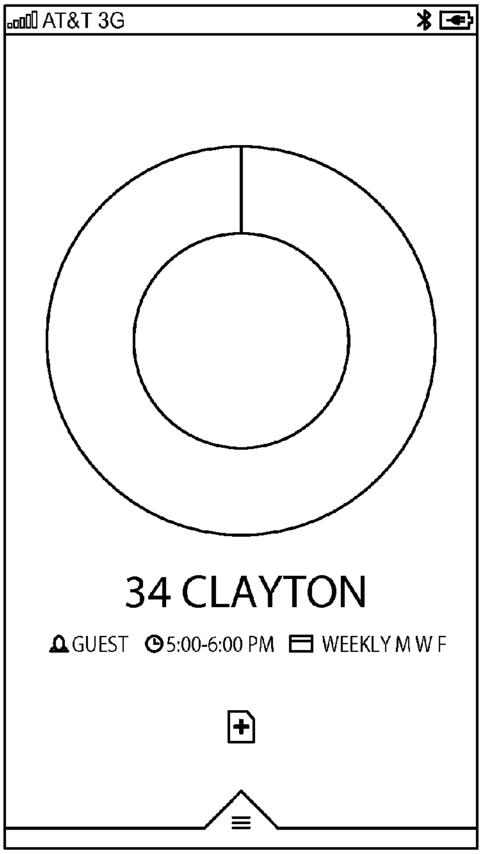
Figure 22D:
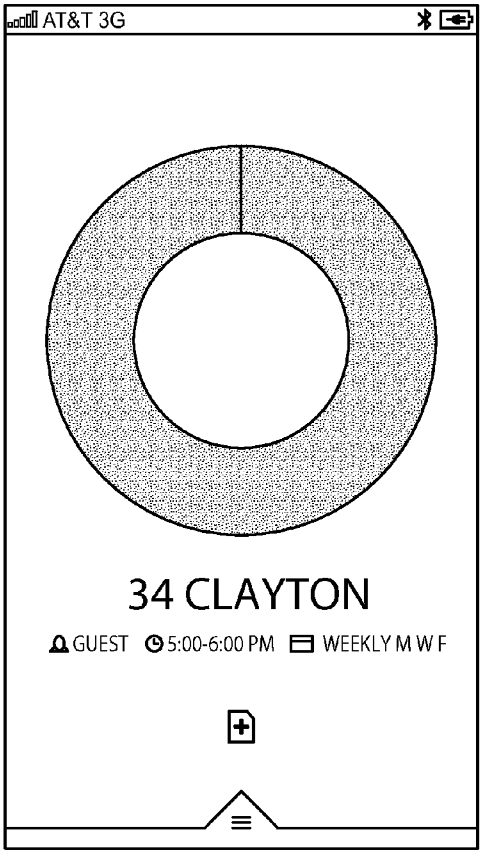
Figure 22E:
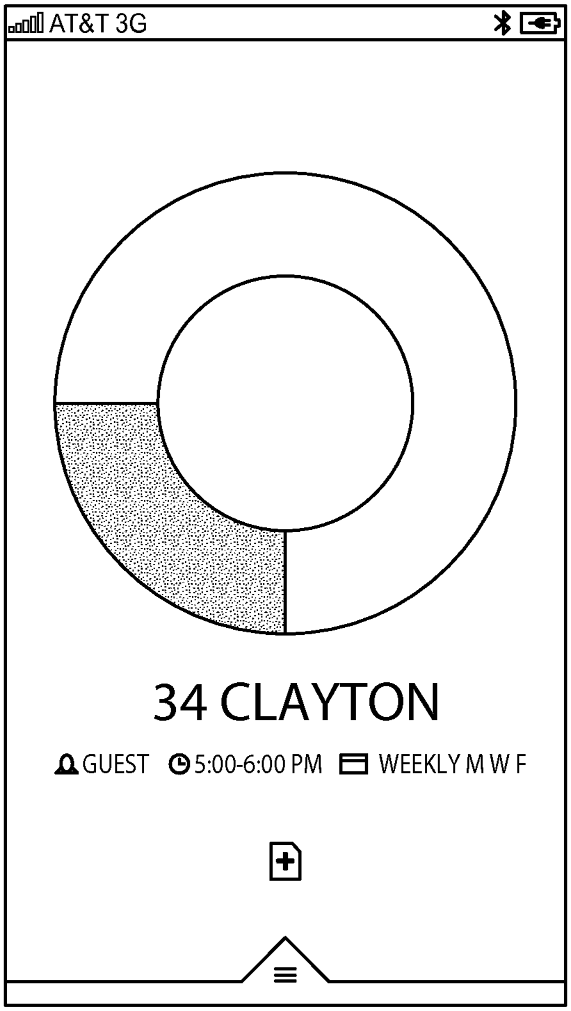

FIG. 20 illustrates a set of interactions between the intelligent door lock system 100, mobile or computing device 210 and intelligent door lock system back-end 68, that may include a pairing process 138 and a lock operation process 140. During the pairing process 138, the intelligent door lock system 100 and mobile or computing device 210 can be paired to each other and also authenticated by the intelligent door lock system back-end 68. Thus, as shown in FIG. 20, during the pairing process, the intelligent door look system 100 is powered on and becomes discoverable, while the mobile or computing device 210 communicates with the intelligent door lock system back-end 68, and has its credentials validated and authenticated. Once the mobile or computing device 210, and the app on the mobile or computing device 210, is authenticated, the mobile or computing device 210 discovers the lock, such as through a Bluetooth discovery process, since the intelligent door look system 100 and the mobile or computing device 210 are within a predetermined proximity to each other. The mobile or computing device 210 may then send a pairing code to the intelligent door look system 100, and in turn receive a pairing confirmation from the intelligent door lock system 100. The pairing process is then completed with the processes illustrated in FIG. 20. The lock operation may include the steps listed in FIG. 20 to operate the intelligent door look system 100 wirelessly using the mobile or computing device 210.

The intelligent door lock system 100 may be used for various functions. As a non-limiting example, the intelligent door lock system 100 may enable a method to exchange a security token between mobile or computing device 210 and the intelligent door look system 100. All or all of the intelligent door look systems 100 may be registered with the intelligent door lock back-end 68 with a unique registration ID. The unique ID of the an intelligent door look system 100 may be associated with a unique security token that can only be used to command a specific intelligent door look system 100 to lock or unlock. Through a virtual key provisioning interface of the intelligent door lock system back-end 68, a master user, who may be an administrator, can issue a new security token to a particular mobile or computing device 210. The intelligent door look system 100 can periodically broadcast an advertisement of its available services over System Networks. When the mobile or computing device 210 is within a predetermined proximity of the intelligent door look system 100, which varies depending on the protocol being used, the mobile or computing device 210 can detect the advertisement from the intelligent door lock assembly 100.

The application on the mobile or computing device 210 detects the intelligent door look system 100 and a communications session can be initiated. The token, illustrated as a key 118 in FIG. 20, is exchanged and the lock is triggered to unlock automatically. Alternatively, if the intelligent door look system 100 is equipped with a second wireless communications circuit, then the intelligent door look system 100 can periodically query the intelligent door lock system back-end 68 for commands. A user can issue commands via a web interface to the intelligent door lock system back-end 68, and the intelligent door look system 100 can lock or unlock the door 120. The intelligent door lock system 100 may also allow the user to disable auto-unlock, at which time the application on the user's mobile or computing device 210 can provide a notification which then allows the user to press a button on the mobile or computing device 210 to lock or unlock the lock.

The intelligent door lock system 100 may also allow for the triggering of multiple events upon connection to an intelligent door look system 100 by a mobile or computing device 210. As a non-limiting example, the intelligent door look system 100 can detect and authenticate the mobile or computing device 210, as described herein, and initiate a series of actions, including but not limiting to, unlocking doors 100, turning on lights, adjusting temperature, turning on stereo etc. The commands for these actions may be carried out by the mobile or computing device 210 or the intelligent door lock system back-end 68. In addition, through a web interface of the intelligent door lock system back-end 68, the user may define one or more events to be triggered upon proximity detection and authentication of the user's mobile or computing device 210 to the intelligent door look system 100.

The intelligent door lock system 100 may also allow for the intelligent triggering of events associated with an individual. In particular, environmental settings may be defined per individual in the intelligent door lock system back-end 68 and then applied intelligently by successive ingress by that person into a building that has an intelligent door look system 100. For example: person A arrives home and its mobile or computing device 210 is authenticated by the intelligent door look system 100. His identity is shared with the intelligent door lock system back-end 68. The intelligent door lock system back-end 68 may send environmental changes to other home controllers, such as "adjust heat to 68 degrees". Person B arrives at the same building an hour later and her mobile or computing device 210 is also authenticated and shared with the intelligent door lock system back-end 68. The intelligent door lock system back-end 68 accesses her preferred environmental variables such as "adjust heat to 71 degrees". The intelligent door lock system back-end understands that person B has asked for a temperature increase and issues the respective command to the dwelling thermostat. In one example, the intelligent door lock back-end system 68 has logic that defers to the higher temperature request or can deny it. Therefore if person A entered the home after person B, the temperature would not be decreased.

FIGS. 21(*a*)-(*g*) are examples of a user interface for an owner of a building that has an intelligent door lock system 100. These user interfaces may be seen by a user who is the owner of a building that has an intelligent door look system 100 with the unique ID. FIG. 21(*a*) is a basic home screen while FIG. 22(*b*) shows the smart door locks (in a keychain) which the user of the mobile or computing device 210 has access rights to in intelligent door lock system 100. FIG. 21(*c*) illustrates an example of a user interface when a particular intelligent door look system 100 is locked. FIG. 22(*d*) illustrates an example of a user interface when a particular intelligent door look system 100 is unlocked. FIGS. 21(*e*) and (*f*) are user interface examples that allow the owner to add other users/people to be able to control the intelligent door look system 100 of the building. FIG. 21(*g*) is an example of a configuration interface that allows the owner of the building to customize a set of permissions assigned for each intelligent door lock system 100.

FIGS. 22(*a*)-(*e*) are examples of a user interface for a guest of an owner of a building that has an intelligent door lock system 100.

FIGS. 23(*a*) and (*b*) illustrate an intelligent door look system 100 and extension gear adapters 142. In particular, FIG. 23(*a*) shows the bolt of a lock device with an empty extension gear receptacle that allows different extension gear adapters 150 (shown in FIG. 7B) to be inserted into the receptacle so that the an intelligent door look system 100 may be used with a number of different bolts of lock devices that each have a different shaped extension rod and/or extension rods that have different cross-sections.

Figure 24A:
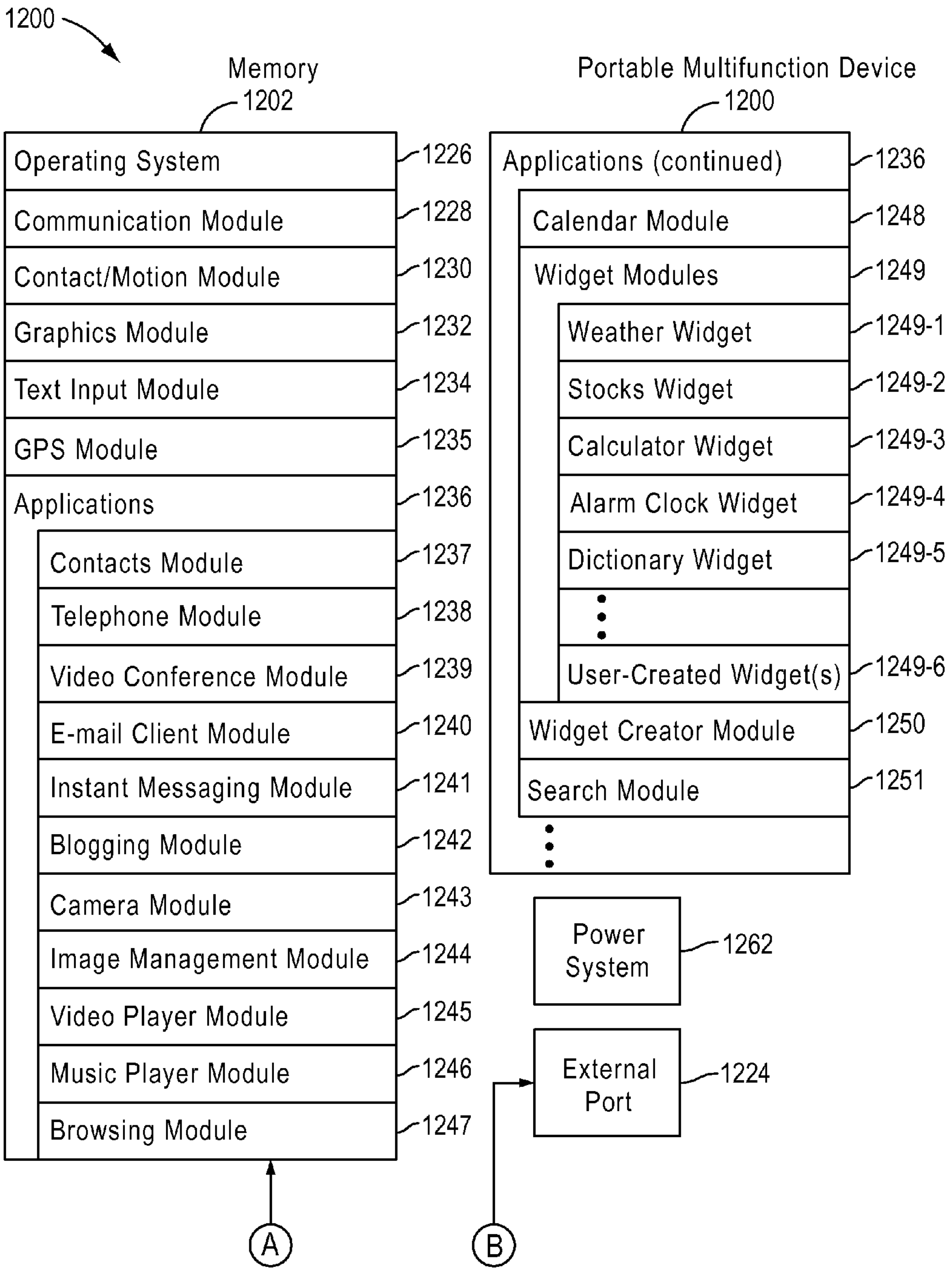
FIGS. 24(*a*)-(*b*) illustrates one embodiment of a mobile device that is used with the intelligent door lock system.
Figure 24B:
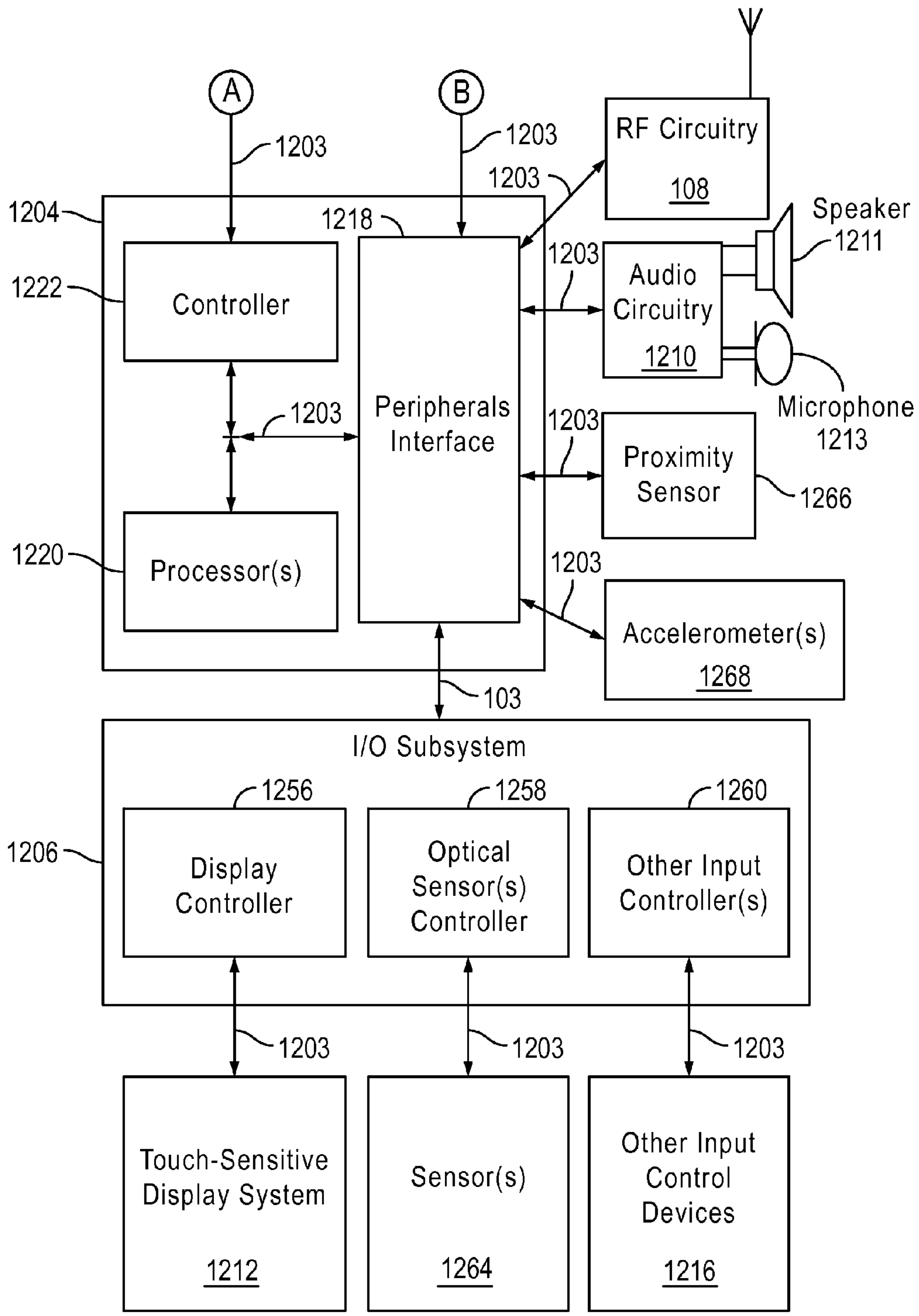
Figure 25A:
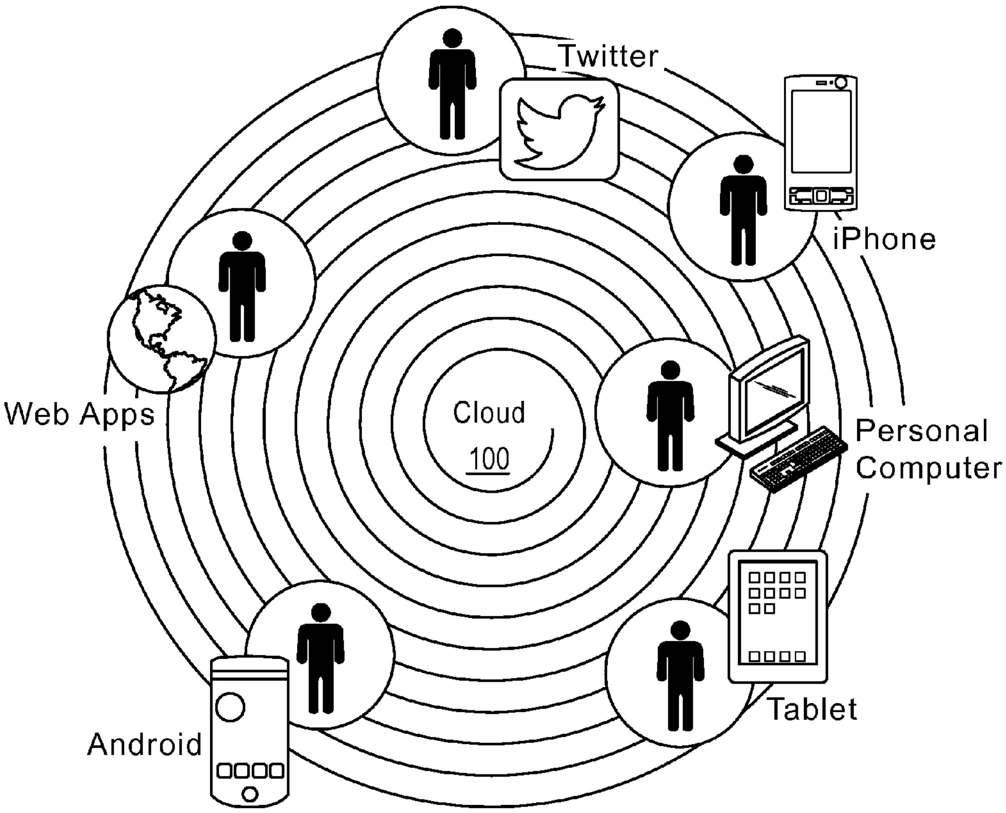
FIGS. 25(*a*)-(*e*) represent a logical diagram of a Cloud Infrastructure in accordance with one embodiment of the present invention.
Figure 25B:
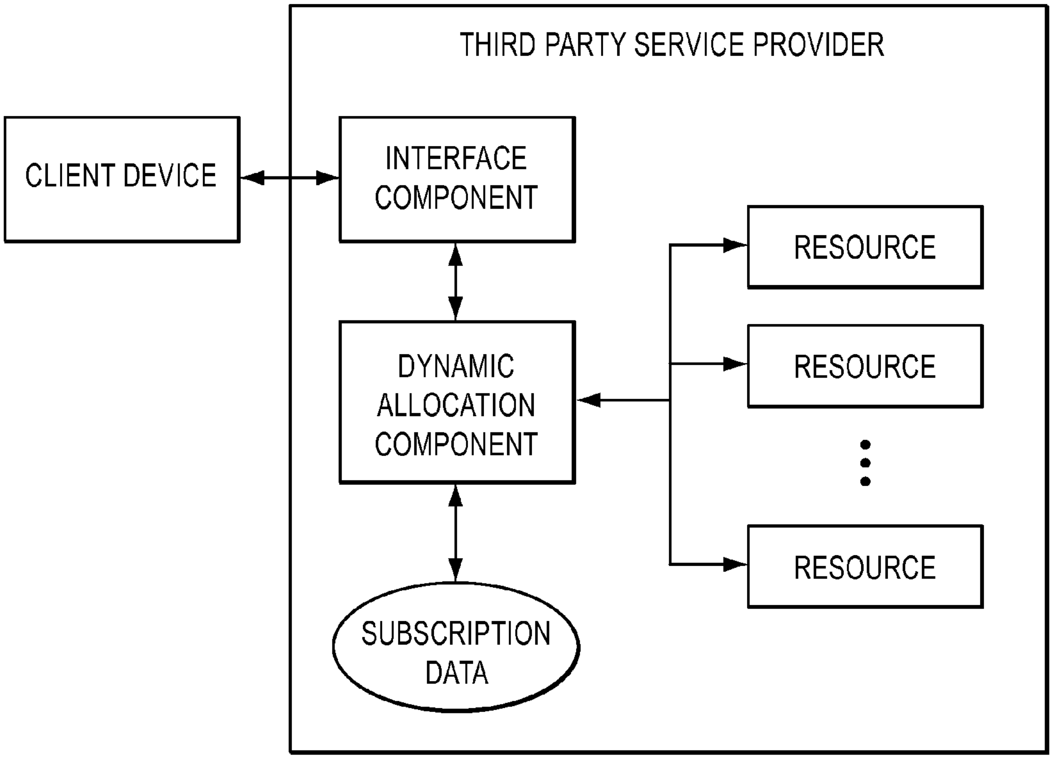
Figure 25C:
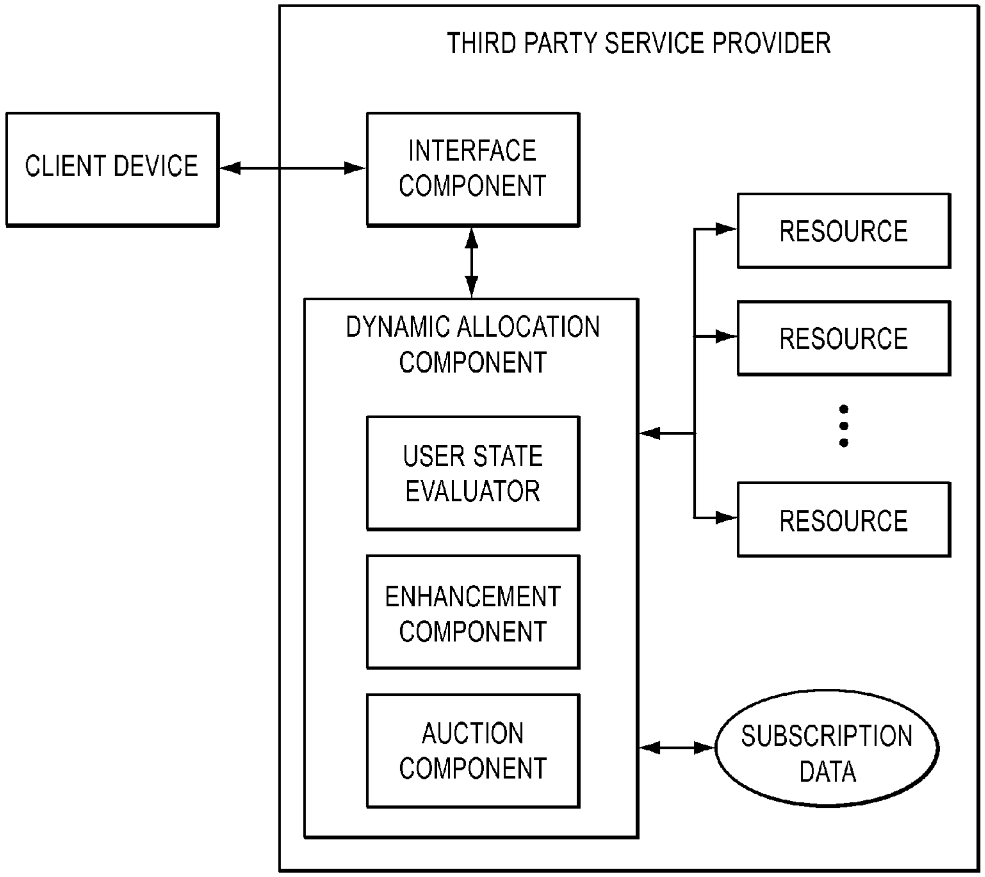
Figure 25D:
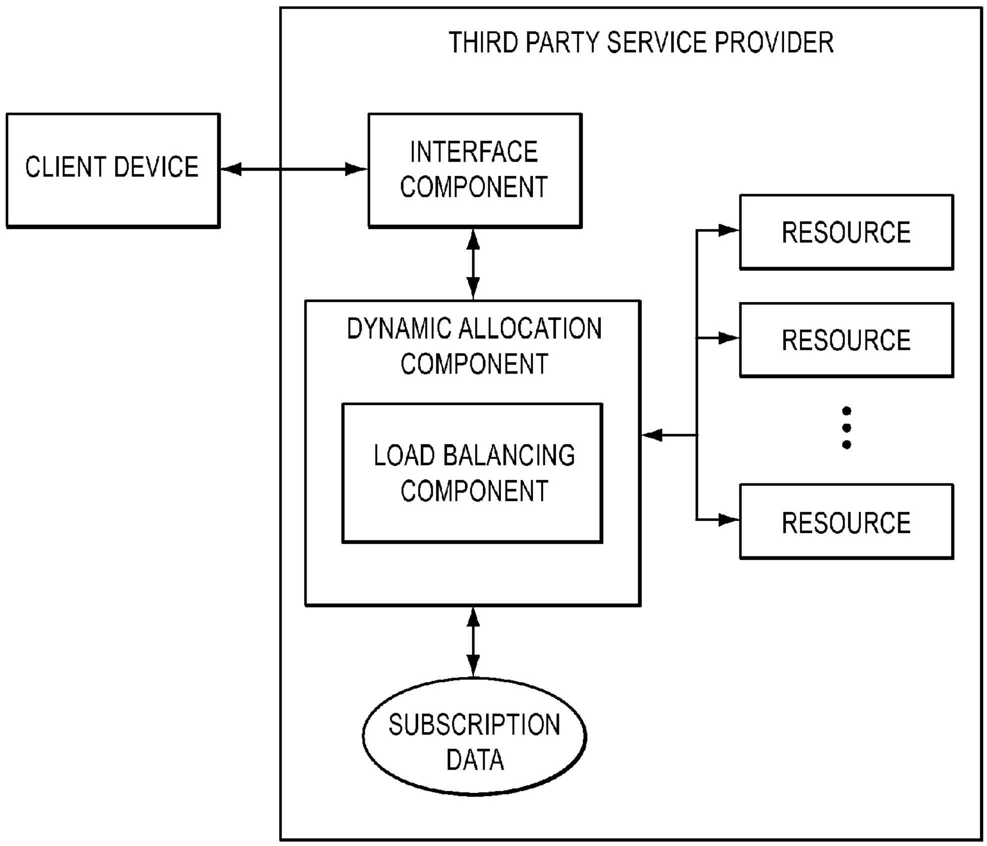
Figure 25E:
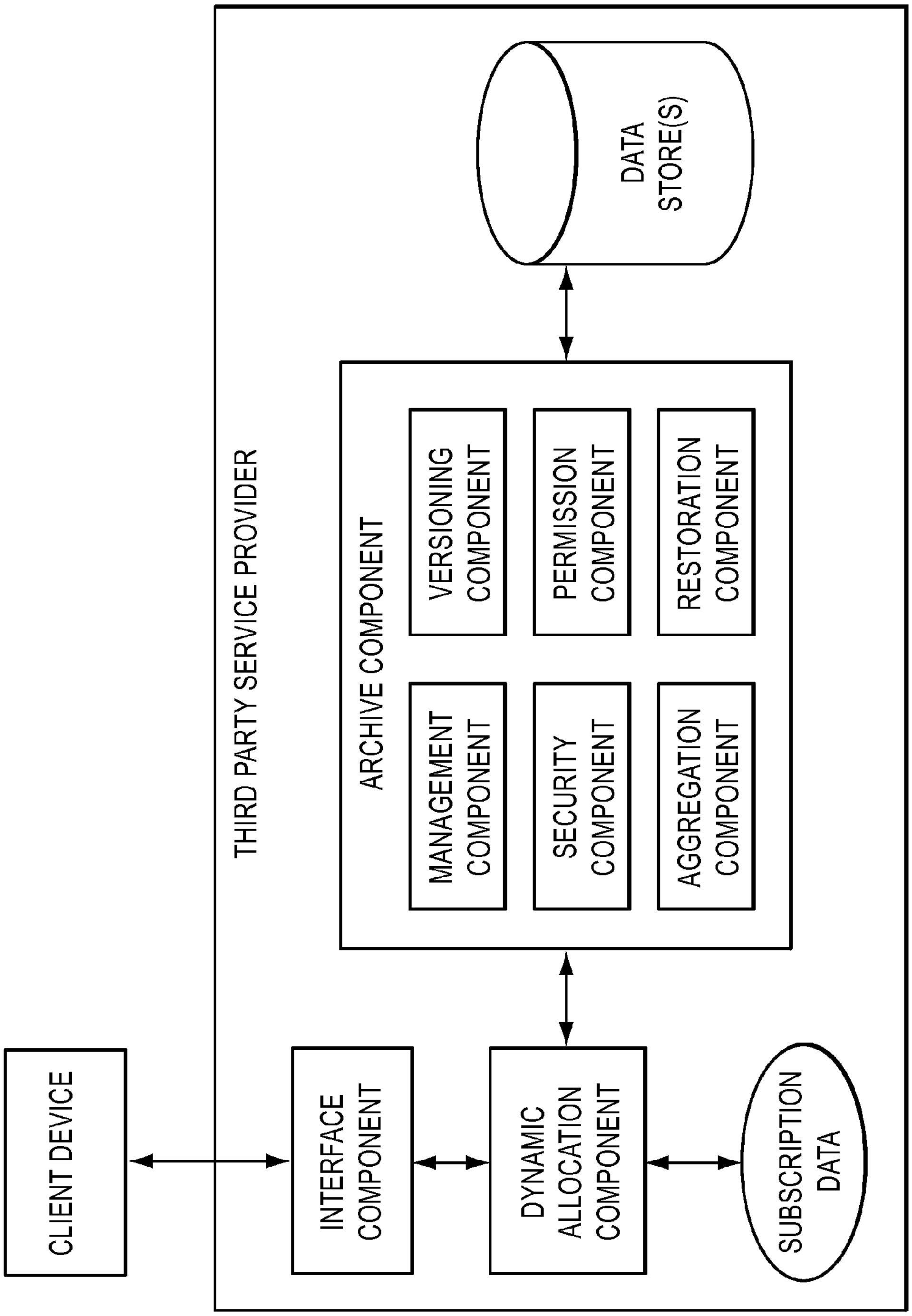

Referring now to FIGS. 24(*a*)-(*b*), 1212 is a block diagram illustrating embodiments of a mobile or computing device 210 that can be used with intelligent door lock system 10.

The mobile or computing device 210 can include a display 1214 that can be a touch sensitive display. The touch-sensitive display 1214 is sometimes called a "touch screen" for convenience, and may also be known as or called a touch-sensitive display system. The mobile or computing device 210 may include a memory 1216 (which may include one or more computer readable storage mediums), a memory controller 1218, one or more processing units (CPU's) 1220, a peripherals interface 1222, Network Systems circuitry 1224, including but not limited to RF circuitry, audio circuitry 1226, a speaker 1228, a microphone 1230, an input/output (I/O) subsystem 1232, other input or control devices 1234, and an external port 1236. The mobile or computing device 210 may include one or more optical sensors 1238. These components may communicate over one or more communication buses or signal lines 1240.

It should be appreciated that the mobile or computing device 210 is only one example of a portable multifunction mobile or computing device 210, and that the mobile or computing device 210 may have more or fewer components than shown, may combine two or more components, or a may have a different configuration or arrangement of the components. The various components shown in FIGS. 24(*a*)-(*b*) may be implemented in hardware, software or a combination of hardware and software, including one or more signal processing and/or application specific integrated circuits.

Memory 1216 may include high-speed random access memory and may also include non-volatile memory, such as one or more magnetic disk storage devices, flash memory devices, or other non-volatile solid-state memory devices. Access to memory 1216 by other components of the mobile or computing device 210, such as the CPU 1220 and the peripherals interface 1222, may be controlled by the memory controller 1218.

The peripherals interface 1222 couples the input and output peripherals of the device to the CPU 1220 and memory 1216. The one or more processors 1220 run or execute various software programs and/or sets of instructions stored in memory 1216 to perform various functions for the mobile or computing device 210 and to process data.

In some embodiments, the peripherals interface 1222, the CPU 1220, and the memory controller 1218 may be implemented on a single chip, such as a chip 1242. In some other embodiments, they may be implemented on separate chips.

The Network System circuitry 1244 receives and sends signals, including but not limited to RF, also called electromagnetic signals. The Network System circuitry 1244 converts electrical signals to/from electromagnetic signals and communicates with communications networks and other communications devices via the electromagnetic signals. The Network Systems circuitry 1244 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry 1244 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 1226, the speaker 1228, and the microphone 1230 provide an audio interface between a user and the mobile or computing device 210. The audio circuitry 1226 receives audio data from the peripherals interface 1222, converts the audio data to an electrical signal, and transmits the electrical signal to the speaker 1228. The speaker 1228 converts the electrical signal to human-audible sound waves. The audio circuitry 1226 also receives electrical signals converted by the microphone 1230 from sound waves. The audio circuitry 1226 converts the electrical signal to audio data and transmits the audio data to the peripherals interface 1222 for processing. Audio data may be retrieved from and/or transmitted to memory 1216 and/or the Network Systems circuitry 1244 by the peripherals interface 1222. In some embodiments, the audio circuitry 1226 also includes a headset jack. The headset jack provides an interface between the audio circuitry 1226 and removable audio input/output peripherals, such as output-only headphones or a headset with both output (e.g., a headphone for one or both ears) and input (e.g., a microphone).

The I/O subsystem 1232 couples input/output peripherals on the mobile or computing device 210, such as the touch screen 1214 and other input/control devices 1234, to the peripherals interface 1222. The I/O subsystem 1232 may include a display controller 1246 and one or more input controllers 210 for other input or control devices. The one or more input controllers 1 receive/send electrical signals from/to other input or control devices 1234. The other input/ control devices 1234 may include physical buttons (e.g., push buttons, rocker buttons, etc.), dials, slider switches, and joysticks, click wheels, and so forth. In some alternate embodiments, input controller(s) 1252 may be coupled to any (or none) of the following: a keyboard, infrared port, USB port, and a pointer device such as a mouse. The one or more buttons may include an up/down button for volume control of the speaker 1228 and/or the microphone 1230. The one or more buttons may include a push button. A quick press of the push button may disengage a lock of the touch screen 1214 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device 210 on or off. The user may be able to customize a functionality of one or more of the buttons. The touch screen 1214 is used to implement virtual or soft buttons and one or more soft keyboards.

The touch-sensitive touch screen 1214 provides an input interface and an output interface between the device and a user. The display controller 1246 receives and/or sends electrical signals from/to the touch screen 1214. The touch screen 1214 displays visual output to the user. The visual output may include graphics, text, icons, video, and any combination thereof (collectively termed "graphics"). In some embodiments, some or all of the visual output may correspond to user-interface objects, further details of which are described below.

A touch screen 1214 has a touch-sensitive surface, sensor or set of sensors that accepts input from the user based on haptic and/or tactile contact. The touch screen 1214 and the display controller 1246 (along with any associated modules and/or sets of instructions in memory 1216) detect contact (and any movement or breaking of the contact) on the touch screen 1214 and converts the detected contact into interaction with user-interface objects (e.g., one or more soft keys, icons, web pages or images) that are displayed on the touch screen. In an exemplary embodiment, a point of contact between a touch screen 1214 and the user corresponds to a finger of the user.

The touch screen 1214 may use LCD (liquid crystal display) technology, or LPD (light emitting polymer display) technology, although other display technologies may be used in other embodiments. The touch screen 1214 and the display controller 1246 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1214.

A touch-sensitive display in some embodiments of the touch screen 1214 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 1214 displays visual output from the portable mobile or computing device 210, whereas touch sensitive tablets do not provide visual output.

A touch-sensitive display in some embodiments of the touch screen 1214 may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 1214 may have a resolution in excess of 1000 dpi. In an exemplary embodiment, the touch screen has a resolution of approximately 1060 dpi. The user may make contact with the touch screen 1214 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device 210 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 1214 or an extension of the touch-sensitive surface formed by the touch screen.

In some embodiments, the mobile or computing device 210 may include a physical or virtual click wheel as an input control device 1234. A user may navigate among and interact with one or more graphical objects (henceforth referred to as icons) displayed in the touch screen 1214 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 1252 as well as one or more of the modules and/or sets of instructions in memory 1216. For a virtual click wheel, the click wheel and click wheel controller may be part of the touch screen 1214 and the display controller 1246, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device 210 also includes a power system 1214 for powering the various components.

The power system 1214 may include a power management system, one or more power sources (e.g., battery 1254, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device 210 may also include one or more sensors 1238, including not limited to optical sensors 1238. An optical sensor can be coupled to an optical sensor controller 1248 in I/O subsystem 1232. The optical sensor 1238 may include charge-coupled device (CCD) or complementary metal-oxide semiconductor (CMOS) phototransistors. The optical sensor 1238 receives light from the environment, projected through one or more lens, and converts the light to data representing an image. In conjunction with an imaging module 1258 (also called a camera module); the optical sensor 1238 may capture still images or video. In some embodiments, an optical sensor is located on the back of the mobile or computing device 210, opposite the touch screen display 1214 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 1238 can be changed by the user (e.g., by rotating the lens and the sensor in the device housing) so that a single optical sensor 1238 may be used along with the touch screen display for both video conferencing and still and/or video image acquisition.

The mobile or computing device 210 may also include one or more proximity sensors 1250. In one embodiment, the proximity sensor 1250 is coupled to the peripherals interface 1222. Alternately, the proximity sensor 1250 may be coupled to an input controller in the I/O subsystem 1232. The proximity sensor 1250 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 1214 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 1216 may include an operating system 1260, a communication module (or set of instructions) 1262, a contact/motion module (or set of instructions) 1264, a graphics module (or set of instructions) 1268, a text input module (or set of instructions) 1270, a Global Positioning System (GPS) module (or set of instructions) 1272, and applications (or set of instructions) 1272.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1262 facilitates communication with other devices over one or more external ports 1274 and also includes various software components for handling data received by the Network Systems circuitry 1244 and/or the external port 1274. The external port 1274 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 106 may detect contact with the touch screen 1214 (in conjunction with the display controller 1246) and other touch sensitive devices (e.g., a touchpad or physical click wheel). The contact/motion module 106 includes various software components for performing various operations related to detection of contact, such as determining if contact has occurred, determining if there is movement of the contact and tracking the movement across the touch screen 1214, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 106 and the display controller 1246 also detects contact on a touchpad. In some embodiments, the contact/motion module 1284 and the controller 1286 detects contact on a click wheel.

Examples of other applications that may be stored in memory 1216 include other word processing applications, JAVA-enabled applications, encryption, digital rights management, voice recognition, and voice replication.

In conjunction with touch screen 1214, display controller 1246, contact module 1276, graphics module 1278, and text input module 1280, a contacts module 1282 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

The Cloud

FIGS. 25(*a*)-(*e*) represents a logical diagram of a Cloud Infrastructure that can be utilized with the present invention. As shown, the Cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above. The cloud can be in communication with the intelligent door lock system 10, the vibration tapping sensing device 11, and the like. In one embodiment, the cloud includes all or a portion of the back-end 68 elements. Communication with the vibration tapping sensing device 11 can be via the cloud.

The cloud based system that facilitates adjusting utilization and/or allocation of hardware resource(s) to remote clients. The system includes a third party service provider, that is provided by the methods used with the present invention, that can concurrently service requests from several clients without lottery participant perception of degraded computing performance as compared to conventional techniques where computational tasks can be performed upon a client or a server within a proprietary intranet. The third party service provider (e.g., "cloud") supports a collection of hardware and/or software resources. The hardware and/or software resources can be maintained by an off-premises party, and the resources can be accessed and utilized by identified lottery participants over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a lottery participant can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, instead of lottery participants of clients or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from lottery participants. According to this example, the resources can be modular in nature, and thus, resources can be added, removed, tested, modified, etc. while the remainder of the resources can support servicing lottery participant requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The system can include a client device, which can be the wearable device and/or the wearable device lottery participant's mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like. Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the lottery participant of the client device. In accordance with another example, the resources can include data store(s) that can be employed by the client device to retain data. The lottery participant employing the client device can have access to a portion of the data store(s) supported by the third party service provider, while access can be denied to remaining portions of the data store(s) (e.g., the data store(s) can selectively mask memory based upon lottery participant/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a lottery participant interface, and the like via employing one or more resources. Further, the interface component can obtain and/or transmit data over a Network System connection. According to an illustration, executable code can be received and/or sent by the interface component over the Network System connection. Pursuant to another example, a lottery participant (e.g. employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between lottery participants, devices, computational tasks, and the like. Moreover, the dynamic allocation component can further include a lottery participant state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular lottery participant and/or client device.

In one embodiment a system employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate lottery participants and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on lottery participant identity and/or authorization level. For instance, the security component can encrypt data transferred to the client device and/or decrypt data obtained from the client device. Moreover, the security component can certify and/or authenticate data retained by the archive component.

The permission component can enable a lottery participant to assign arbitrary access permissions to various lottery participants, groups of lottery participants and/or all lottery participants.

Further, the aggregation component assembles and/or analyzes collections of data. The aggregation component can seamlessly incorporate third party data into a particular lottery participant's data.

The restoration component rolls back data retained by the archive component. For example, the restoration component can continuously record an environment associated with the third party service provider. Further, the restoration component can playback the recording.

Algorithm for Detecting Taps/Knocks

As previously discussed a vibration/tapping detecting device 11 can be utilized to detect knock/tapings at the vibration/tapping detecting device 11, vibrations and the like which are used to lock or unlock a door. In one embodiment an accelerometer can be utilized. It will be appreciated that other devices can be utilized to detect the taps, knocks and the like, as mentioned above.

Figure 26:
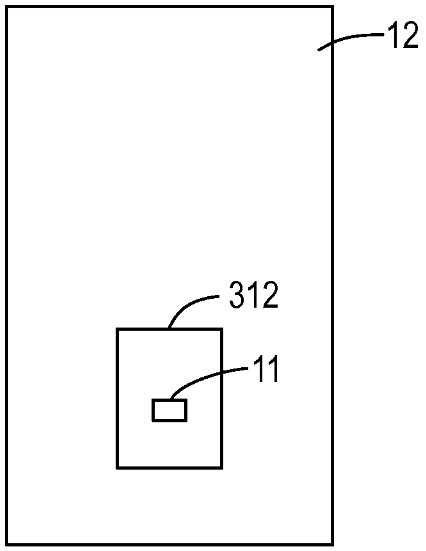
FIG. 26 is an image of a mobile device vibration/tapping sensing device included in a door in one embodiment of the present invention.

In one specific embodiment an accelerometer is utilized. FIG. 26 is an image of a door 12 that contains a vibration/tapping sensing device 11, which for these illustrations is an internal accelerometer. As mentioned above, other vibration/tapping sensing devices 11 can be used. The vibration/tapping sensing device 11 is generally mounted on a circuit board 312. The vibration/tapping sensing device 11 may be a single axis accelerometer (x axis), a dual axis accelerometer (x, y axes) or a tri-axis accelerometer (x, y, z axes). The vibration/tapping sensing device 11 may have multiple accelerometers that each measure 1, 2 or 3 axes of acceleration. In one embodiment the vibration/tapping sensing device 11 continuously measures acceleration producing a temporal acceleration signal. In one embodiment the temporal acceleration signal may contain more than one separate signal. For example, the temporal acceleration signal may include 3 separate acceleration signals, i.e. one for each axis. In certain embodiments, the accelerometer includes circuitry to determine if a knock/tap has occurred by taking the derivative of the acceleration signal.

In some embodiments, the vibration/tapping sensing device 11 includes a computation module 314 for comparing the derivative values to a threshold to determine if a knock/tap has occurred. In other embodiments, the vibration/tapping sensing device 11 outputs a temporal acceleration signal and the computation module 314 takes the first derivative of the acceleration signal produce a plurality of derivative values.

In one embodiment the computation module 314 can then compare the first derivative values to a predetermined threshold value that is stored in a memory 316 of the computation module 314 to determine if a knock/tap has occurred.

Figure 27:
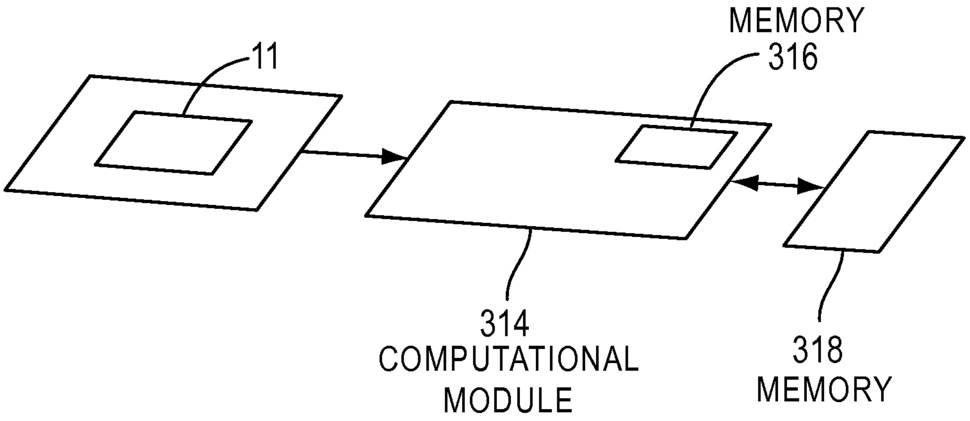
FIG. 27 is a first embodiment of a knock/tap detection system.

In one embodiment, illustrated in FIG. 27, the knock/tap detection system 300 can include a computation module 314 and the vibration/tapping sensing device 11. The accelerometer output signal is received by a computation module 314 that is electrically coupled to the vibration/tapping sensing device 11 and that is running (executing/interpreting) software code. It should be understood by one of ordinary skill in the art that the software code could be implemented in hardware, for example as an ASIC chip or in an FPGA or a combination of hardware and software code.

In one embodiment the computation module running the software receives as input the data from the vibration/tapping sensing device 11 and takes the derivative of the signal. For example, the vibration/tapping sensing device 11 may produce digital output values for a given axis that are sampled at a predetermined rate. The derivative of the acceleration values or "jerk" can be determined by subtracting the N and N−1 sampled values. The acceleration values may be stored in memory 318 either internal to or external to the computation module 314 during the calculation of the derivative of acceleration. Other methods/algorithms known to one of ordinary skill in the art may also be used for determining the derivative of the acceleration. The jerk value can then be compared to a threshold.

In one embodiment the threshold can be fixed or user-adjustable. If the jerk value exceeds the threshold then a knock/tap is detected. In some embodiments, two threshold values may be present: a first threshold value for knock/taps about the measured axis in a positive direction and a second threshold for knock/taps about the axis in a negative direction. It should be recognized by one of ordinary skill in the art that the absolute value of the vibration/tapping sensing device 11 output values could be taken and a single threshold could be employed for accelerations in both a positive and negative direction along an axis.

In one embodiment when a knock/tap has been detected, the computation unit can then forward a signal or data indicative of a knock/tap and is used to lock or unlock the door.

The application/process may use the detection of a knock/tap as an input signal to perform the locking or unlocking of the door. Thus, the knock/tap detection input causes a program operating on the device to take the specific action of locking or unlocking the door. These examples should not be viewed as limiting the scope of the invention and are exemplary only.

Figure 28:
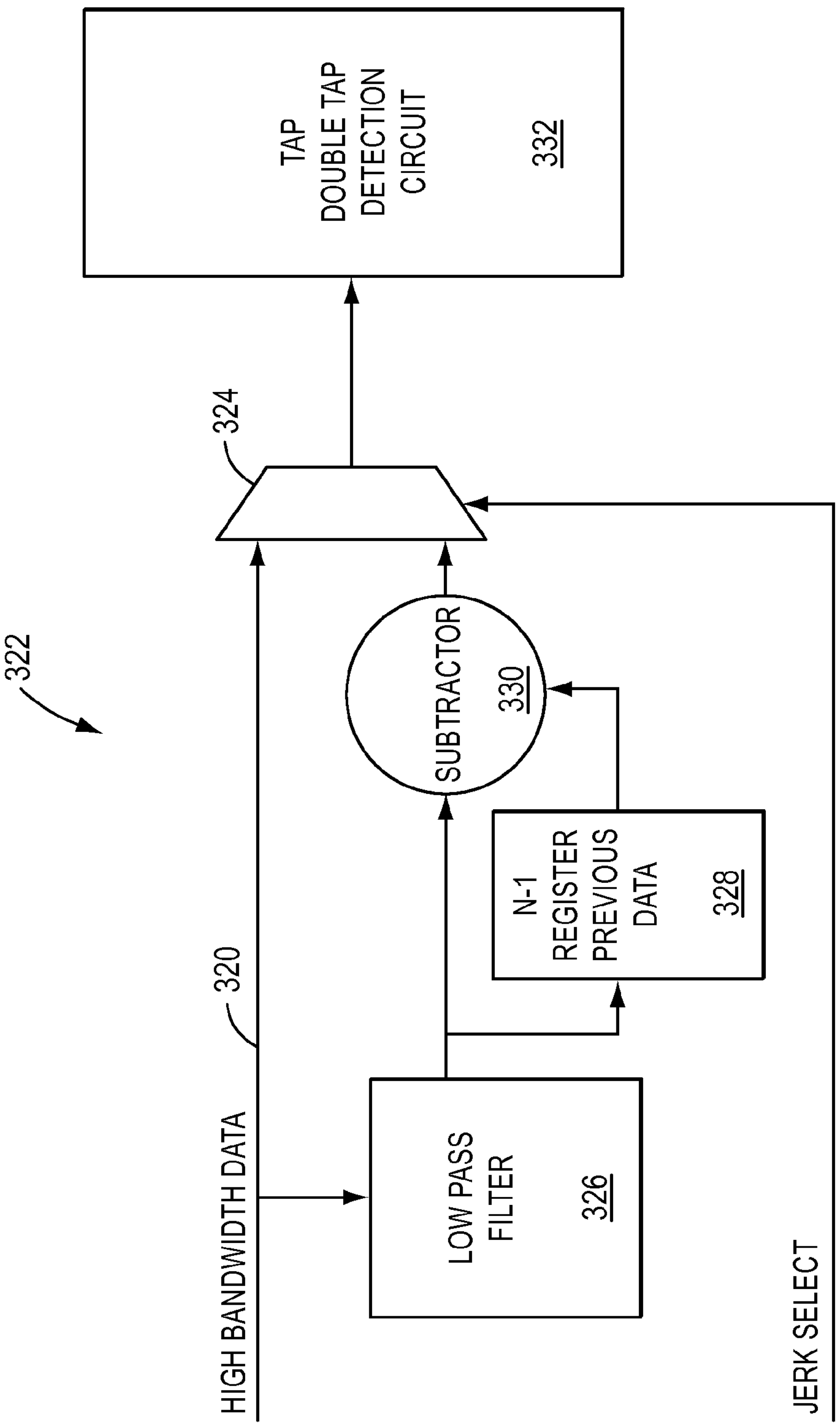
FIG. 28 is a second embodiment of a knock/tap detection system that includes a subtraction circuit.

FIG. 28 shows a second embodiment of the knock/tap detection system that uses a buffer for storing a temporal acceleration value along with a subtraction circuit. This embodiment can be used to retrofit a door 12 that already has a knock/tap detection algorithm without needing to alter the algorithm. For purposes of this discussion, it will be assumed that the high bandwidth acceleration data is for a single axis. It should be understood by one of ordinary skill in the art that the acceleration data may include data from a multi-axis vibration/tapping sensing device 11 without deviating from the scope of the invention.

In one embodiment the circuit shows high bandwidth data 320 from a vibration/tapping sensing device 11 unit being used as input to the knock/tap detection device system 322. The high-bandwidth data 320 is fed to a multiplexor 324 and also to a low pass filter 326.

In one embodiment the high bandwidth data 320 from the vibration/tapping sensing device 11 is low pass filtered in order to reduce the data rate, so that the data rate will be compatible with the other circuit elements of the knock/tap detection system 322. Therefore, the low pass filter 326 is an optional circuit element if the data rate of the vibration/tapping sensing device 11 is compatible with the other circuit elements.

In one embodiment once the acceleration data is filtered, the sampled data (N−1) is stored in a register 328. The next sampled data value (N) is passed to the subtraction circuit 330 along with the sampled value that is stored in the register (N−1) 328. As the N−1 data is moved to the subtraction circuit 330, the N data value replaces the N−1 value in the register 328. Not shown in the Figure is a clock circuit that provides timing signals to the low pass filter 326, the register 328, and the subtraction circuit 330. The clock circuit determines the rate at which data is sampled and passed through the circuit elements. If the vibration/tapping sensing device 11 samples at a different rate than the clock rate, the low pass filter can be used to make the vibration/tapping sensing device 11's output data compatible with the clock rate. The subtraction circuit 330 subtracts the N−1 value from the N value and outputs the resultant value. The resultant value is passed to the knock/tap detection circuit 332 when the jerk select command to the multiplexor is active. The acceleration data may also be passed directly to the knock/tap detection circuit 332 when there is no jerk select command. In certain embodiments of the invention, the vibration/tapping sensing device 11 along with the register 328, subtraction circuit 330, and multiplexor 324 are contained within the vibration/tapping sensing device 11 package.

In one embodiment the knock/tap detection circuit 332 may be a computation module with associated memory that stores the threshold jerk values within the memory. The knock/tap detection circuit may be either internal to the vibration/tapping sensing device 11 packaging or external to the vibration/tapping sensing device 11 packaging. As a non-limiting example in a door that includes one or more processors, a processor can implement the functions of a computation module. The computation module 314 compares the resultant jerk value to the one or more threshold jerk values. In one embodiment, there is a positive and a negative threshold jerk value. If the resultant value exceeds the threshold for a knock/tap in a positive direction or is below the threshold for a knock/tap in a negative direction, the knock/tap detection circuit indicates that a knock/tap has occurred.

In other embodiments, the computation module determines if a knock/tap occurs and then can store this information along with timing information. When a second knock/tap occurs, the computation module can compare the time between knock/taps to determine if a double knock/tap has occurred. Thus, a temporal threshold between knock/taps would be indicative of a double knock/tap. This determination could be similar to the double knock/tap algorithms that are used for computer input devices. For example, a double click of a computer mouse is often required to cause execution of a certain routine within a computer program. Thus, the double knock/tap could be used in a similar fashion.

Figure 29:
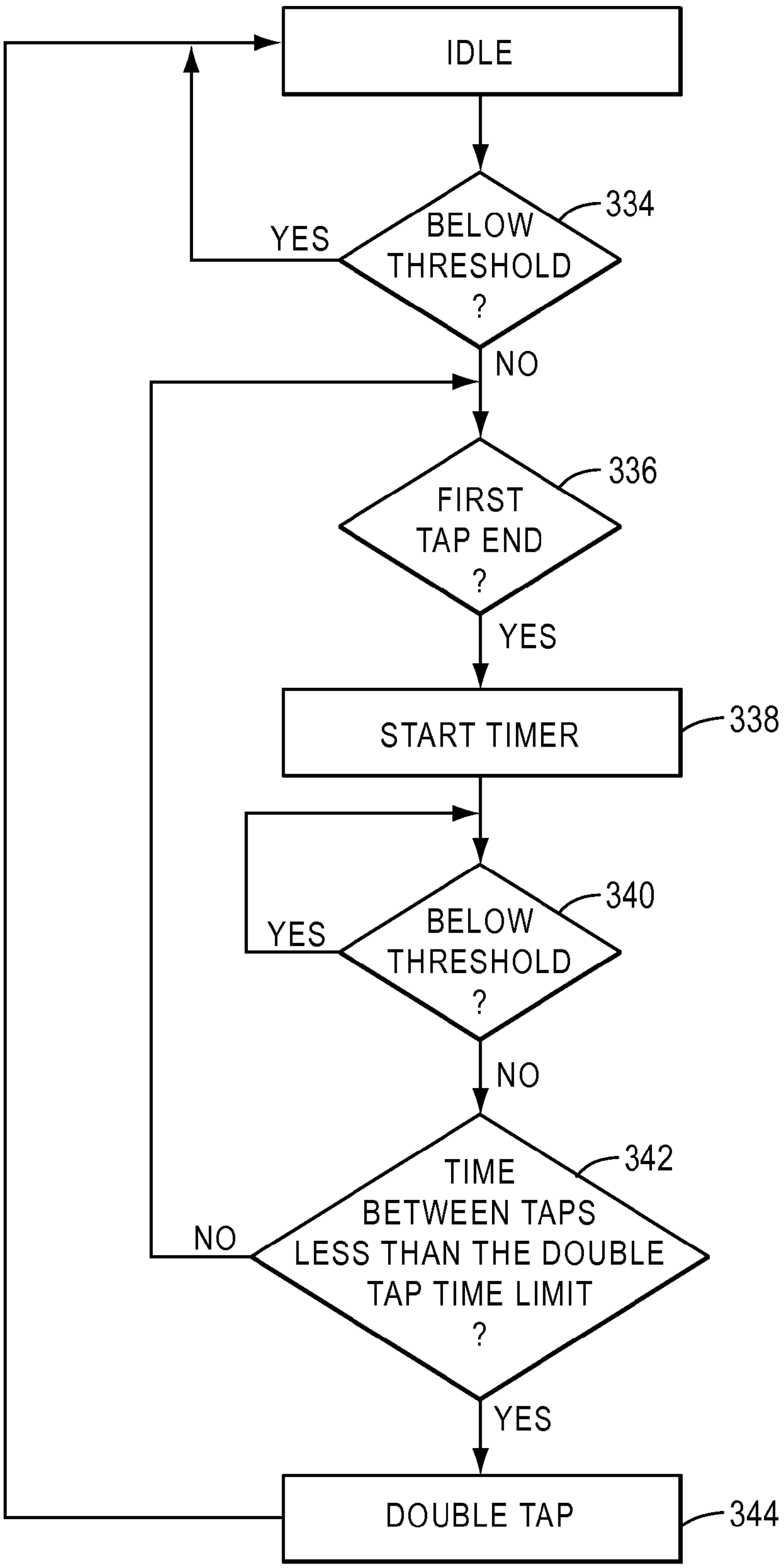
FIG. 29 is a flow chart that shows a method for detecting when a knock/double tap has occurred.

FIG. 29 shows a flow chart for determining if a double knock/tap has occurred. The system is initially at idle and the acceleration derivative values (jerk values) are below the threshold value 334. Each jerk value is compared to a threshold value 336. When the threshold value is exceeded, a first click or knock/tap is identified. The system waits either a predetermined length or time or determines when the jerk value goes below the threshold to signify that the first knock/tap has ended 336. A timer then starts and measures the time from the end of the first knock/tap and the system waits for a second knock/tap 338. The system checks each jerk value to see if the jerk value has exceeded the threshold 340. If the jerk value does not exceed the threshold the system waits. When the threshold is exceeded, the system determines the time between knock/taps and compares the time between knock/taps to a double knock/tap limit 340. If the time between knock/taps is less than the double knock/tap time limit, a double knock/tap is recognized 342. If a double knock/tap is not recognized, the present knock/tap becomes the first knock/tap and the system waits for the end of the first knock/tap. When a second knock/tap occurs, an identifier of the second knock/tap i.e. a data signal, flag or memory location is changed and this information may be provided as input to a process or program. Additionally, when a double knock/tap has been sensed, the methodology loops back to the beginning and waits for a new knock/tap.

Figure 30:
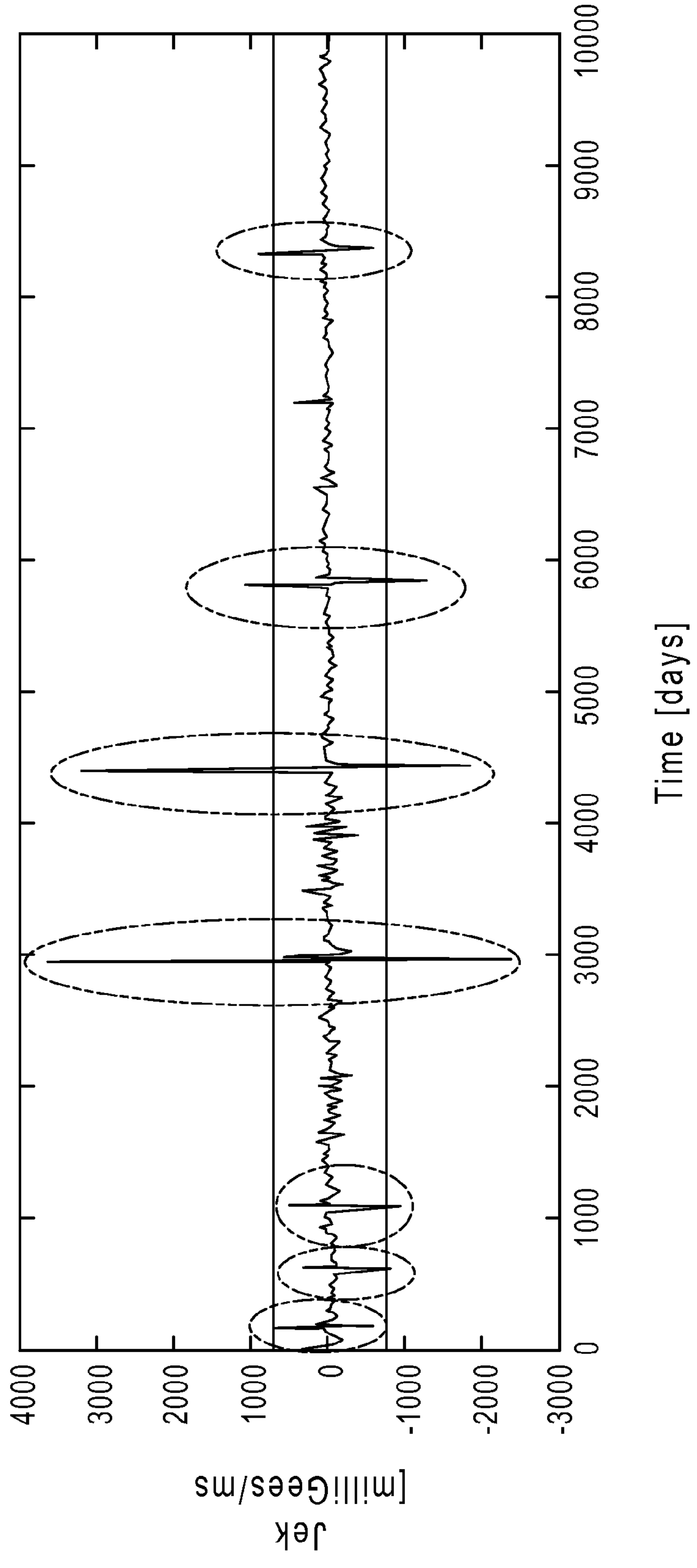
FIG. 30 is a graph that shows the derivative of acceleration with respect to time and includes thresholds for determining when a tap has occurred.

FIG. 30 shows a graph of the derivative of acceleration data ("jerk") with respect to time for the same series of accelerations as shown in FIG. 26. FIG. 30 provides a more accurate indication of knock/taps. FIG. 26 shows both false positive knock/tap readings along with true negative readings. Thus, the acceleration measurement will not register some knock/taps and will also cause knock/taps to be registered when no knock/tap was present. False positive readings can are occur. In one embodiment by taking the derivative of the acceleration signal, the noise floor is lowered and the knock/tap signals become more pronounced.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the description above) may be implemented as a computer program product for use with a Computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over Network Systems. Of course, some embodiments of the invention may be implemented as a combination of both software (e.g., a computer program product) and hardware. Still other embodiments of the invention are implemented as entirely hardware, or entirely software.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. An intelligent door lock system at a dwelling of a user with a door, comprising:

a position sensing apparatus configured to be coupled to a drive shaft of a lock apparatus, the position sensing apparatus sensing position of the drive shaft to assist in locking and unlocking a lock of a lock apparatus;

a circuit coupled to an engine with a memory;

an optional vibration /tapping sensing configured to be coupled to the lock apparatus to lock or unlock the door by the user when the user is at the door;

a wireless communication device coupled to the position sensing apparatus, the wireless communication device in communication with a server, the server configured to provide for a communication session between a mobile device and the intelligent door lock system, and when the mobile device is within a selected proximity of the intelligent door look system the mobile detects an advertisement from the intelligent door lock system;

an apparatus that converts energy into mechanical energy coupled to the drive shaft;

wherein following detection of the advertisement a mobile device of a user occupant of the dwelling is configured to be in communication with the door lock mechanism to provide locking or unlocking of the door; and a non-user occupant third party is allowed controlled access to the dwelling when the user occupant grants access rights to the non-user occupant third party.

2. The system of claim 1, wherein the apparatus that converts energy is configured to be coupled to the positioning sensing apparatus.

3. The system of claim 1, wherein the vibration/tapping sensing apparatus is an integral part of the intelligent door lock system.

4. The system of claim 1, wherein the vibration/tapping sensing apparatus is not an integral part of the intelligent door lock system.

5. The system of claim 1, wherein the vibration/tapping sensing apparatus detects vibration or knocking applied following programming of the intelligent door lock system of a user's vibration code or pattern.

6. The system of claim 1, wherein a user can give a third person a knock code/pattern to lock or unlock the door.

7. The system of claim 1, wherein the knocking/tapping is one that is recognized as having been defined by a user of the door lock system as a means to lock or unlock the door.

8. The system of claim 1, wherein the knocking/tapping can have a variety of different patterns, tempos, duration and intensity.

9. The system of claim 1, wherein the vibration/tapping sensing apparatus in operation detects oscillatory motion resulting from the application of oscillatory or varying forces to the door.

10. The system of claim 1, wherein the vibration/tapping sensing apparatus is selected from at least one of accelerometers, optical devices, electromagnetic and capacitive sensors, contact devices, transducers, displacement transducers, piezoelectric sensors, piezoresistive devices, variable capacitance, servo devices and audio devices where transfer of the vibration can be gas, liquid or solid.

11. The system of claim 1, wherein the vibration/tapping sensing apparatus is an accelerometer selected from at least one of, Piezoelectric (PE); high-impedance output; Integral electronics piezoelectric (IEPE); low-impedance output Piezoresistive (PR); silicon strain gauge sensor Variable capacitance (VC); low-level and low-frequency Servo force balance.

12. The system of claim 1, wherein the vibration/tapping sensing apparatus is in communication with a server coupled to the intelligent door lock system.

13. The system of claim 1, wherein the vibration/tapping sensing apparatus is coupled to a circuit board.

14. The system of claim 1, wherein the vibration/tapping sensing apparatus includes a subtraction circuit.

15. The system of claim 1, wherein the vibration/tapping sensing apparatus includes a clock circuit.

16. The system of claim 1, wherein the vibration/tapping sensing apparatus is coupled to an intelligent door lock system circuit and to an engine with a memory.

17. The system of claim 1, wherein a processing delay is provided to determine if the vibration or tapping is intended to lock or unlock the door.

18. The system of claim 1, wherein the vibration or tapping only expresses an intention to lock or unlock the lock.

* * * * *